US010901750B1

(12) United States Patent
Price et al.

(10) Patent No.: US 10,901,750 B1
(45) Date of Patent: Jan. 26, 2021

(54) METHOD FOR CUSTOMIZING SOFTWARE FUNCTIONALITY WITH A CONFIGURATION FILE

(71) Applicant: S-Tec Corporation, Mineral Wells, TX (US)

(72) Inventors: Ricardo Price, Granbury, TX (US); Kevin Kitchen, Arlington, TX (US)

(73) Assignee: S-Tec Corporation, Mineral Wells, TX (US)

( * ) Notice: Subject to any disclaimer, the term of this patent is extended or adjusted under 35 U.S.C. 154(b) by 296 days.

(21) Appl. No.: 15/250,334

(22) Filed: Aug. 29, 2016

Related U.S. Application Data

(60) Provisional application No. 62/211,238, filed on Aug. 28, 2015.

(51) Int. Cl.
*G06F 9/44* (2018.01)
*G06F 9/445* (2018.01)
*G06F 8/71* (2018.01)
*B64D 43/00* (2006.01)

(52) U.S. Cl.
CPC ......... *G06F 9/44505* (2013.01); *B64D 43/00* (2013.01); *G06F 8/71* (2013.01)

(58) Field of Classification Search
CPC .......... G06F 9/44505; G06F 8/71; B64D 3/00
See application file for complete search history.

(56) References Cited

U.S. PATENT DOCUMENTS

| | | | | |
|---|---|---|---|---|
| 8,341,599 | B1* | 12/2012 | Angalet | G06F 9/44505 717/104 |
| 9,652,204 | B2* | 5/2017 | Patankar | G06F 11/3604 |
| 2002/0188776 | A1* | 12/2002 | Houlberg | H04L 67/12 710/62 |
| 2005/0240834 | A1* | 10/2005 | Rowlan | G06F 11/27 714/47.1 |
| 2008/0174472 | A1* | 7/2008 | Stone | G08G 5/0021 342/30 |
| 2009/0083734 | A1* | 3/2009 | Hotra | G06F 21/51 718/1 |
| 2010/0287545 | A1* | 11/2010 | Corbefin | G06F 9/44584 717/174 |
| 2013/0013116 | A1* | 1/2013 | Mancuso | B64D 15/166 700/275 |
| 2013/0031543 | A1* | 1/2013 | Angus | G06F 9/45558 718/1 |
| 2013/0247025 | A1* | 9/2013 | Barberet | G06F 8/65 717/173 |
| 2013/0305391 | A1* | 11/2013 | Haukom | G06F 21/84 726/29 |

(Continued)

*Primary Examiner* — Henry Tsai
*Assistant Examiner* — Christopher A Daley
(74) *Attorney, Agent, or Firm* — Winstead PC

(57) ABSTRACT

A method of generating data outputs as instructed by a configuration file on a computer system for an aircraft includes processing, as instructed by one or more parameters of the configuration file, data from a first data source. In some embodiments, the first data source comprises either a sensor associated with the aircraft or an addressable memory. In some embodiments, the one or more parameters comprise instructions for using one or more certified functions. The method also includes outputting the processed data to at least one of the addressable memory, a display, and an external device.

18 Claims, 12 Drawing Sheets

(56) References Cited

U.S. PATENT DOCUMENTS

| | | | |
|---|---|---|---|
| 2015/0163286 A1* | 6/2015 | Wen | H04L 41/0816 709/203 |
| 2015/0259074 A1* | 9/2015 | Guillemaut | B64D 27/20 244/54 |
| 2016/0125218 A1* | 5/2016 | Deppieri | G06K 7/1473 235/454 |
| 2017/0187539 A1* | 6/2017 | Thompson | H04W 12/08 |
| 2017/0287239 A1* | 10/2017 | Levy | G06Q 10/20 |

* cited by examiner

METHOD FOR CUSTOMIZING SOFTWARE FUNCTIONALITY WITH A CONFIGURATION FILE

CROSS-REFERENCE TO RELATED APPLICATIONS

This application claims priority to and incorporates by reference the entire disclosure of U.S. Provisional Patent Application No. 62/211,238 filed on Aug. 28, 2015.

FIELD OF THE INVENTION

The present invention relates generally to the field of customizable flight instrumentation systems and more particularly to, but not by way of limitation, a method and apparatus that utilizes a configuration file to define customized, user-generated outputs for flight instrumentation systems.

BACKGROUND

This section provides background information to facilitate a better understanding of the various embodiments of the disclosure. It should be understood that the statements in this section of this document are to be read in this light, and not as admissions of prior art.

Generally, an Integrated Display Unit ("IDU") is part of a complete flight and navigation instrumentation system that intuitively provides information to a pilot via computer generated screen displays. The IDUs may be configured as, for example, a Primary Flight Display ("PFD"), such as, for example a three-dimensional, enhanced situational awareness PFD; a Multi-Function Display ("MFD") that can be configured to show a moving map, an HSI, traffic, terrain, weather displays, reversionary PFD or reversionary Engine Display; or an Engine Display. An instrumentation system may comprise various discrete digital sensor modules that communicate with the IDU via RS-232, RS-422 or ARINC 429 serial data. Each IDU incorporates a screen to display information to the pilot. For example, the IDU may comprise a high-brightness AMLCD screen, bezel keys, a screen and keyboard lighting intensity control, rotary selector and enter switches, a central processing unit, numerous RS-232, RS-422 and ARINC 429 receive and transmit ports, and discrete input/output ("I/O") ports.

IDUs typically include preconfigured software that includes a fixed, preset library of functions or instructions to perform various operations. For example, an IDU may include functions that display information about an aircraft's altitude, location, attitude, and the like. If a user desires additional functionality beyond what was included in the preset library of functions, the user is required to find an alternative device that includes the desired functionality or is required to have new software written for the device. If new software is written for the device, the new software must be submitted to the Federal Aviation Administration (FAA) to be certified for use. Submitting new software to the FAA for each new iteration of the software costs time and money. In some circumstances, a user may not have the time or money to wait for the new software to become certified for use.

SUMMARY

The present invention allows a user of a flight information system to revise, update, and/or add to the outputs and capabilities made available by the flight information system without the need to seek recertification of the underlying software and hardware from the FAA. In a typical embodiment, this is accomplished through the use of a configuration file that utilizes functions that have been previously certified by the FAA. In a typical embodiment, the configuration file includes one or more parameters that may be generated after the certification process has been completed. Customization of the parameters of the configuration file enables the flight information system to have new capabilities that were not available at the time the underlying software of the flight information system was certified.

In a typical embodiment, the present invention includes an IDU in communication with one or more sensors distributed throughout an aircraft (e.g., a helicopter or airplane). The IDU includes a central processing unit, non-volatile memory, volatile memory, communication ports, and may include a display. The IDU further comprises a configuration file that defines how messages received by the IDU are processed. In a typical embodiment, the configuration file of the present invention is written in human-readable format and comprises: parameters for interpreting input words or messages that follow predefined patterns (for example, ARINC 429 MIL-STD-1553 or National Marine Electronics Association ("NMEA") formatted messages; parameters for generating caution/advisory system ("CAS") messages; and parameters for generating display symbols either on distinct custom pages or overlayed on existing pages generated by underlying software. In other embodiments the IDU can further include various inputs, such as, for example, bezel keys, a screen and keyboard lighting intensity control, rotary selector and enter switches.

A method of generating data outputs as instructed by a configuration file on a computer system for an aircraft includes processing, as instructed by one or more parameters of the configuration file, data from a first data source. In some embodiments, the first data source comprises either a sensor associated with the aircraft or an addressable memory. In some embodiments, the one or more parameters comprise instructions for using one or more certified functions. The method also includes outputting the processed data to at least one of the addressable memory, a display, and an external device.

An instrumentation system for an aircraft includes an information display unit that includes a central processing unit (CPU) adapted to carry out instructions for the instrumentation system, an addressable memory in communication with the CPU and adapted to store data from at least one sensor associated with the aircraft and data generated by the instrumentation system, and at least one communication port in communication with the at least one sensor associated with the aircraft and the CPU via a communications link. The information display unit is operable to implement a method that includes: processing, as instructed by one or more parameters of a configuration file, data from a first data source, wherein the first data source comprises either a sensor associated with the aircraft or an addressable memory and wherein the one or more parameters comprise instructions for using one or more certified functions; and outputting the processed data to at least one of the addressable memory, a display, and an external device.

This summary is provided to introduce a selection of concepts that are further described below in the detailed description. This summary is not intended to identify key or essential features of the claimed subject matter, nor is it intended to be used as an aid in limiting the scope of claimed subject matter. Although the description of the systems and methods herein often makes reference to using the systems and methods with aircraft, it should be understood that the systems and methods may be used in other contexts as well. For example, the concepts described herein may be applied to other systems and methods that include a certification process prior to use of the systems and methods.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
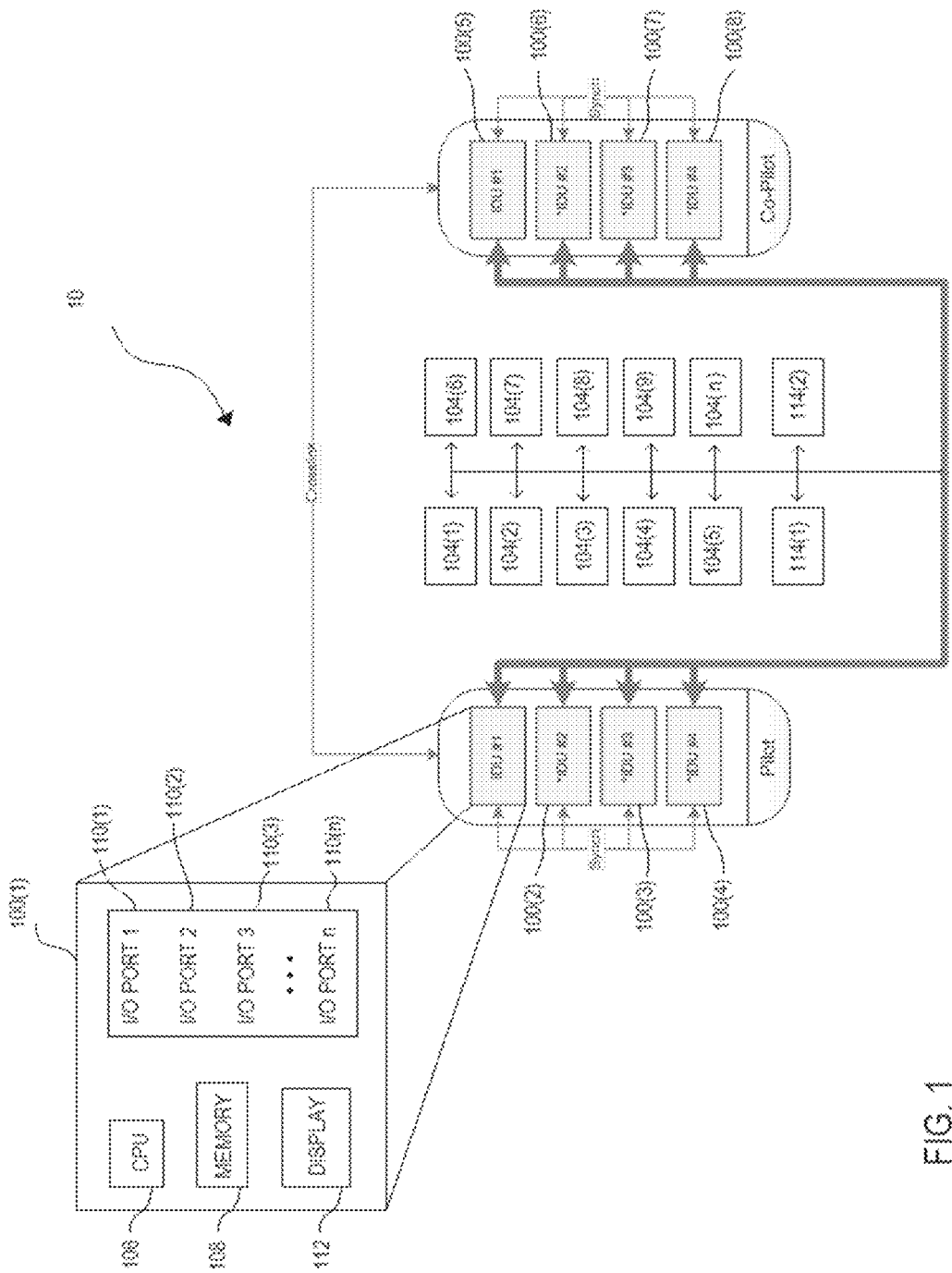
FIG. 1 is a system diagram of an instrumentation system according to one or more embodiments of the disclosure.

It is to be understood that the following disclosure provides many different embodiments and examples for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Referring now to FIG. 1, a system diagram of an instrumentation system 10 according to one or more embodiments of the disclosure is shown. The instrumentation system 10 comprises an IDU 100, a communications link 102, and sensors 104. As shown in FIG. 1, the instrumentation system 10 may include multiple IDUs 100. For example, IDUs 100(1)-(4) may be set up for a pilot, and multiple IDUs 100(5)-(8) may be set up for a co-pilot. Each IDU 100 comprises a central processing unit (CPU) 106, memory 108, and communication ports 110. Each IDU 100 optionally comprises a display 112. The instrumentation system 10 may include multiple sandboxes 114. FIG. 1 shows a sandbox 114(1) and a sandbox 114(2). In a typical embodiment, the sandbox 114 is a general purpose analog and discrete I/O device that can be connected to the IDU 100. The instrumentation system 10 may include up to 8 sandboxes 114 (1)-(8) as desired. Each sandbox 114 can monitor 40 discrete input pins and provide 12 discrete and 8 DC analog output pins, thus enabling the instrumentation system 10 the flexibility to be in communication with a large number of devices that output and/or receive data (e.g., sensors, communication systems, computer systems, and the like).

In a typical embodiment, the sensors 104 may comprise one or more of the following sensor types: global positioning sensor (GPS), Air Data Computer (ADC), Attitude Heading Reference System (AHRS), Datalink/Automatic Dependent Surveillance-Broadcast (ADS-B), WX-500, Analog Interface, Traffic Sensor, Remote Tune Radios, Video, Remote Bugs Panel, Digital Autopilot, Airframe/Engine Data, Weather Radar, Mode S Transponder, and Fuel Flow/Quantity. Other sensors may be incorporated into the instrumentation system 10 as desired.

In a typical embodiment, the CPU 106 carries out instructions for the instrumentation system 10, such as, for example, controlling I/O operations, logical operations, and arithmetic operations. The CPU 106 communicates with the memory 108, which stores, for example, data collected from the sensors 104 and/or data output by the instrumentation system 10. The memory 108 can comprise both non-volatile and volatile memory types. Each IDU 100 includes a communication port 110, and typically includes multiple communication ports 110. For example, as shown in FIG. 1, the IDU 100 may include communication ports **110(1)-(*n*). In a typical embodiment, one or more of the communication ports 110 communicate with the sensors 104 through the communications link 102**.

Figure 2:
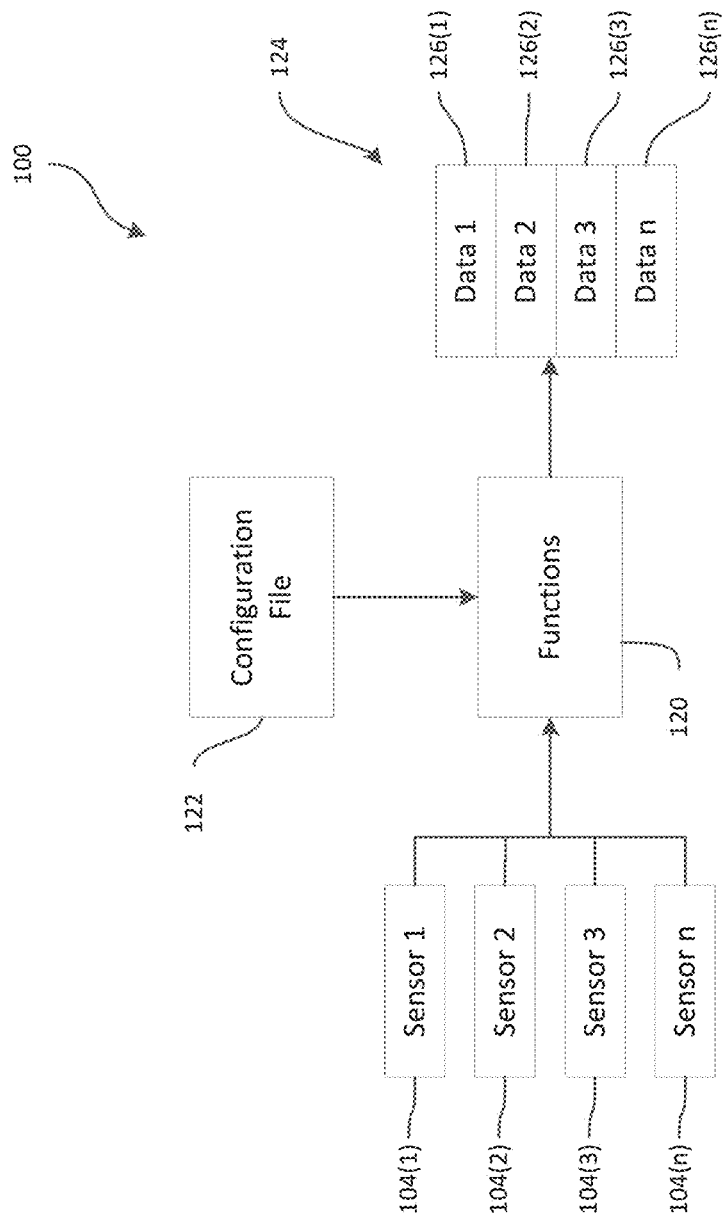
FIG. 2 is a flow diagram illustrating data flow within an instrumentation system according to one or more embodiments of the disclosure.

Referring now to FIG. 2, a flow diagram illustrating data flow within an IDU 100 according to one or more embodiments of the disclosure is shown. The IDU 100 comprises functions 120, a configuration file 122, and an addressable memory 124. The functions 120 may be comprised of software and/or hardware, and are representative of one or more sets of instructions that define one or more functions that may be called by the configuration file 122. In a typical embodiment, the functions 120 are a part of software and/or hardware that is certified by, for example, the FAA prior to being used. In a typical embodiment, once the functions 120 are certified the functions 120 cannot be changed without undergoing recertification. In a typical embodiment, the configuration file 122 includes parameters that identify: which functions 120 to call; one or more memory locations of data to be used; and other parameters the functions 120 should use. In some embodiments, the parameters from the configuration file 122 are passed to the functions 120 during an initialization at a startup of the IDU 100.

During operation of the IDU 100, some of the functions 120 are operable to write outputs to the addressable memory 124. In a typical embodiment, the functions 120 comprise instructions for: interpreting data from sensors 104 and loading values derived from the interpreted data into the addressable memory 124 (e.g., see FIG. 2 and related discussion); taking data from the addressable memory 124, performing mathematical operations on the data, and loading the results from the mathematical operations into the addressable memory 124 (e.g., see FIG. 3 and related discussion); taking data from the addressable memory 124, formatting the data, and outputting the data on I/O Ports (e.g., **110(1)-(*n*)**) for use by external devices such as sensors 104 (e.g., see FIG. 4 and related discussion); taking data from the addressable memory 124, formatting the data, and writing the data to non-volatile memory 128 (e.g., see FIG. 5 and related discussion); taking data from the addressable memory 124, performing validities, formatting the data, and displaying the data in human-readable form on the display 112 (e.g., see FIGS. 6 and 7 and related discussion).

In contrast to the functions 120, the configuration file 122 may be changed by a user as desired to create new parameters. The functions 120, on the other hand, comprise instructions that define the various functions within the functions 120 that may be manipulated by the parameters of the configuration file 122.

Configuration File

In a typical embodiment, the configuration file 122 comprises a name for the configuration to allow a user to determine whether or not the configuration file 122 has been loaded at startup of the instrumentation system 10. This practice provides a visual indication that the correct configuration file 122 has been loaded. The configuration file 122 further comprises information regarding the format of information that is output to the display 112. For example, the display 112 can take on a variety of aspect ratios and resolutions. For example, the display 112 may comprise display ratios of 5:4, 6:8, 9:16, 10:16, and the like. Depending on the aspect ratio of the display 112, the configuration file 122 may include instructions to display an Engine Instrument and Crew Alerting System ("EICAS") page full-time in a NORMAL mode, which may be used, for example, with a 6:8 aspect ratio display.

In a typical embodiment, the configuration file 122 further comprises parameters that define how messages or "words" from sensors 104 are processed, which processing enables the functions 120 to make use of the messages. Parameters within the configuration file 122 may comprise values used by instructions within the functions 120, and may further comprise information about which instructions to use. For example, the configuration file 122 may include parameters that define an output of a line. The equation for a line is generally defined as:

$$y = mx + b$$

The configuration file 122 may parameterize the above equation as follows:

1. Acquire value 'x' and place into data 126(1) of addressable memory 124 using a DATA ACQUISITION function, which DATA ACQUISITION function is defined within the functions 120. The configuration file 122 includes a parameter specifying the DATA ACQUISITION function, the parameters used by the DATA ACQUISITION function, and the location of the value 'x' in the addressable memory 124.
2. Place a value 'm' into data 126(2) of addressable memory 124 using an EQUAL function, which EQUAL function is defined within the functions 120. The configuration file 122 includes parameters specifying the EQUAL function, the value 'm', and the location of the value 'm' in the addressable memory 124.
3. Place a value 'b' into data 126(3) using the EQUAL function. The configuration file 122 includes parameters specifying the EQUAL function, the value 'b', and the location of the value 'b' in the addressable memory 124.
4. Retrieve the value 'm' and the value 'x' from data 126(2) and 126(1), respectively, and place the value of the product of 'mx' into data 126(4) using MULTIPLY function, which MULTIPLY function is defined in the functions 120. The configuration file 122 includes parameters specifying the MULTIPLY function, and the locations of the values 'm,' 'x,' and 'mx' in the addressable memory 124.
5. Retrieve the value 'mx' and 'b' from data 126(4) and 126(3), respectively, and place the sum 'y' into data 126(5) using the ADD function, which ADD function is defined in the functions 120. The configuration file 122 includes parameters specifying the ADD function, and the locations of the value 'mx,' 'b,' and 'y' in the addressable memory 124.

Figure 8A:
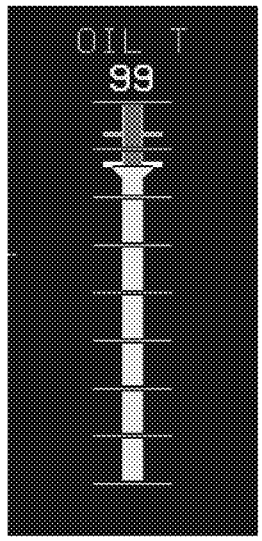
FIGS. 8(*a*)-8(*x*) illustrate exemplary symbology or display elements for use with an instrumentation system according to one or more embodiments of the disclosure.
Figure 8B:
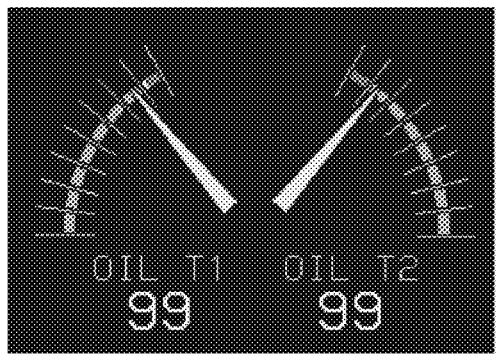
Figure 8C:
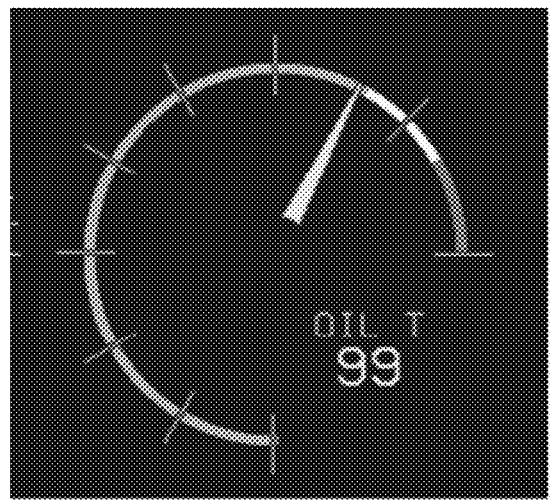
Figure 8D:
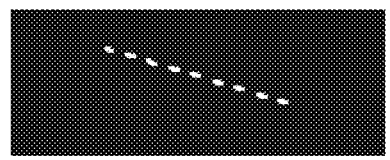
Figure 8E:
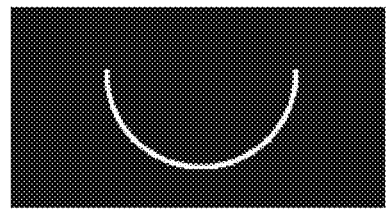
Figure 8F:
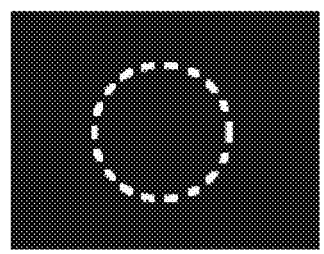
Figure 8G:
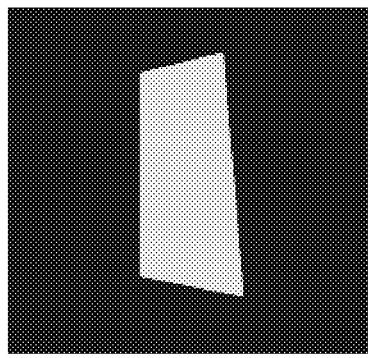
Figure 8H:
Figure 8I:
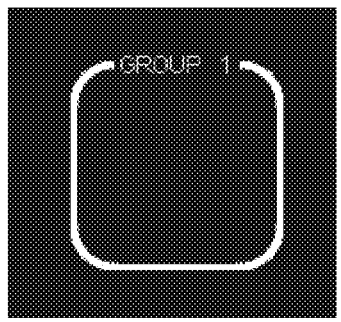
Figure 8J:
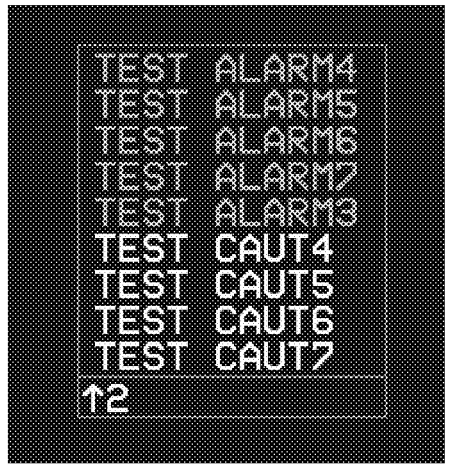
Figure 8K:
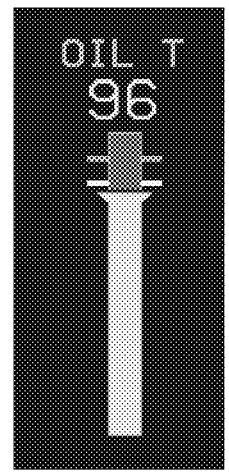
Figure 8L:
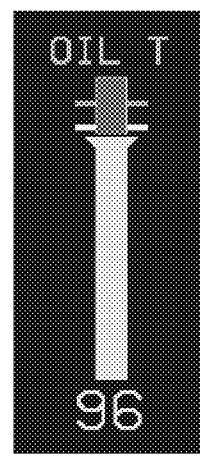
Figure 8M:
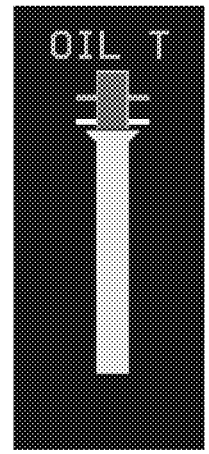
Figure 8N:
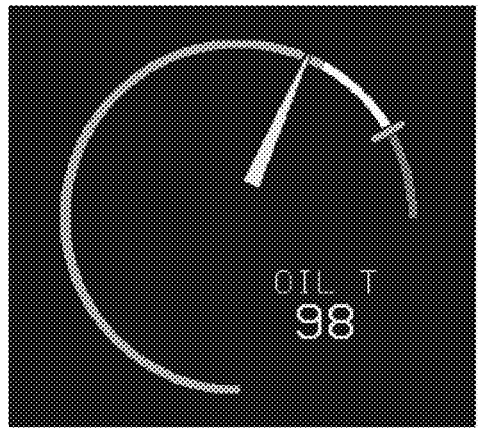
Figure 8Q:
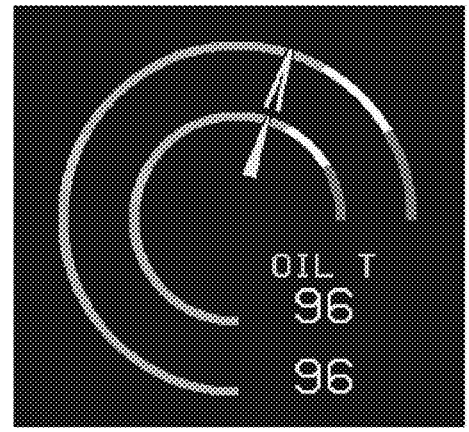
Figure 8O:
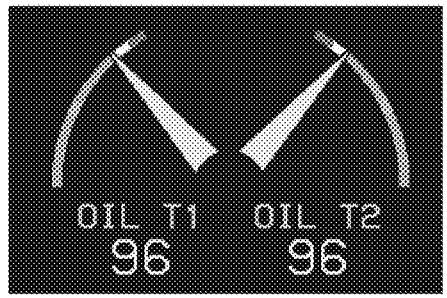
Figure 8R:
Figure 8P:
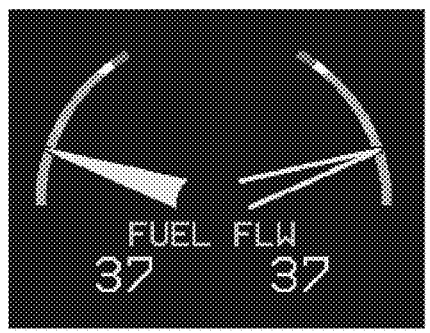
Figure 8S:
Figure 8T:
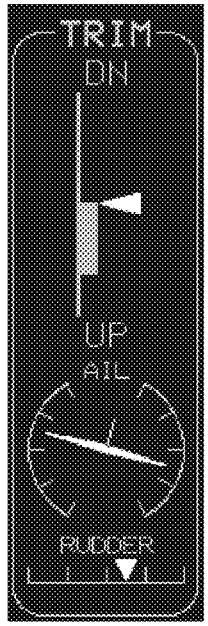
Figure 8V:
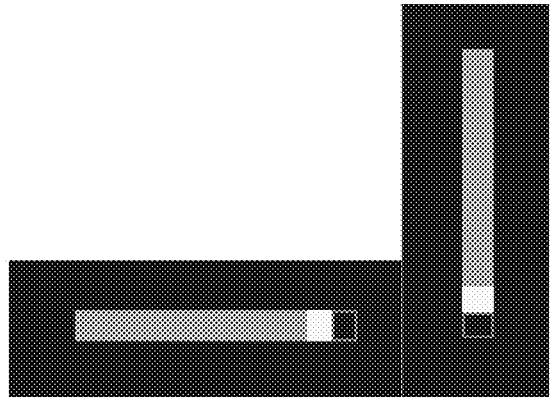
Figure 8W:
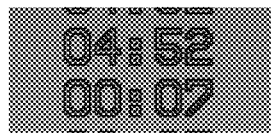
Figure 8X:
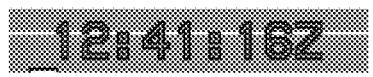

In another embodiment, the configuration file 122 may comprise parameters that define how ARINC 429 messages are processed for use with the functions 120. The configuration file 122 may include parameters regarding generation of custom CAS messages 127. The configuration file 122 may further include overlay page parameters that define standard symbology elements that can be combined to create displays that overlay, for example, on a pre-existing screen or a PFD page (e.g., see FIG. 9). Exemplary symobology elements are illustrated in FIGS. 8(a)-8(x). In a typical embodiment, symbology elements are examples of functions included in the functions 120. The configuration file 122 may include display page parameters that define standard symbology elements that can be combined to create stand-alone displays that can be accessed through a menu system (e.g., see FIG. 9). Each of these parameter types are discussed in more detail below.

Referring still to FIG. 2, the addressable memory 124 is populated with data pursuant to parameters contained within the configuration file 122. The addressable memory 124 comprises data from various sources. In a typical embodiment, the data in addressable memory 124 comprises: data placed into memory 108 using sensor data functions defined in the functions 120, and modifiable by parameters in the configuration file 122 (e.g., see FIG. 2 and related discussion); data placed in memory 108 using prior art sensor data functions such as traditional data 109 (i.e., not modifiable by the configuration file 122); and data placed in memory 108 using mathematical operation functions defined by the functions 120 and modifiable by the configuration file 122 (e.g., see FIG. 3 and related discussion). In some embodiments, the addressable memory 124 resides within the memory 108. In another embodiment, the addressable memory 124 comprises unique memory that is separate from memory 108. The addressable memory 124 may comprise volatile and/or non-volatile memory.

In some embodiments, the memory 108 stores traditional data 109(1)-(n). Traditional data 109 is differentiated from data 126 stored in addressable memory 124 in that traditional data 109 is acquired via methods taught in the prior art. In some embodiments, to enable use with the IDU 100, the traditional data 109(1)-(n) is processed by the functions 120 and written as new data amongst data 126(1)-(n) stored in the addressable memory 124. Traditional data 109 may comprise, for example, data received directly from sensors 104. After traditional data 109 has been processed by the functions 120, it is available for use as needed by any of the functions defined within the functions 120.

Data from one or more sensors 104 may be communicated to the IDU 100 via the communications link 102. Multiple types of sensors 104(1)-(n) can be implemented in an aircraft. For example, sensor types may include: global positioning sensors (GPS), Air Data Computer (ADC), Attitude Heading Reference System (AHRS), Datalink/Automatic Dependent Surveillance-Broadcast (ADS-B), WX-500, Analog Interface, Traffic Sensor, Remote Tune Radios, Video, Remote Bugs Panel, Digital Autopilot, Airframe/Engine Data, Weather Radar, Mode S Transponder, and Fuel Flow/Quantity.

In some embodiments, sensors 104 communicate with the IDU 100 by sending messages or "words." For example, a sensor sending a message encoded using the ARINC 429 standard sends a word in the form of a 32-bit message string to the IDU 100. The functions 120 interpret and format the message based upon parameters that were passed to the functions 120 by the configuration file 122 at initialization. For example, the configuration file 122 may instruct the functions 120 to treat a received word from a particular sensor 104 as a bitfield, binary numeric representation ("BNR"), or binary coded decimal ("BCD"). In a typical embodiment, the configuration file 122 further determines filtering, normalization, timeout, and miscompare logic associated with the received word. After the received word has been interpreted by the functions 120, the functions 120 output the result to a defined address among data 126(1)-(n) of the addressable memory 124. The defined address among data 126(1)-(n) is specified by the configuration file 122. Utilizing a defined address standardizes location for specific pieces of data, which allows the configuration file 122 to define customizations to the functions 120 because it is known where specific pieces of data are stored within the addressable memory 124.

ARINC 429 Parameters

The instrumentation system 10 may be, in some embodiments, driven by ARINC 429 words received on the one or more of ports 110(1)-(n). For example, instrumentation system 10 may include Ports 110(1)-(42), which ports are available for configuration. These ports may map as follows:

TABLE 1

| Port Configuration | IDU-3 Port | IDU-450/680 Port |
|---|---|---|
| Port 1 | COM1* | COM1* |
| Port 2 | COM2* | COM2* |
| Port 3 | COM3* | COM3* |

TABLE 1-continued

| Port Configuration | IDU-3 Port | IDU-450/680 Port |
|---|---|---|
| Port 4 | COM4* | COM4* |
| Port 5 | COM5* | COM5* |
| Port 6 | COM6* | COM6* |
| Port 7 | COM7* | COM7* |
| Port 8 | COM8* | COM8* |
| Port 9 | COM9* | COM9* |
| Port 10 | COM10* | COM10* |
| Port 11 | COM11* | COM11* |
| Port 12 | COM12* | COM12* |
| Port 13 | COM13* | COM13* |
| Port 14 | COM14* | COM14* |
| Port 15 | COM15* | COM15* |
| Port 16 | COM16* | COM16* |
| Port 17 | COM17* | COM17* |
| Port 18 | COM18* | COM18* |
| Port 19 | COM19* | COM19* |
| Port 20 | COM20* | COM20* |
| Port 21 | COM21 | COM21 |
| Port 22 | COM22 | COM22 |
| Port 23 | COM23 | COM23 |
| Port 24 | COM24 | COM24 |
| Port 25 | COM25 | COM25 |
| Port 26 | COM26 | COM26 |
| Port 27 | COM27 | COM27 |
| Port 28 | COM28 | COM28 |
| Port 29 | Not Available | COM29 |
| Port 30 | Not Available | COM30 |
| Port 31 | Not Available | COM31 |
| Port 32 | Not Available | COM32 |
| Port 33 | Not Available | COM33* |
| Port 34 | Not Available | COM34* |
| Port 35 | Not Available | COM35* |
| Port 36 | Not Available | COM36* |
| Port 37 | Memory Only | Memory Only |
| Port 38 | Memory Only | Memory Only |
| Port 39 | Not Available | AEM Port #1 |
| Port 40 | Not Available | AEM Port #2 |
| Port 41 | Not Available | AEM Port #3 |
| Port 42 | Not Available | AEM Port #4 |

* = RS-232/422 ports that populate ARINC429 labels based upon conversion functions.

On each port, octal labels 0 through 377 are available for configuration. Configuration of an individual octal label may comprise of the following:

TABLE 2

| Parameter | Choices | Notes |
|---|---|---|
| Label Type | BCD<br>BNR<br>DDW<br>MATH_ADD<br>MATH_CONSTANT<br>MATH_DIFFERENCE<br>MATH_DIVIDE<br>MATH_MULTIPLY<br>MATH_SUBTRACT<br>MATH_ACOS_DEG<br>MATH_ACOS_RAD<br>MATH_ASIN_DEG<br>MATH_ASIN_RAD<br>MATH_ATAN_DEG<br>MATH_ATAN_RAD<br>MATH_ATAN2_DEG<br>MATH_ATAN2_RAD<br>MATH_CEIL<br>MATH_COS_DEG<br>MATH_COS_RAD<br>MATH_EXP<br>MATH_FABS<br>MATH_FLOOR<br>MATH_FMOD | Reference ARINC 429 standard. Numeric data is transmitted as binary-coded decimal (BCD) or binary numeric representation (BNR) words. Discrete data is transmitted as discrete data words (DDW). The type of word influences how SSM bits are interpreted.<br><br>Label Type MATH_* are special scratchpad types that allow unused labels to perform mathematical functions and hold the result in memory for use as a normal ARINC 429 BNR label. These can be setup on any port, including dummy ports 37 and 38.<br><br>Label Type TMR_COUNT_* are special scratchpad types that allow unused labels to perform timer functions and hold the result in memory for use as a normal ARINC |

TABLE 2-continued

| Parameter | Choices | Notes |
| --- | --- | --- |
| | MATH_LOG<br>MATH_LOG10<br>MATH_LOG2<br>MATH_MAX<br>MATH_MIN<br>MATH_POW<br>MATH_SIN_DEG<br>MATH_SIN_RAD<br>MATH_SQRT<br>MATH_TAN_DEG<br>MATH_TAN_RAD<br>MATH_NORMALIZE<br>MATH_SWITCH<br>TMR_COUNT_DOWN<br>TMR_COUNT_UP | 429 BNR label. These can be setup on any port, including dummy ports 37 and 38. |
| Fuel Type | Not Fuel<br>Primary Port for Fuel Flow 1<br>Primary Port for Fuel Flow 2<br>Primary Port for Fuel Flow 3<br>Primary Port for Fuel Flow 4<br>Primary Port for Fuel Flow 5<br>Primary Port for Fuel Flow 6<br>Primary Port for Fuel Level 1<br>Primary Port for Fuel Level 2<br>Primary Port for Fuel Level 3<br>Primary Port for Fuel Level 4<br>Primary Port for Fuel Level 5<br>Primary Port for Fuel Level 6<br>Primary Port for Fuel Level 7<br>Primary Port for Fuel Level 8<br>Secondary Port for Fuel Flow 1<br>Secondary Port for Fuel Flow 2<br>Secondary Port for Fuel Flow 3<br>Secondary Port for Fuel Flow 4<br>Secondary Port for Fuel Flow 5<br>Secondary Port for Fuel Flow 6<br>Secondary Port for Fuel Level 1<br>Secondary Port for Fuel Level 2<br>Secondary Port for Fuel Level 3<br>Secondary Port for Fuel Level 4<br>Secondary Port for Fuel Level 5<br>Secondary Port for Fuel Level 6<br>Secondary Port for Fuel Level 7<br>Secondary Port for Fuel Level 8 | This designation is used so that data associated with the word is mapped into the standard EFIS fuel system functions correctly. Fuel Flow X refers to fuel flow for engine #X. Fuel Level Y refers to fuel level for tank #Y. |
| BCD Digit LSB | Numeric Value | LSB position in the ARINC word for a BCD digit (between 9 and 29) |
| BCD Digit Bits | Numeric Value | Number of bits consumed by a BCD digit (between 1 and 4) |
| BCD Digit Multiplier | Numeric Value | BCD digit multiplier. Note that a BCD end value can include of up to 8 digits. Each digit is decoded in binary, multiplied by its multiplier and then summed with the other digits to create the final value. |
| BNR Word Valid Range | Numeric value | Maximum representable range for the BNR word. This should match the value in the "Range (Scale)" column of Table 2 in the ARINC 429 standard. |
| BNR Word Significant Bits | Numeric Value | Significant bits of data for the BNR word. This should match the value in the "Sig Bits" column of Table 2 in the ARINC 429 standard. |
| BCD/BNR Word Coefficient | Numeric Value | For Fuel Type "Not Fuel", this is the coefficient to convert from ARINC 429 standard units for the BCD or BNR word into desired OASIS display units. ARINC 429 standard units are shown in the "Units" column of Table 2 in the ARINC 429 standard.<br>For Fuel Type "Fuel Flow *," the coefficient should convert to gallons per hour. The aircraft limits will then determine the final display units.<br>For Fuel Type "Fuel Tank *," this value works in conjunction with fuel |

TABLE 2-continued

| Parameter | Choices | Notes |
| --- | --- | --- |
| | | tank normalization to create a value in gallons. The aircraft limits then determine the final display units. . |
| BCD, BNR and MATH_NORMALIZE Word Maximum Value | Numeric Value | See normalization description below. |
| BCD, BNR and MATH_NORMALIZE Word Minimum Value | Numeric Value | See normalization description below. |
| BCD/BNR Word Filtering Coefficient | 1 to 1000 | BCD or BNR data can be filtered by the OASIS software by using an IIR single-pole filter. A value of one means that no filtering is performed. Higher values produce more filtering. The filter time constant depends upon this value combined with the update rate for the word. |
| BCD/BNR Word Nominal Update Rate | Numeric Value | This value is used to calculate a rate of change for the BCD or BNR data. This is the update rate in Hz at which data is expected. |
| BCD/BNR Word Rate Calculation Spread | 1 to 100 | This value is used to calculate a rate of change for the BCD or BNR data. This is the spacing of the samples used for the rate calculation. If this value is equal to the Nominal Update Rate, then the current reading would be compared to a reading from 1 second ago to calculate rate of change. |
| BCD/BNR Word Rate Filtering Coefficient | 1 to 1000 | The rate of change for the BCD or BNR data can be filtered by the OASIS software by using an IIR single-pole filter. A value of one means that no filtering is performed. Higher values produce more filtering. The filter time constant depends upon this value combined with the update rate for the word. |
| BCD/BNR/DDW Word Timeout | Numeric Value | This is the value, in seconds, that constitutes a timeout for the word. This is automatically setup as 2 seconds for MATH_* words. |
| BCD, BNR and MATH_NORMALIZE Word Normalization Type | 0 to 10 | See normalization description below. |
| BCD, BNR and MATH_NORMALIZE Word Normalization Input Values | Array of 9 Values | See normalization description below. |
| BCD, BNR and MATH_NORMALIZE Word Normalization Output Values | Array of 9 Values | See normalization description below. |
| Value 1 Label | Octal 0 to 377 | This is the ARINC429 label that contains Value 1 data for single and dual parameter MATH_* words. Label and Port must refer to a type BCD, BNR, MATH_* or TMR_* word. |
| Value 1 Primary Port | 1 to 42 | This is the primary OASIS COM Port for Value 1 data for single and dual parameter MATH_* words. |
| Value 1 Secondary Port | 1 to 42 | This is the secondary OASIS COM Port for Value 1 data for single and dual parameter MATH_* words. The secondary port must be different than the primary port. Setting up a secondary port is not required. |
| Value 1 Use Latched Value | ON or OFF | If ON, then the latched value (last value that indicated SSM of NO) is used. Otherwise, normal SSM and word timeout rules apply. |

TABLE 2-continued

| Parameter | Choices | Notes |
|---|---|---|
| Value 1 Use Rate Value | ON or OFF | If ON, then the rate value is used. Otherwise, normal SSM and word timeout rules apply. "Use Latched Value" takes precedence over "Use Rate Value" if both are ON. |
| Value 2 Label | Octal 0 to 377 | This is the ARINC429 label that contains Value 2 data for dual parameter MATH_* words. Label and Port must refer to a type BCD, BNR, MATH_* or TMR_* word. |
| Value 2 Primary Port | 1 to 42 | This is the primary OASIS COM Port for Value 2 data for dual parameter MATH_* words. |
| Value 2 Secondary Port | 1 to 42 | This is the secondary OASIS COM Port for Value 2 data for dual parameter MATH_* words. The secondary port must be different than the primary port. Setting up a secondary port is not required. |
| Value 2 Use Latched Value | ON or OFF | If ON, then the latched value (last value that indicated SSM of NO) is used. Otherwise, normal SSM and word timeout rules apply. |
| Value 2 Use Rate Value | ON or OFF | If ON, then the rate value is used. Otherwise, normal SSM and word timeout rules apply. "Use Latched Value" takes precedence over "Use Rate Value" if both are ON. |
| MATH_SWITCH CAS Index | See Notes | This is the CAS index that causes the output of the MATH_SWITCH type to switch from Value 1 to Value 2. Provide a positive number (base 1) to reference a custom CAS message. The custom CAS messages are numbered in the order in which they are defined in the configuration file. Provide a negative number (base 1) to reference an EFIS-defined CAS message. |
| MATH_CONSTANT Value | Numeric Value | This value is permanently held in memory for use by a MATH_CONSTANT word. |
| Timer Run CAS Index | See Notes | CAS index number. If the CAS is active, the timer runs. If the CAS is NORMAL (inactive), the timer stops. A TMR_COUNT_UP timer counts up from 0 while active. A TMR_COUNT_DOWN_timer counts down from the Countdown Timer Initialization Value while active. Provide a positive number (base 1) to reference a custom CAS message. The custom CAS messages are numbered in the order in which they are defined in the configuration file. Provide a negative number (base 1) to reference an EFIS-defined CAS message. |
| Timer Reset CAS Index | See Notes | CAS index number. The timer will reset while the CAS is active (not NORMAL). TMR_COUNT_DOWN timers reset to the Countdown Timer Initialization Value. TMR_COUNT_UP timers reset to 0. Provide a positive number (base 1) to reference a custom CAS message. The custom CAS messages are numbered in the order in which they are defined in the configuration file. Provide a negative number (base 1) to reference an EFIS-defined CAS message. |
| Countdown Timer Initialization Value | Numeric Value | Value in seconds. |

Value normalization is meant to correct for repeatable sensing errors and can be optionally implemented for BNR, BCD, and MATH_NORMALIZE label types. In a typical embodiment, there are 4 types of normalization: 1) No normalization; 2) Default normalization (specified input values normalized to equally spaced output values—"1D normalization"); 3) Optional normalization (specified input values normalized to specified output values—"2D normalization"); and 4) Fuel Tank normalization. In general, normalization is a process where data is received according to one scale and is output according to a different scale. For example, it may be desirable to convert the data from one scale to another for processing of the data.

In a typical embodiment, normalization parameters have the following effects depending upon the normalization type:

| Parameter | Effects |
|---|---|
| No Normalization | |
| MaximumValue | Maximum value allowed after coefficient multiplication. |
| Minimum Value | Minimum value allowed after coefficient multiplication. |
| Input Type | Not used. |
| Input Values | Not used. |
| Output Values | Not used. |
| Default Normalization | |
| Maximum Value | Maximum normalized output value. |
| Minimum Value | Minimum normalized output value. |
| Input Type | 0 = Use "Input Values" as normalization input array. |
| | 1 = Use Limits Curve 1* as normalization input array. |
| | 2 = Use Limits Curve 2* as normalization input array. |
| | 3 = Use Limits Curve 3* as normalization input array. |
| | 4 = Use Limits Curve 4* as normalization input array. |
| | 5 = Use Limits Curve 5* as normalization input array. |
| | 6 = Use Limits Curve 6* as normalization input array. |
| | 7 = Use Limits Curve 7* as normalization input array. |
| | 8 = Use Limits Curve 8* as normalization input array. |
| | 9 = Use Limits Curve 9* as normalization input array. |
| | 10 = Use Limits Curve 10* as normalization input array. |
| | The normalization input array represents the input values that correspond to the following output points: |
| | 1. Minimum Value |
| | 2. Minimum Value + .125 × (Maximum Value − Minimum Value) |
| | 3. Minimum Value + .250 × (Maximum Value − Minimum Value) |
| | 4. Minimum Value + .375 × (Maximum Value − Minimum Value) |
| | 5. Minimum Value + .500 × (Maximum Value − Minimum Value) |
| | 6. Minimum Value + .625 × (Maximum Value − Minimum Value) |
| | 7. Minimum Value + .750 × (Maximum Value − Minimum Value) |
| | 8. Minimum Value + .875 × (Maximum Value − Minimum Value) |
| | 9. Maximum Value |
| | The final output is the result of linearly interpolating between the above points. |
| Input Values | Array of 9 input values that are used for Input Type 0. |
| Output Values | Not used. |
| Optional Normalization | |
| Maximum Value | Not used. |
| Minimum Value | Not used. |
| Input Type | 0 = Use "Input Values" as normalization input array. |
| | 1 = Use Limits Curve 1* as normalization input array. |
| | 2 = Use Limits Curve 2* as normalization input array. |
| | 3 = Use Limits Curve 3* as normalization input array. |
| | 4 = Use Limits Curve 4* as normalization input array. |
| | 5 = Use Limits Curve 5* as normalization input array. |
| | 6 = Use Limits Curve 6* as normalization input array. |
| | 7 = Use Limits Curve 7* as normalization input array. |
| | 8 = Use Limits Curve 8* as normalization input array. |
| | 9 = Use Limits Curve 9* as normalization input array. |
| | 10 = Use Limits Curve 10* as normalization input array. |
| | The normalization input array represents the input values that correspond to the array of output values. The final output is the result of linearly interpolating between the output values. |
| Input Values | Array of 9 input values that are used for Input Type 0. |
| Output Values | Array of 9 output values. |
| Fuel Tank Normalization | |
| Maximum Value | Not used. |
| Minimum Value | Not used. |
| Input Type | Not used. |
| Input Values | Not used. |
| Output Values | Not used. |

In a typical embodiment, Math scratchpad words operate as follows:

| Word Type | Operation |
|---|---|
| MATH_ADD | Scratchpad that adds two values |
| MATH_CONSTANT | Scratchpad that holds a constant value |
| MATH_DIFFERENCE | Scratchpad that gives the absolute difference between two values |
| MATH_DIVIDE | Scratchpad that divides a first value by a second value |
| MATH_MULTIPLY | Scratchpad that multiplies two values |
| MATH_SUBTRACT | Scratchpad that subtracts a second value from a first value |
| MATH_ACOS_DEG | Scratchpad that gives acos(value) in degrees |

-continued

| Word Type | Operation |
|---|---|
| MATH_ACOS_RAD | Scratchpad that gives acos(value) in radians |
| MATH_ASIN_DEG | Scratchpad that gives asin(value) in degrees |
| MATH_ASIN_RAD | Scratchpad that gives asin(value) in radians |
| MATH_ATAN_DEG | Scratchpad that gives atan(value) in degrees |
| MATH_ATAN_RAD | Scratchpad that gives atan(value) in radians |
| MATH_ATAN2_DEG | Scratchpad that gives atan2(first value, second value) in degrees |
| MATH_ATAN2_RAD | Scratchpad that gives atan2(first value, second value) in radians |
| MATH_CEIL | Scratchpad that gives ceil(value) |
| MATH_COS_DEG | Scratchpad that gives cos(value) in degrees |
| MATH_COS_RAD | Scratchpad that gives cos(value) in radians |
| MATH_EXP | Scratchpad that gives exp(value) |
| MATH_FABS | Scratchpad that gives fabs(value) |
| MATH_FLOOR | Scratchpad that gives floor(value) |
| MATH_FMOD | Scratchpad that gives fmod(first value, second value) |
| MATH_LOG | Scratchpad that gives log(value) |
| MATH_LOG10 | Scratchpad that gives log10(value) |
| MATH_LOG2 | Scratchpad that gives log2(value) |
| MATH_MAX | Scratchpad that gives max(first value, second value) |
| MATH_MIN | Scratchpad that gives min(first value, second value) |
| MATH_POW | Scratchpad that gives pow(first value, second value) |
| MATH_SIN_DEG | Scratchpad that gives sin(value) in degrees |
| MATH_SIN_RAD | Scratchpad that gives sin(value) in radians |
| MATH_SQRT | Scratchpad that gives sqrt(value) |
| MATH_TAN_DEG | Scratchpad that gives tan(value) in degrees |
| MATH_TAN_RAD | Scratchpad that gives tan(value) in radians |
| MATH_NORMALIZE | Applies unique normalization to a value |
| MATH_SWITCH | Conditionally switches between two values |

Physical ARINC429 ports operate directly upon ARINC429 words received from external devices or upon MATH_* words making use of the allocated memory space. In addition to the physical ARINC429 ports, data is accessible from RS-232/422 ports via conversion functions and from memory-only traditional data ports.

In some embodiments, the instrumentation system 10 can drive CAS messages 127 and symbology elements from either a single source or a primary and secondary source. When primary and secondary sources are defined, they can either be selectable by a discrete input or by a menu.

Parameter condition may be determined as follows, "Within Range" means parameter is <=Maximum Value AND>=Minimum Value. "Out of Range" means parameter is >Maximum Value OR<Minimum Value:

TABLE 3

| Parameter Condition | Definition |
|---|---|
| Normal Operation | Selected Source has SSM = Normal Operation and Parameter Value within Range |
| Test | Selected Source has SSM = Test, Parameter Value within Range and Ground Mode Active |
| No Computed Data | Selected Source has SSM = No Computed Data OR Selected Source has SSM = Normal Operation but Parameter Value out of Range OR Selected Source has SSM = Test and Air Mode Active OR Selected Source has SSM = Test and Ground Mode Active but Parameter Value out of Range |
| Failure Warning | Selected Source has SSM = Failure Warning OR Selected Source not fresh (Word Timeout Exceeded) |

In some embodiments, RS-232/422 ports can populate the ARINC429 label structure using conversion functions. When a port is setup to use a conversion function, the communication parameters associated with the conversion function override the default parameters for the port. Port setup for a conversion function may comprise:

TABLE 4

| Parameter | Choices | Notes |
|---|---|---|
| OASIS Port | Valid RS-232 or 422 port number from the mapping table. | |
| Conversion Type | PT6T-9 for Bell 412EP | Other conversion function to be defined in the future as needed. |

Figure 3:
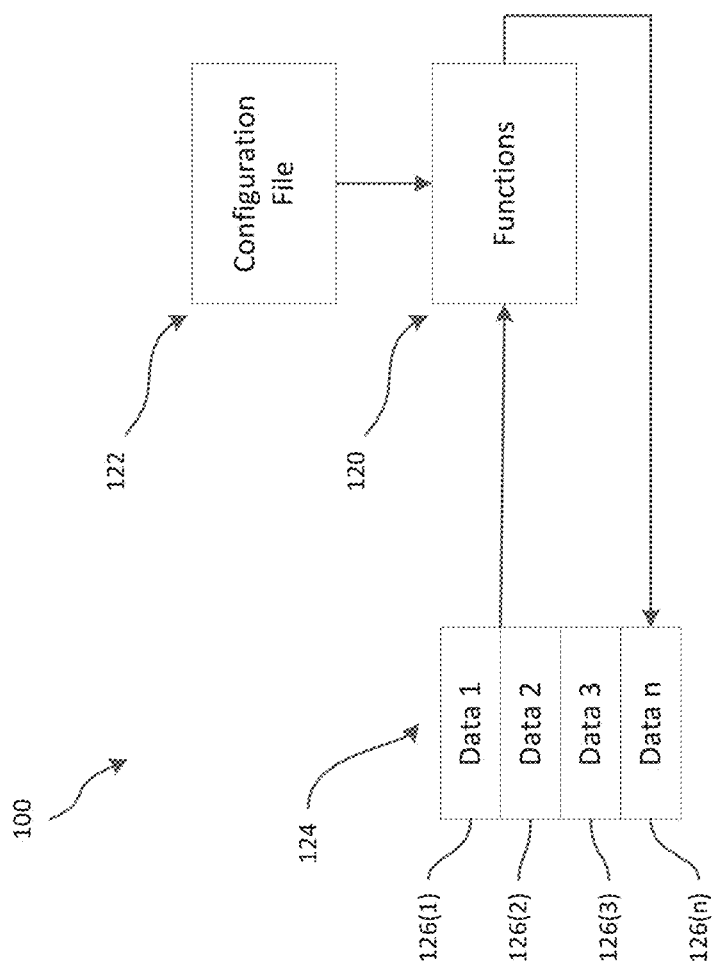
FIG. 3 is a flow diagram illustrating data flow within an instrumentation system according to one or more embodiments of the disclosure.

Referring now to FIG. 3, a flow diagram illustrating data flow within an IDU 100 according to one or more embodiments of the disclosure is shown. In addition to receiving data from sensors 104, the instrumentation system 10 can also compute new information based upon data 126(1)-(n) stored in addressable memory 124. Computed new information can be created by combining and/or iterating mathematical operations defined within the functions 120. Customized mathematical operations can be defined within the configuration file 122. For example, the functions 120 may comprise a set of independent mathematic functions like the ability to add, subtract, multiply, or divide two values relative to one another. By combining these mathematical functions of the functions 120, the configuration file 122 can define more complicated functions (e.g., see example above for determining the equation of a line). As a simplified example, if the functions 120 lacked a predefined function to calculate an average of two data values, the configuration file 122 could include parameters to calculate an average based upon the MATH_ADD and MATH_DIVIDE functions that are defined in the functions 120. An average could be calculated in the following manner:

MATH_ADD (Data1+Data2)=Data3

MATH_CONSTANT (Data4)=2

MATH_DIVIDE (Data3/Data4)=Data5

The new outputs (i.e., Data3, Data4, Data5) are written into the addressable memory 124. The configuration file 122 enables a user to create customizable outputs that are not intrinsically provided by the functions 120. A person of skill in the art will appreciate that by providing a variety of robust functions within the functions 120, the configuration file 122 can be written to generate just about any type of output that the user desires without any modification of the functions 120. Output types include calculations of numerical data that may be stored, interpreted, used in additional calculations, used to draw display elements, and the like.

A benefit of this type of arrangement between functions 120 and the configuration file 122 stems from a requirement in the aviation industry that some software must be submitted for approval and certification by the FAA. Prior instrumentation systems do not utilize the configuration file 122 of the present invention. Because of this, if a user desired to change the capabilities of the instrumentation system, the changes had to be made at the function level. Changes at the function level require additional submissions to and recertifications by the FAA. In contrast to prior instrumentation systems, the instrumentation system 10 provides functions 120 that comprise a collection of standard functions that is submitted to and certified by the FAA one time. If a user desires to implement changes or add new functionality after certification has occurred, as long as the changes or new functionality can be implemented via changes or additions to the configuration file 122, no additional software certification is required. In the example above, the ability to calculate an average of two values was formulated based upon existing functions within the functions 120. No changes were made to the functions 120, so the functions 120 would not require recertification by the FAA. The ability to define new outputs using the functions 120 by making changes to the configuration file 122 saves both time and money compared to prior instrumentation systems that require recertification of functions after a change had been made.

Figure 4:
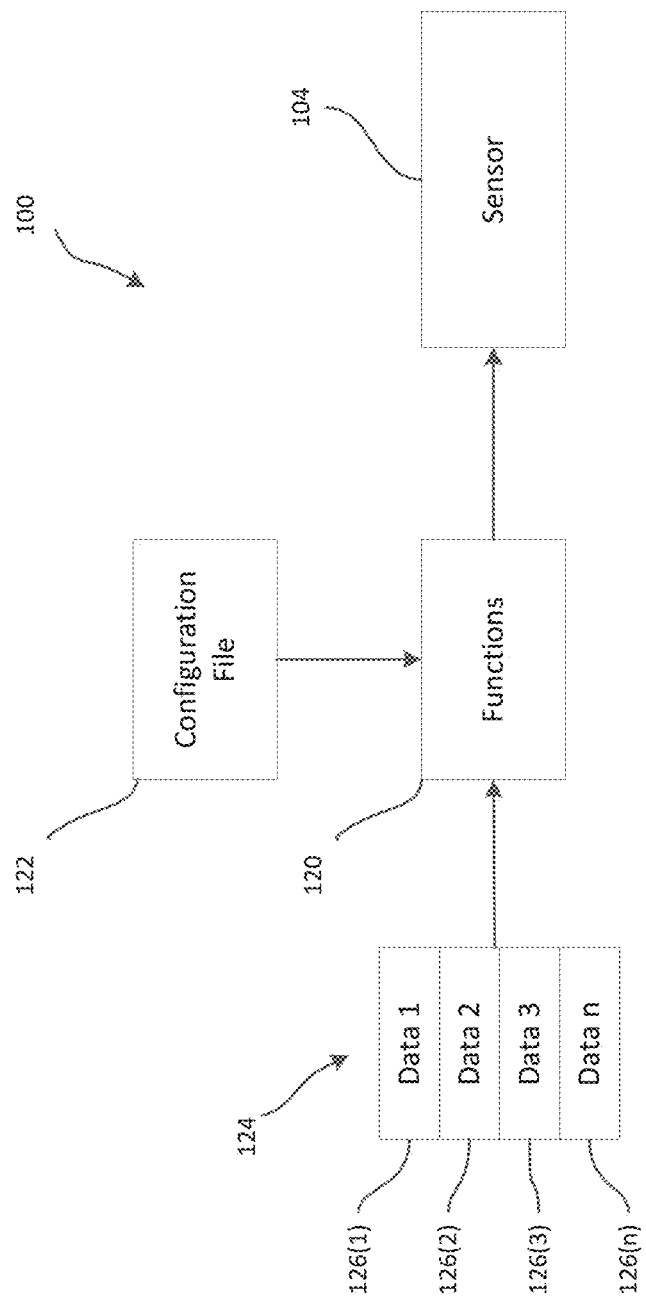
FIG. 4 is a flow diagram illustrating data flow within an instrumentation system according to one or more embodiments of the disclosure.

Referring now to FIG. 4, a flow diagram of an IDU 100 according to one or more embodiments of the disclosure is shown. Data from addressable memory 124 can be formatted and output via I/O ports 110 for use by external devices such as sensors 104. The configuration file 122 can also be configured to define transmission of standard communication words (e.g., ARINC, NMEA). In some embodiments, the configuration file 122 defines the detailed content and format of the words that are transmitted to sensors 104 or to other devices/components as needed.

In some embodiments, custom ARINC429 labels can be output by functions 120 under control of the configuration file 122. All ARINC429 transmit ports are available for configuration. These ports may map as follows:

TABLE 5

| Port Configuration | IDU-3 Port | IDU-450/680 Port |
| --- | --- | --- |
| Port 21 | COM21 | COM21 |
| Port 22 | COM22 | COM22 |
| Port 25 | COM23 | COM25 |
| Port 26 | COM24 | COM26 |
| Port 29 | Not Available | COM29 |
| Port 30 | Not Available | COM30 |
| Port 39 | Not Available | AEM Port #1 |
| Port 40 | Not Available | AEM Port #2 |

On each port, octal labels 0 through 377 may be available for configuration. Configuration of an individual output label may include the following:

TABLE 6

| Parameter | Choices | Notes |
| --- | --- | --- |
| Label Type | BNR DDW | Reference ARINC 429 standard. Numeric data is transmitted as BNR words. Discrete data is transmitted as DDW words. The type of word influences how SSM bits are interpreted. BCD numeric word outputs are not supported by OASIS. |
| Label Rate | 1 to 20 Hz | How often the label gets transmitted. Note that custom ARINC429 output labels are transmitted within the main loop of the IDU application, so timing is approximate and dependent upon processor loading. |
| Individual Bit Validity | | See validity setup table in Table 13. Any bit in the data, SDI, or SSM area (bits 9 to 31) can be set by a validity test. It is not necessary to define a validity test for every bit. On DDW words, bits that are not defined will be set to 0 (on a DDW word, SSM of 00 is "Normal Operation"). On BNR words, bits that are not defined will retain their originally set values. Note that the function to set bits needs to be used with caution because it overrides and potentially corrupts BNR, SDI, and SSM values. |
| BNR Word Valid Range | Numeric value | Used for BNR output labels only. Maximum representable range for the BNR word. |
| BNR Word Significant Bits | Numeric Value | Used for BNR output labels only. Significant bits of data for the BNR word. |
| BNR Word Coefficient | Numeric Value | Used for BNR output labels only. The coefficient to convert the internal value to desired ARINC 429 units. |
| BNR Word Source Label | Octal 0 to 377 | Used for BNR output labels only. This is the ARINC429 label that contains the source value for the ARINC429 output. |
| BNR Word Source Primary Port | 1 through 42 | Used for BNR output labels only. This is the primary OASIS COM Port for the source value for the ARINC429 output. |
| BNR Word Source Secondary Port | 1 through 42 | Used for BNR output labels only. This is the secondary OASIS COM Port for the |

TABLE 6-continued

| Parameter | Choices | Notes |
| --- | --- | --- |
| | | source value for the ARINC429 output. The secondary port must be different than the primary port. Setting up a secondary port is not required. |
| BNR Word Source Use Latched Value | ON or OFF | Used for BNR output labels only. If ON, then the latched value (last value that indicated SSM of NO) is used as source data. Otherwise, normal SSM and word timeout rules apply. |
| BNR Word Source Use Rate Value | ON or OFF | Used for BNR output labels only. If ON, then the rate of change of the label value is used as source data. "Use Latched Value" takes precedence. |

In another embodiment, Custom NMEA format messages can be output under control of the configuration file 122. All serial (RS-232/422) transmit ports are available for configuration. These ports may map as follows:

TABLE 7

| OASIS Configuration | IDU-3 Port | IDU-450/680 Port |
| --- | --- | --- |
| Port 1 | COM1 | COM1 |
| Port 2 | COM2 | COM2 |
| Port 3 | COM3 | COM3 |
| Port 4 | COM4 | COM4 |
| Port 5 | COM5 | COM5 |
| Port 6 | COM6 | COM6 |
| Port 7 | COM7 | COM7 |
| Port 8 | COM8 | COM8 |
| Port 9 | COM9 | COM9 |
| Port 10 | COM10 | COM10 |
| Port 11 | COM11 | COM11 |
| Port 12 | COM12 | COM12 |
| Port 33 | Not Available | COM33 |
| Port 34 | Not Available | COM34 |
| Port 35 | Not Available | COM35 |
| Port 36 | Not Available | COM36 |

In a typical embodiment, each NMEA message includes: a starting ASCII "$" character; a 5 character ID string including ASCII capital letters and decimal numbers; an ASCII "," character; up to 50 parameters that can be either ASCII text, ASCII hexadecimal 16-bit bitfields or ASCII numeric values separated by ASCII "," characters; a terminating ASCII "*" character; an ASCII hexadecimal 8-bit checksum that is the bitwise exclusive OR of all characters between the starting ASCII "$" and the terminating ASCII "*" characters (not including the "$" or "*" characters); and ASCII<CR> and <LF> characters.

Up to 25 NMEA messages are definable. Examples of configuration of custom NMEA messages are set forth in Table 8 below:

TABLE 8

| Parameter | Choices | Notes |
| --- | --- | --- |
| Port | Valid Port from Table | This begins the definition of a custom NMEA message. The same port number can be specified more than once to enable multiple NMEA messages to be broadcast on the same port. Note that the definition of a custom NMEA message will override the default transmissions. |
| Baud Rate | 1200<br>2400<br>4800<br>9600<br>19200<br>38400<br>57600<br>115200 | 8 data bits, 1 stop bit and no parity (8N1) is assumed. The baud rate setting sets the communication parameters for both the TX and RX channels associated with the port. Thus, if an incompatible baud rate is set, the default receive function for the port will stop working. Also, if more than one custom NMEA message shares the same port, their Baud Rate must be the same. |
| Frequency | 1 to 10 Hz | How often the custom NMEA message gets transmitted. Note that custom NMEA messages are transmitted within the main loop of the IDU application, so timing is approximate and dependent upon processor loading. |
| ID | 5 Characters | This is the identifier for the custom NMEA message. It must include 5 capital letters or decimal numbers. |

TABLE 8-continued

| Parameter | Choices | Notes |
|---|---|---|
| Up to 50 comma-delimited parameters can be contained in each NMEA message. Parameters are either ASCII text, ASCII hexadecimal bitfelds or ASCII numeric values. Parameters are setup as follows: | | |
| Type | Text, Hexadecimal Bitfield or Numeric | Identifies the type of the parameter. |
| Setup for Parameter Type Text: | | |
| Text | Up to 31 Characters | Capital letters or decimal numbers. |
| Setup for Parameter Type Hexadecimal Bitfield: | | |
| 16 Individual Bit Validities | | See validity setup table in Table 13. The parameter will include of 4 ASCII hexadecimal characters that represent a 16-bit bitfield (0000 to FFFF). Each bit is set by a validity test. It is not necessary to define a validity test for every bit. Bits that are not defined will default to 0. |
| Setup for Parameter Type Numeric Value | | |
| Numeric Value Source Label | Octal 0 to 377 | This is the ARINC429 label that contains the source value for the numeric value. |
| Numeric Value Source Primary Port | 1 through 42 | This is the primary OASIS COM Port for the source value for the numeric value. |
| Numeric Value Source Secondary Port | 1 through 42 | This is the secondary OASIS COM Port for the source value for the numeric value. The secondary port must be different than the primary port. Setting up a secondary port is not required. |
| Numeric Value Use Latched Value | ON or OFF | If ON, then the latched value (last value that indicated SSM of NO) is used as source data. Otherwise, normal SSM and word timeout rules apply. |
| Numeric Value Use Rate Value | ON or OFF | If ON, then the rate of change of the label value is used as source data. "Use Latched Value" takes precedence. |
| Numeric Value Decimal Places | Integer between −2 and +2 | Adjust rounding and decimal places for numeric value as follows: <br> −2 106.55555 becomes 110 (nearest 10) <br> −1 106.55555 becomes 105 (nearest 5) <br> 0 106.55555 becomes 107 (nearest integer) <br> +1 106.55555 becomes 106.6 (nearest $10^{th}$) <br> +2 106.55555 becomes 106.56 (nearest $100^{th}$) |
| Numeric Value Show "+" Flag | ON or OFF | Normally, the "+" for a positive value is suppressed. If this flag is ON, the "+" is shown. |

Sandbox

In some embodiments, the instrumentation system 10 includes the sandbox 114 (Serial Analog Digital Box)(e.g., see FIG. 1). The sandbox 114 is a general purpose analog and discrete I/O device that can be connected to the IDU 100 and controlled by the configuration file 122. In a typical embodiment, the instrumentation system 10 may include up to 8 sandboxes 114. Each sandbox 114 can monitor 40 discrete input pins and provide 12 discrete and 8 DC analog output pins. In some embodiments, up to 8 Sandboxes can be bussed on a single RS-232 or RS-422 COM port (with the IDU 100 as the bus controller), providing powerful system expansion capability.

Communication Parameters

In a typical embodiment, sandbox packets are transmitted and received with 8 data bits, 1 stop bit, and no parity. Transmission speed is 115,200 baud. All RS-232/422 TX/RX ports (other than, for example, an intra-system port—COM17) are available for configuration. In a typical embodiment, these ports map as set forth in Table 9 below:

TABLE 9

| OASIS Configuration | IDU-3 Port | IDU-450/680 Port |
|---|---|---|
| OASIS Port 1 | COM1 | COM1 |
| OASIS Port 2 | COM2 | COM2 |
| OASIS Port 3 | COM3 | COM3 |
| OASIS Port 4 | COM4 | COM4 |
| OASIS Port 5 | COM5 | COM5 |
| OASIS Port 6 | COM6 | COM6 |
| OASIS Port 7 | COM7 | COM7 |
| OASIS Port 8 | COM8 | COM8 |
| OASIS Port 9 | COM9 | COM9 |
| OASIS Port 10 | COM10 | COM10 |
| OASIS Port 11 | COM11 | COM11 |
| OASIS Port 12 | COM12 | COM12 |
| OASIS Port 33 | Not Available | COM33 |
| OASIS Port 34 | Not Available | COM34 |
| OASIS Port 35 | Not Available | COM35 |
| OASIS Port 36 | Not Available | COM36 |

In a typical embodiment, IDU 100 transmissions address each sandbox 114 individually with sufficient spacing to allow each sandbox 114 to enable its transmitter, reply, and disable its transmitter without stepping on the communications of other sandboxes 114 that also communicate on the same bus.

Packet General Description

In a typical embodiment, each packet message includes: A starting ASCII "$" character; A 5 character ID string including ASCII capital letters and decimal numbers; An ASCII "," character; the packet body (ASCII); a terminating ASCII "*" character; an ASCII hexadecimal 8-bit checksum that is the bitwise exclusive OR of all characters between the starting ASCII "$" and the terminating ASCII "*" characters (not including the "$" or "*" characters); and ASCII<CR> and <LF> characters.

Configuration String

After startup, the IDU 100 sends configuration strings to each sandbox 114 configured in the OASIS file. In a typical embodiment, the configuration string is formatted as follows:

$PGSF#,IIII,IIII,IIII,IIII,IIII,IIII,IIII,IIII,IIII,IIII,IIII,IIII,
IIII,IIII,IIII,IIII,IIII,IIII,IIII,IIII,IIII,IIII,IIII,IIII,IIII,IIII,
IIII,IIII,IIII,IIII,IIII,IIII,IIII,IIII,IIII,IIII,IIII,IIII,IIII,IIII,
O,O,O,O,O,O,O,O,O,O,O,O*C C<CR><LF>

The header is $PGSF1 through $PGSF8. "PGSF" represents "Proprietary Genesys Sandbox conFiguration" and the numeral represents a number of the sandbox 114 (devices 1 through 8). "IIII" is 4 ASCII characters specifying the configuration for each of the 40 Single Ended discrete inputs as follows: $1^{st}$-$3^{rd}$ ASCII=Threshold in tenths of a Volt, i.e. "215"=21.5 volts; and $4^{th}$ ASCII=Hysteresis Code ("A" through "Z"). "0" is an ASCII character specifying the configuration for each of 12 discrete outputs as follows (ref: Doc. No. 01-000071): "S"=Ground when Active/Open-Collector Inactive; "D"=Vcc (28V) when Active/Open-Collector Inactive; and "0"=Always Open-Collector (Dead). In a typical embodiment, the Configuration String is 235 bytes long and consumes ~20.4 milliseconds of bandwidth.

Configuration String Response

Upon receipt of a configuration string, the addressed Sandbox transmits a reply. The IDU 100 processes the following configuration string response from the sandbox 114: $PGSZ#,CS*CC<CR><LF>. The header is $PGSZ1 through $PGSZ8. "PGSZ" represents "Proprietary Genesys Sandbox Configuration String Response" and the numeral represents a number of the sandbox 114 (devices 1 through 8). "CS" is the hexadecimal 8-bit Configuration String checksum computed by the Sandbox from configuration values stored in memory (e.g., addressable memory 124). Matching this value against the configuration string checksum sent by the IDU 100 is positive confirmation of proper configuration of the sandbox 114. The configuration string response is 14 bytes long and consumes ~1.2 milliseconds of bandwidth.

Command String

In a typical embodiment, upon receipt of positive confirmation of proper configuration of the sandbox 114, the IDU 100 stops sending configuration strings and starts sending command strings to the sandbox 114. In a typical embodiment, the command string be formatted as follows:

$PGSC#,DDDD,AAAA,AAAA,AAAA,AAAA,AAAA,
AAAA,AAAA,AAAA*CC<CR><LF>

The Header is $PGSC1 through $PGSC8. "PGSC" represents "Proprietary Genesys Sandbox Command" and the numeral represents the Sandbox number (devices 1 through 8). "DDDD" is an ASCII hexadecimal integer specifying the commanded status for discrete outputs 1-16 (note: discrete outputs 13-16 are not allocated in hardware and the respective bits will always be 0. "AAAA" is an ASCII hexadecimal twos-complement signed integer specifying the 16-bit output level for the 4 differential analog outputs AOUT1+, AOUT1−, AOUT2+, AOUT2−, AOUT3+, AOUT3−, AOUT4+, AOUT4−. Each bit represents 1mVDC so that the representable range is from −32.768 VDC (8000) to +32.767 VDC (7FFF). Command String is 56 bytes long and consumes ~4.9 milliseconds of bandwidth.

Command String Response

In a typical embodiment, upon receipt of a command string, the sandbox 114 that has been addressed transmits a reply and the IDU 100 processes the following command string response from the sandbox 114:

$PGSR#,IIII,IIII,IIII,SSSS*CC<CR><LF>

The header is $PGSR1 through $PGSR8. "PGSR" represents "Proprietary Genesys Sandbox Command String Response" and the numeral represents a number of the sandbox 114 (devices 1 through 8). "IIII" is an ASCII hexadecimal integer specifying the status for the discrete inputs. The first "IIII" group represents discrete inputs 1-16. The second "IIII" group represents discrete inputs 17-32. The third "IIII" group represents discrete inputs 33-48 (note: discrete inputs 41-48 are not allocated in hardware and the respective bits will always be 0. "SSSS" is an ASCII hexadecimal bit field with built-in-test and status information. The Command String Response is 31 bytes long and consumes ~2.7 milliseconds of bandwidth.

Sandbox Configuration

In a typical embodiment, configuration of the sandbox 114 includes the following:

TABLE 10

| Parameter | Choices | Notes |
|---|---|---|
| Port | Valid Port from Table | This begins the configuration of a Sandbox. The same port number can be specified more than once to enable up to 8 |

TABLE 10-continued

| Parameter | Choices | Notes |
|---|---|---|
| | | bussed Sandboxes on a port. Note that the configuration of a Sandbox will override the default transmissions. |
| ID | 1 through 8 | This value corresponds to the Sandbox pin strapping (ref: Doc. No. 01-000071). The combination of Port and ID uniquely identifies a particular Sandbox. |
| Up to 40 discrete inputs can be setup per Sandbox. Discrete inputs are setup as follows: | | |
| Threshold Voltage | Numeric Value | Threshold voltage in Volts DC. |
| Hysteresis Code | Alphabetical Code | |
| Return Label 1 | Octal 0 to 377 | This is the ARINC429 label that holds the state of discrete inputs 1 through 16 in bits 11 through 26 respectively. Will be on "Port" and is automatically setup as a DDW label. |
| Return Label 2 | Octal 0 to 377 | This is the ARINC429 label that holds the state of discrete inputs 17 through 32 in bits 11 through 26 respectively. Will be on "Port" and is automatically setup as a DDW label. |
| Return Label 3 | Octal 0 to 377 | This is the ARINC429 label that holds the state of discrete inputs 33 through 40 in bits 11 through 18 respectively. Will be on "Port" and is automatically setup as a DDW label. |
| Up to 12 discrete outputs can be setup per Sandbox. Discrete outputs are setup as follows: | | |
| Configuration Code | Alphabetical Code | |
| Validity | | See validity setup Table 13. During runtime, the discrete output is toggled by the validity test setup here. |
| Up to 4 analog outputs can be setup per Sandbox. Analog outputs are setup as follows: | | |
| Analog Output Configuration | "D" or "S" | "D" for differential operation. "S" for single-ended operation. There are two pins (a "+" and a "−") for each analog output. Each pin can be driven from −15.5 to +15.5 VDC. When differential operation is specified, the pins are driven in equal and opposite directions for a total output range of +/− 31 VDC. When single-ended operation is specified, the "−" pin is held at 0 VDC (Sandbox ground) and the "+" pin is driven between +/−15.5 VDC. |
| Scale Factor | Numeric Value | Constant to scale from the input value to the output voltage. This constant can be negative. |
| Offset | Numeric Value | Offset voltage to apply to the analog output such that: AO(VDC) = Input Value × Scale Factor + Offset |
| Input Value Source Label | Octal 0 to 377 | This is the ARINC429 label that contains the source value for the input value. |
| Input Value Source Primary Port | 1 to 42 | This is the primary OASIS COM Port for the source value for the input value. |
| Input Value Source Secondary Port | 1 to 42 | This is the secondary OASIS COM Port for the source value for the input value. The secondary port must be different than the primary port. |

TABLE 10-continued

| Parameter | Choices | Notes |
|---|---|---|
| Input Value Use Latched Value | ON or OFF | Setting up a secondary port is not required. If ON, then the latched value (last value that indicated SSM of NO) is used as source data. Otherwise, normal SSM and word timeout rules apply. |
| Input Value Use Rate Value | ON or OFF | If ON, then the rate of change of the label value is used as source data. "Use Latched Value" takes precedence. |

Referring generally to FIGS. 2-7, the IDU 100 may include one or more traditional data ports that simulate a communication path between components of the instrumentation system 10 similar to communication paths provided by previous instrumentation systems. These traditional data ports may be used as a means to pass internal data from memory 108 to the functions 120. Data may be passed using, for example, the following labels for the traditional data ports (e.g., ports 37, 38) set forth in Table 11 below:

TABLE 11

| Label | Notes |
|---|---|
| Port 37 | |
| 100 | Selected Course (Degrees). |
| 101 | Selected Heading (Degrees). |
| 102 | Selected Altitude (Feet). |
| 103 | Selected Airspeed (Knots). |
| 104 | Selected VSI (Feet per Minute). |
| 116 | Cross-Track Deviation Distance (NM). |
| 117 | Vertical Deviation Distance (Feet). |
| 147 | Magnetic Variation (Degrees). |
| 162 | Density Altitude (Feet). |
| 164 | AGL Altitude (Feet). |
| 170 | Decision Height (feet). |
| 173 | Lateral Deviation (DDM). |
| 174 | Vertical Deviation (DDM). |
| 202 | DME Distance (NM). |
| 203 | Pressure Altitude (Feet). |
| 204 | Barometric Altitude (Feet). |
| 205 | Mach Number (Knots). |
| 206 | Computed Airspeed (Knots). |
| 210 | True Airspeed (Knots). |
| 211 | Total Air Temperature (Degrees C.). |
| 212 | Altitude Rate (VSI - Feet per Minute). |
| 213 | Static Air Temperature (Degrees C.). |
| 222 | VOR Omnibearing (Degrees) and Marker Beacons (DDW). |
| 244 | Totalizer Fuel Flow (fuel_limits.vol_flag per hour). |
| 247 | Total Fuel Quantity (fuel_limits.vol_flag). |
| 251 | Distance to Go (NM). |
| 270 | This is a DDW label with the following bit assignments: bit 9: Nose Landing Gear Down Discrete Input bit 10: Right Landing Gear Down Discrete Input bit 11: Left Landing Gear Down Discrete Input bit 12: All Landing Gear Down Discrete Input bit 13: TAWS Inhibit Discrete Input bit 14: HTAWS Low Altitude Discrete Input bit 15: TAWS Landing Flaps Discrete Input bit 16: TAWS Glideslope Inhibit Discrete Input bit 17: HTAWS Low Torque Discrete Input bit 18: Autopilot NAV/APR Mode Engage Discrete Input bit 19: Autopilot HDG Mode Engage Discrete Input bit 20: Autopilot Vertical Mode Engage Discrete Input bit 21: Autopilot Glideslope Mode Engage Discrete Input bit 22: GPS Offside Select Discrete Input bit 23: AHRS Offside Select Discrete Input bit 24: ADC Offside Select Discrete Input bit 25: Radar Altimeter Offside Select Discrete Input bit 26: Crossfill Inhibit Discrete Input bit 27: Weight on Ground/Wheels Discrete Input bit 28: Warning/Caution Acknowledge Discrete Input bit 29: Low Rotor RPM Mute Discrete Input |
| 271 | This is a DDW label with the following bit assignments: bit 9: Cyclic Center Discrete Input bit 10: Flight Path Marker Inhibit Discrete Input |

TABLE 11-continued

| Label | Notes |
|---|---|
| | bit 11: Remote User Waypoint Designate Discrete Input |
| | bit 12: Remote Go-Around/Missed Discrete Input |
| | bit 13: Outer Marker Beacon Discrete Input |
| | bit 14: Middle Marker Beacon Discrete Input |
| | bit 15: Inner Marker Beacon Discrete Input |
| | bit 16: Fan Status Discrete Input |
| | bit 17: TCAS/TAS Audio Inhibit Discrete Input |
| | bit 18: Engine Starter Engaged Discrete Input |
| | bit 19: Engine Out Discrete Input |
| | bit 20: A109 Forced AHRS2 Select Discrete Input |
| | bit 21: A109 Forced ADC2 Select Discrete Input |
| | bit 22: True North Heading Mode Discrete Input |
| | bit 23: NVG Mode Discrete Input |
| | bit 24: Low Fuel Caution (Tank 1) Discrete Input |
| | bit 25: Low Fuel Caution (Tank 2) Discrete Input |
| | bit 26: Low Fuel Caution (Tank 3) Discrete Input |
| | bit 27: Low Fuel Caution (Tank 4) Discrete Input |
| | bit 28: Low Fuel Caution (Tank 5) Discrete Input |
| | bit 29: Low Fuel Caution (Tank 6) Discrete Input |
| 272 | This is a DDW label with the following bit assignments: |
| | bit 9: Low Fuel Caution (Tank 7) Discrete Input |
| | bit 10: Low Fuel Caution (Tank 8) Discrete Input |
| | bit 11: Low Fuel Warning (Tank 1) Discrete Input |
| | bit 12: Low Fuel Warning (Tank 2) Discrete Input |
| | bit 13: Low Fuel Warning (Tank 3) Discrete Input |
| | bit 14: Low Fuel Warning (Tank 4) Discrete Input |
| | bit 15: Low Fuel Warning (Tank 5) Discrete Input |
| | bit 16: Low Fuel Warning (Tank 6) Discrete Input |
| | bit 17: Low Fuel Warning (Tank 7) Discrete Input |
| | bit 18: Low Fuel Warning (Tank 8) Discrete Input |
| | bit 19: EICAS Offside Select Discrete Input |
| | bit 20: Intelliflight 1950 Side in Command Discrete Input |
| | bit 21: Intelliflight 1950 Yaw Damper Status Discrete Input |
| | bit 22: OASIS Custom Function #1 Discrete Input |
| | bit 23: OASIS Custom Function #2 Discrete Input |
| | bit 24: OASIS Custom Function #3 Discrete Input |
| | bit 25: OASIS Custom Function #4 Discrete Input |
| | bit 26: OASIS Custom Function #5 Discrete Input |
| | bit 27: OASIS Custom Function #6 Discrete Input |
| | bit 28: OASIS Custom Function #7 Discrete Input |
| | bit 29: OASIS Custom Function #8 Discrete Input |
| 273 | This is a DDW label with the following bit assignments: |
| | bit 9: OASIS Custom Function #9 Discrete Input |
| | bit 10: OASIS Custom Function #10 Discrete Input |
| | bit 11: OASIS Custom Function #11 Discrete Input |
| | bit 12: OASIS Custom Function #12 Discrete Input |
| | bit 13: OASIS Custom Function #13 Discrete Input |
| | bit 14: OASIS Custom Function #14 Discrete Input |
| | bit 15: OASIS Custom Function #15 Discrete Input |
| | bit 16: OASIS Custom Function #16 Discrete Input |
| | bit 17: OASIS Custom Function #17 Discrete Input |
| | bit 18: OASIS Custom Function #18 Discrete Input |
| | bit 19: Baro Synchronization Discrete Input |
| | bit 20: ADAHRS #1 DG/Slave Switch Discrete Input |
| | bit 21: ADAHRS #1 Slew Positive Switch Discrete Input |
| | bit 22: ADAHRS #1 Slew Negative Switch Discrete Input |
| | bit 23: ADAHRS #2 DG/Slave Switch Discrete Input |
| | bit 24: ADAHRS #2 Slew Positive Switch Discrete Input |
| | bit 25: ADAHRS #2 Slew Negative Switch Discrete Input |
| | bit 26: IDU-680 Normal/Essential Mode Discrete Input |
| | bits 27-29: Reserved |
| 274 | This is a DDW label with the following bit assignments: |
| | bit 9: Airborne Flag Discrete Output |
| | bit 10: AP Roll Steering Valid Flag Discrete Output |
| | bit 11: TCAS-II Audio Inhibit Flag Discrete Output |
| | bit 12: TCAS-II RA Display Valid Flag Discrete Output |
| | bit 13: TCAS-II TA Display Valid Flag Discrete Output |
| | bit 14: Transmit Enable Active Flag Discrete Output |
| | bit 15: Warning (Red) Light Activate Discrete Output |
| | bit 16: Caution (Yellow) Light Activate Discrete Output |
| | bit 17: Master Caution Light Activate Discrete Output |
| | bit 18: Below Decision Height Flag Discrete Output |
| | bit 19: Pre-Select Altitude Capture Flag Discrete Output |
| | bit 20: IAS Switch Discrete Output |
| | bit 21: Vne Exceedance Discrete Output |
| | bit 22: External Fan ON Command Discrete Output |
| | bit 23: TH-57 TOT Exceedance Discrete Output |
| | bit 24: TH-57 Torque Exceedance Discrete Output |

TABLE 11-continued

| Label | Notes |
|---|---|
| | bit 25: AP Lateral Deviation Valid Flag Discrete Output |
| | bit 26: AP Vertical Deviation Valid Flag Discrete Output |
| | bit 27: AP Pitch Steering Valid Flag Discrete Output |
| | bit 28: AP Disconnect Discrete Output |
| | bit 29: GPS Loss of Integrity Discrete Output |
| 275 | This is a DDW label with the following bit assignments: |
| | bit 9: GPS Loss of Navigation Discrete Output |
| | bit 10: GPS Vertical Loss of Navigation Discrete Output |
| | bit 11: OASIS Custom Function #1 Discrete Output |
| | bit 12: OASIS Custom Function #2 Discrete Output |
| | bit 13: OASIS Custom Function #3 Discrete Output |
| | bit 14: OASIS Custom Function #4 Discrete Output |
| | bit 15: OASIS Custom Function #5 Discrete Output |
| | bit 16: OASIS Custom Function #6 Discrete Output |
| | bit 17: OASIS Custom Function #7 Discrete Output |
| | bit 18: OASIS Custom Function #8 Discrete Output |
| | bit 19: OASIS Custom Function #9 Discrete Output |
| | bit 20: OASIS Custom Function #10 Discrete Output |
| | bit 21: OASIS Custom Function #11 Discrete Output |
| | bit 22: OASIS Custom Function #12 Discrete Output |
| | bit 23: OASIS Custom Function #13 Discrete Output |
| | bit 24: OASIS Custom Function #14 Discrete Output |
| | bit 25: OASIS Custom Function #15 Discrete Output |
| | bit 26: OASIS Custom Function #16 Discrete Output |
| | bit 27: Marker Beacon HI/LO Sense Discrete Output |
| | bit 28: IDU-680 Essential Mode Active Discrete Output |
| | bit 29: IDU Audio Active Discrete Output |
| 276 | This is a DDW label with the following bit assignments: |
| | bits 9-29: Reserved |
| 277 | This is a DDW label with the following bit assignments: |
| | bits 9-11: Fuel Volume Units |
| | bit 12: System-Side (0 = Pilot, 1 = Co-Pilot) |
| | bits 13-15: CPU Number |
| | bit 16: Operating Mode (0 = Normal, 1 = Essential) |
| | bits 17-29: Reserved. |
| 310 | Latitude (Degrees). |
| 311 | Longitude (Degrees). |
| 312 | Ground Speed (Knots). |
| 313 | Track Angle (Degrees Magnetic). |
| 315 | Wind Speed (Knots). |
| 316 | Wind Direction (Degrees True). |
| 320 | Heading (Degrees Magnetic). |
| 324 | Pitch Angle (Degrees). |
| 325 | Roll Angle (Degrees). |
| 326 | Pitch Rate (Degrees per Second). |
| 327 | Roll Rate (Degrees per Second). |
| 330 | Yaw Rate (Degrees per Second). |
| 331 | X-Axis (Longitudinal) Acceleration (G's). |
| 332 | Y-Axis (Lateral) Acceleration (G's). |
| 333 | Z-Axis (Vertical) Acceleration (G's). |
| 343 | Z-Axis (Vertical) Extended-Range Acceleration (G's). |
| 351 | Distance to Destination (NM). |
| 370 | Decision Height (Feet). |
| OASIS Port 38 | |
| 270 | This is a DDW label with the following bit assignments: |
| | bit 9: Nose Landing Gear Down Latching Discrete Input |
| | bit 10: Right Landing Gear Down Latching Discrete Input |
| | bit 11: Left Landing Gear Down Latching Discrete Input |
| | bit 12: All Landing Gear Down Latching Discrete Input |
| | bit 13: TAWS Inhibit Latching Discrete Input |
| | bit 14: HTAWS Low Altitude Latching Discrete Input |
| | bit 15: TAWS Landing Flaps Latching Discrete Input |
| | bit 16: TAWS Glideslope Inhibit Latching Discrete Input |
| | bit 17: HTAWS Low Torque Latching Discrete Input |
| | bit 18: Autopilot NAV/APR Mode Engage Latching Discrete Input |
| | bit 19: Autopilot HDG Mode Engage Latching Discrete Input |
| | bit 20: Autopilot Vertical Mode Engage Latching Discrete Input |
| | bit 21: Autopilot Glideslope Mode Engage Latching Discrete Input |
| | bit 22: GPS Offside Select Latching Discrete Input |
| | bit 23: AHRS Offside Select Latching Discrete Input |
| | bit 24: ADC Offside Select Latching Discrete Input |
| | bit 25: Radar Altimeter Offside Select Latching Discrete Input |
| | bit 26: Crossfill Inhibit Latching Discrete Input |
| | bit 27: Weight on Ground/Wheels Latching Discrete Input |
| | bit 28: Warning/Caution Acknowledge Latching Discrete Input |
| | bit 29: Low Rotor RPM Mute Latching Discrete Input |

TABLE 11-continued

| Label | Notes |
|---|---|
| 271 | This is a DDW label with the following bit assignments:<br>bit 9: Cyclic Center Latching Discrete Input<br>bit 10: Flight Path Marker Inhibit Latching Discrete Input<br>bit 11: Remote User Waypoint Designate Latching Discrete Input<br>bit 12: Remote Go-Around/Missed Latching Discrete Input<br>bit 13: Outer Marker Beacon Latching Discrete Input<br>bit 14: Middle Marker Beacon Latching Discrete Input<br>bit 15: Inner Marker Beacon Latching Discrete Input<br>bit 16: Fan Status Latching Discrete Input<br>bit 17: TCAS/TAS Audio Inhibit Latching Discrete Input<br>bit 18: Engine Starter Engaged Latching Discrete Input<br>bit 19: Engine Out Latching Discrete Input<br>bit 20: A109 Forced AHRS2 Select Latching Discrete Input<br>bit 21: A109 Forced ADC2 Select Latching Discrete Input<br>bit 22: True North Heading Mode Latching Discrete Input<br>bit 23: NVG Mode Latching Discrete Input<br>bit 24: Low Fuel Caution (Tank 1) Latching Discrete Input<br>bit 25: Low Fuel Caution (Tank 2) Latching Discrete Input<br>bit 26: Low Fuel Caution (Tank 3) Latching Discrete Input<br>bit 27: Low Fuel Caution (Tank 4) Latching Discrete Input<br>bit 28: Low Fuel Caution (Tank 5) Latching Discrete Input<br>bit 29: Low Fuel Caution (Tank 6) Latching Discrete Input |
| 272 | This is a DDW label with the following bit assignments:<br>bit 9: Low Fuel Caution (Tank 7) Latching Discrete Input<br>bit 10: Low Fuel Caution (Tank 8) Latching Discrete Input<br>bit 11: Low Fuel Warning (Tank 1) Latching Discrete Input<br>bit 12: Low Fuel Warning (Tank 2) Latching Discrete Input<br>bit 13: Low Fuel Warning (Tank 3) Latching Discrete Input<br>bit 14: Low Fuel Warning (Tank 4) Latching Discrete Input<br>bit 15: Low Fuel Warning (Tank 5) Latching Discrete Input<br>bit 16: Low Fuel Warning (Tank 6) Latching Discrete Input<br>bit 17: Low Fuel Warning (Tank 7) Latching Discrete Input<br>bit 18: Low Fuel Warning (Tank 8) Latching Discrete Input<br>bit 19: EICAS Offside Select Latching Discrete Input<br>bit 20: Intelliflight 1950 Side in Command Latching Discrete Input<br>bit 21: Intelliflight 1950 Yaw Damper Status Latching Discrete Input<br>bit 22: OASIS Custom Function #1 Latching Discrete Input<br>bit 23: OASIS Custom Function #2 Latching Discrete Input<br>bit 24: OASIS Custom Function #3 Latching Discrete Input<br>bit 25: OASIS Custom Function #4 Latching Discrete Input<br>bit 26: OASIS Custom Function #5 Latching Discrete Input<br>bit 27: OASIS Custom Function #6 Latching Discrete Input<br>bit 28: OASIS Custom Function #7 Latching Discrete Input<br>bit 29: OASIS Custom Function #8 Latching Discrete Input |
| 273 | This is a DDW label with the following bit assignments:<br>bit 9: OASIS Custom Function #9 Latching Discrete Input<br>bit 10: OASIS Custom Function #10 Latching Discrete Input<br>bit 11: OASIS Custom Function #11 Latching Discrete Input<br>bit 12: OASIS Custom Function #12 Latching Discrete Input<br>bit 13: OASIS Custom Function #13 Latching Discrete Input<br>bit 14: OASIS Custom Function #14 Latching Discrete Input<br>bit 15: OASIS Custom Function #15 Latching Discrete Input<br>bit 16: OASIS Custom Function #16 Latching Discrete Input<br>bit 17: OASIS Custom Function #17 Latching Discrete Input<br>bit 18: OASIS Custom Function #18 Latching Discrete Input<br>bit 19: Baro Synchronization Latching Discrete Input<br>bit 20: ADAHRS #1 DG/Slave Switch Latching Discrete Input<br>bit 21: ADAHRS #1 Slew Positive Switch Latching Discrete Input<br>bit 22: ADAHRS #1 Slew Negative Switch Latching Discrete Input<br>bit 23: ADAHRS #2 DG/Slave Switch Latching Discrete Input<br>bit 24: ADAHRS #2 Slew Positive Switch Latching Discrete Input<br>bit 25: ADAHRS #2 Slew Negative Switch Latching Discrete Input<br>bit 26: IDU-680 Normal/Essential Mode Latching Discrete Input<br>bits 27-29: Reserved |

Figure 5:
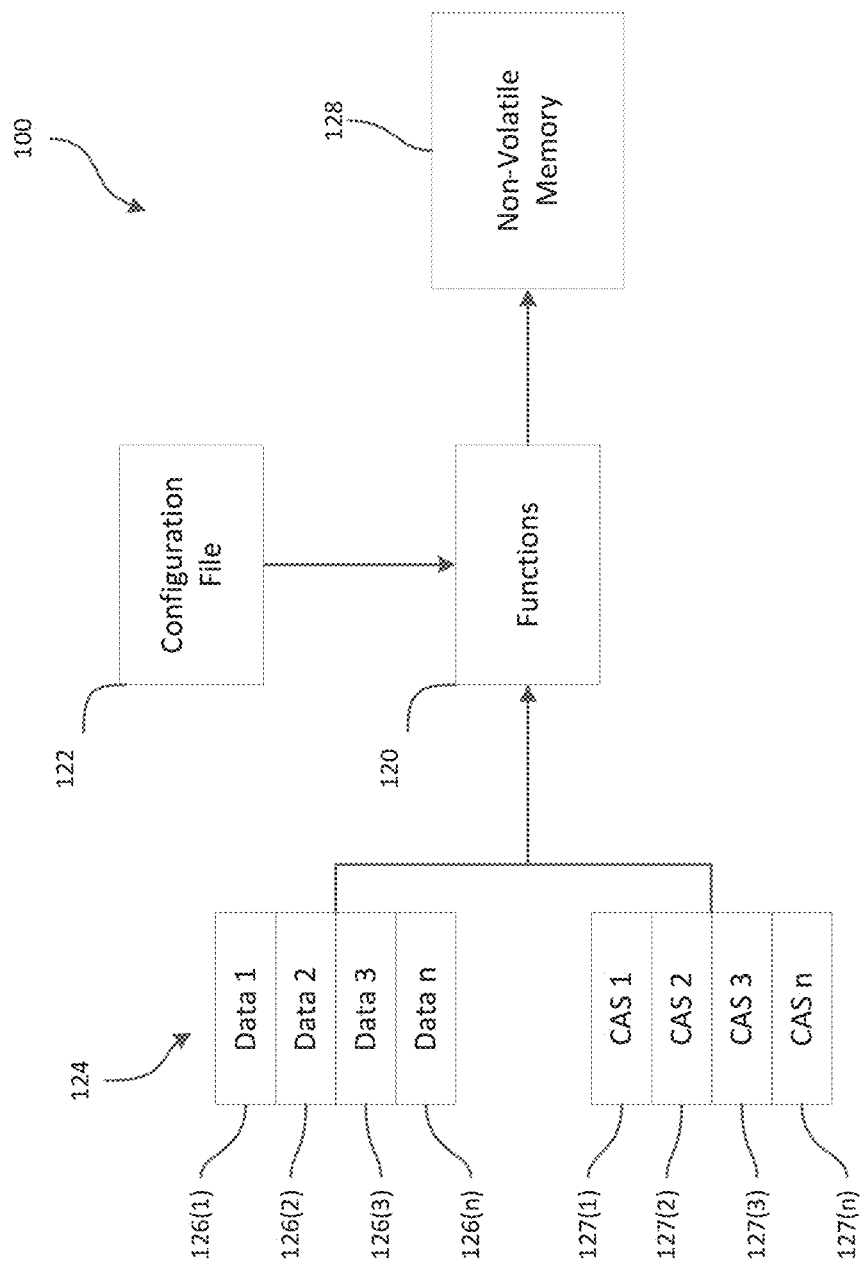
FIG. 5 is a flow diagram illustrating data flow within an instrumentation system according to one or more embodiments of the disclosure.

Referring now to FIG. 5, a flow diagram illustrating data flow within an IDU 100 according to one or more embodiments of the disclosure is shown. In some embodiments, the configuration file 122 can be used to define logging of information into non-volatile memory 128. Non-volatile memory 128 may comprise various types of non-volatile memory, such as, for example, disc-based memory, flash memory, etc.

Parameter Logging

Data element values, such as, for example, data values from memory 108, sensors 104, and/or addressable memory 124, may be logged in memory, such as, for example, a non-volatile memory 128 at a defined rate in ASCII, comma delimited format. As a non-limiting example, data 126(1)-(n) and/or CAS messages 127(1)-(n) may be logged. Active logging may be to a file named, for example, "englog00.csv"

(note that because of the *.csv file extension, this file can be directly opened by Microsoft Excel and similar spreadsheet software). In addition, data from the previous flights may be kept in files, such as, for example "englog01.csv", "englog02.csv", and so on. Upon system start, existing logs, such as, for example, "englog00.csv", "englog02.csv", etc. will be renamed "englog01.csv" and "englog02.csv", and "englog00.csv" will be opened for active logging so that data for a pre-determined number of past flights are trained in non-volatile memory 128.

The first line of the log files typically contains column headings based upon the "Log File Text" parameter of the related OASIS element. Subsequent lines comprise date, time, and OASIS element values. If the "Log File Text" parameter contains an empty string, then logging of the associated element value will be inhibited. In addition, if more than one "Log File Text" parameter includes the identical string, then only the first associated element value will be logged (it is expected that if elements have identical "Log File Text" strings, that they represent the same OASIS value). This above process keeps the log files from becoming excessively large and allows the log file contents to be defined for the functions 120 by the configuration file 122. Custom CAS messages 127 may also be logged.

Exceedance Monitoring and Logging

In some embodiments, the instrumentation system 10 may also perform exceedance monitoring and logging based upon parameter value and limits type in accordance with Table 12 below.

TABLE 12

| Limit Type | Notes |
|---|---|
| Yellow Above with Exceedance Message | After expiration of Exceedance time period, activates an Exceedance Caution condition. Note that an Exceedance Warning condition (if set) takes precedence over an Exceedance Caution condition.<br>Used for parameters not associated with a dedicated custom CAS message where the attention-grabbing features of a CAS message are desired.<br>Automatically resets - not logged. |
| Yellow Above with Exceedance Message and Exceedance Logging | After expiration of Exceedance time period, activates an Exceedance Caution condition. Note that an Exceedance Warning condition (if set) takes precedence over an Exceedance Caution condition.<br>After expiration of Exceedance time period, logs to non-volatile memory an Exceedance Caution condition, peak value and duration until parameter value returns below limit.<br>In flight mode, Exceedance Caution condition is cleared when the parameter value returns below limit.<br>In ground mode, Exceedance Caution condition becomes active if an Exceedance Caution condition has been logged.<br>Used for parameters not associated with a dedicated custom CAS message where the attention-grabbing features of a CAS message are desired. |
| Yellow Above with Exceedance Logging | After expiration of Exceedance time period, logs to non-volatile memory an Exceedance Caution condition, peak value and duration until parameter value returns below limit. Note that the Exceedance Caution condition is only logged, it is not made active.<br>In ground mode, Exceedance Caution condition becomes active if an Exceedance Caution condition has been logged.<br>Used for parameters associated with a dedicated custom CAS message. |
| Yellow Above with Red Exceedance Message<br>Red Above with Exceedance Message (Draw Arc or Draw Radial Line) | After expiration of Exceedance time period, activates an Exceedance Warning condition.<br>Used for parameters not associated with a dedicated custom CAS message where the attention-grabbing features of a CAS message are desired.<br>Automatically resets - not logged. |
| Yellow Above with Red Exceedance Message and Exceedance Logging<br>Red Above with Exceedance Message and Exceedance Logging (Draw Arc or Draw Radial Line) | After expiration of Exceedance time period, activates an Exceedance Warning condition.<br>After expiration of Exceedance time period, logs to non-volatile memory an Exceedance Warning condition, peak value and duration until parameter value returns below limit.<br>In flight mode, Exceedance Warning condition is cleared when the parameter value returns below limit.<br>In ground mode, Exceedance Warning condition becomes active if an Exceedance Warning condition has been logged.<br>Used for parameters not associated with a dedicated custom CAS message where the attention-grabbing features of a CAS message are desired. |
| Yellow Above with Red Exceedance Logging<br>Red Above with Exceedance Logging (Draw Arc or Draw Radial Line) | After expiration of Exceedance time period, logs to non-volatile memory an Exceedance Warning condition, peak value and duration until parameter value returns below limit. Note that the Exceedance Warning condition is only logged, it is not made active.<br>In ground mode, Exceedance Warning condition becomes active if an Exceedance Warning condition has been logged.<br>Used for parameters associated with a dedicated custom CAS message. |

During a normal system start, the exceedance log in non-volatile memory 128 is read. This allows the system to activate an appropriate exceedance condition in ground mode (i.e., exceedance conditions persist over power cycles). An exceedance menu function is provided to allow the operator or maintainer to view the exceedance log. Maintenance action is required to clear the exceedance log. A dedicated ground maintenance function is provided for this purpose.

Figure 6:
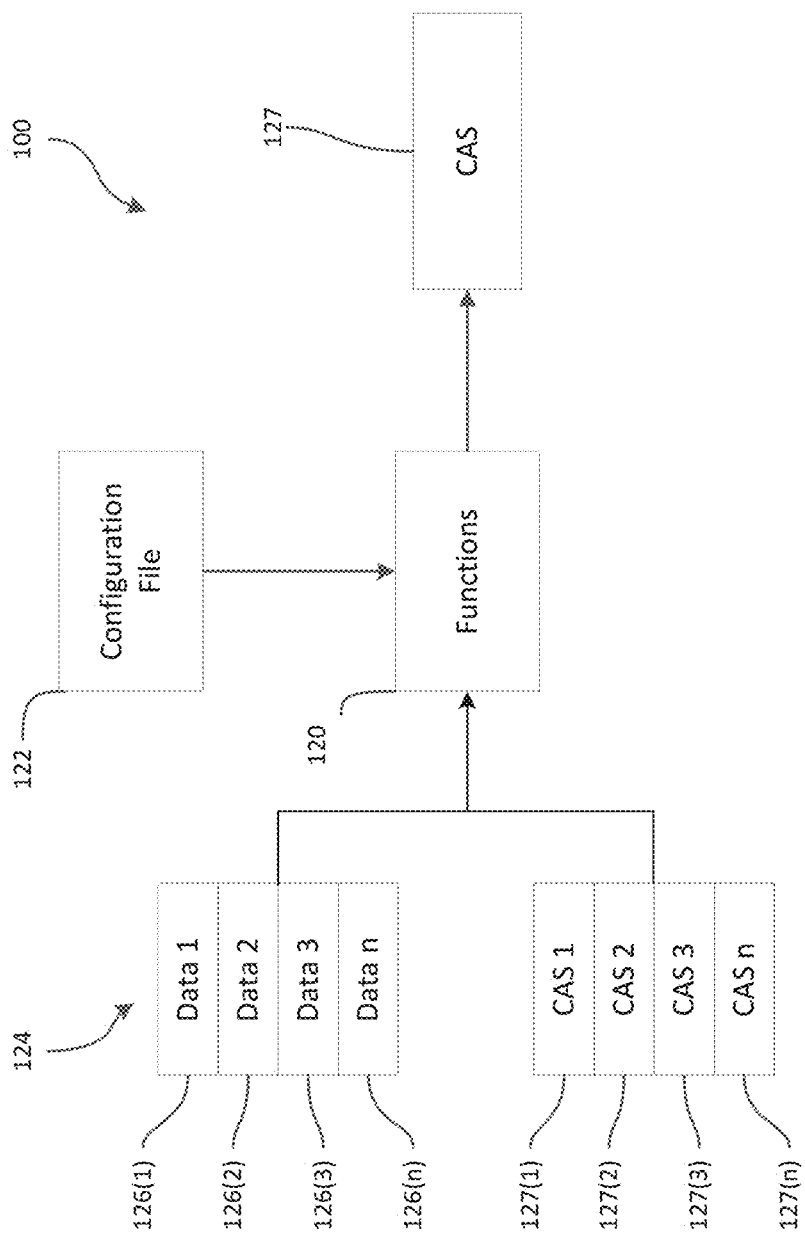
FIG. 6 is a flow diagram illustrating data flow within an instrumentation system according to one or more embodiments of the disclosure.
Figure 7:
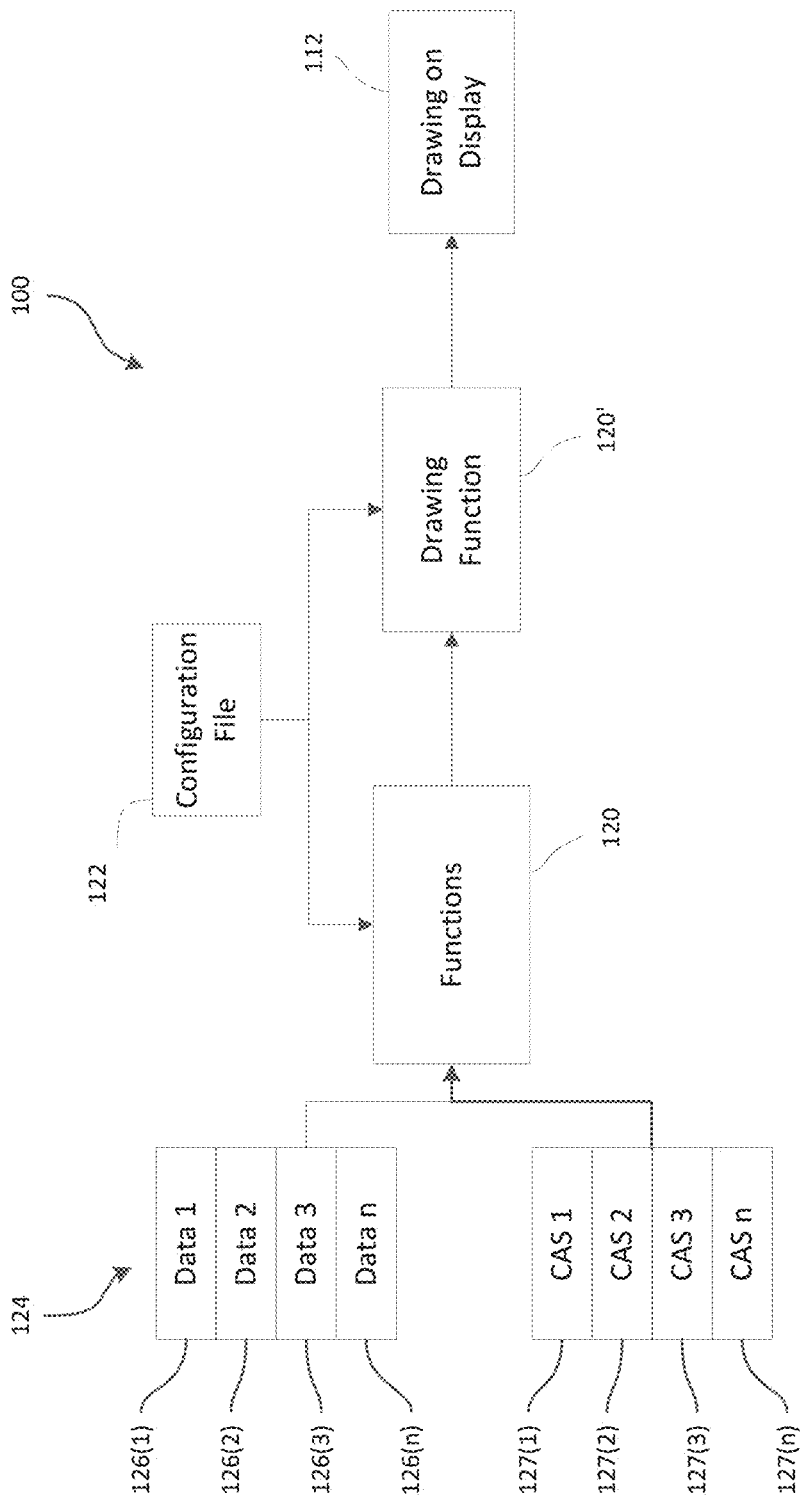
FIG. 7 is a flow diagram illustrating data flow within an instrumentation system according to one or more embodiments of the disclosure.

Referring now to FIGS. 6 and 7, flow diagrams illustrating data flow within an IDU 100 according to one or more embodiments of the disclosure are shown. In some embodiments, the configuration file 122 can be used to setup a variety of logical tests that control creation of configurable messages, such as CAS messages 127, (e.g., FIG. 6) and the appearance of configurable messages and symbology for output to display 112 (e.g., FIG. 7). As shown in FIG. 6, the configuration file 122 may include one or more parameters that define creation of a CAS message 127. The CAS message 127 may be created, for example, from one or more pieces of data 126(1)-(n). CAS messages 127 may comprise various pieces of information or alerts for a user of the IDU 100 and may be customized by a user as desired. For example, the configuration file 122 may include a parameter that creates a CAS message 127 when an altitude falls below a certain value. Information regarding altitude may be obtained from one or more sensors 104 and/or memory 108. When the condition is met, the functions 120 outputs the CAS message 127, which may be stored in the addressable memory 124 for future use (e.g., logging, display, etc.).

Custom CAS Message and Symbology Element Validity

In some embodiments, the configuration file 122 defines for the functions 120 custom CAS messages 127(1)-(n) or symbology elements to appear (uninhibited) or disappear (inhibited) based upon various conditions. This concept is termed validity. Validities are used to trigger custom CAS messages 127. They can also be used to alter the behavior of display elements by making appearance/disappearance conditional. This can be used to change the applicable limitations of an engine gauge or to show additional graphical elements for different operating conditions (i.e., engine start, engine out, one engine inoperative, etc.). For example, as shown in FIG. 7, the functions 120 may been broken out to indicate a drawing function 120' that may be used to carry out changes to the behavior of the display elements after validity has been determined by the functions 120. For example, a parameter may require display of a message when a plane's altitude falls below a specified value. When that condition is triggered, validation by functions 120 permits the drawing function 120' to process the CAS message 127 for output to the display 112. As discussed previously, the functions 120 comprises a variety of functions (which may include the drawing function 120').

Possible validity types may comprise the following:

TABLE 13

| Validity | Notes |
| --- | --- |
| Less Than | Considered valid if the tied parameter is less than the reference value. |
| Less Than or Equal To | Considered valid if the tied parameter is less than or equal to the reference value. |
| Equal | Considered valid if the tied parameter is equal to the reference value. |
| Not Equal | Considered valid if the tied parameter is not equal to the reference value. |
| Greater Than or Equal To | Considered valid if the tied parameter is greater than or equal to the reference value. |
| Greater Than | Considered valid if the tied parameter is greater than the reference value. |
| CAS Inhibit | Considered valid if the reference CAS message is in a normal state (not active). |
| CAS Uninhibit | Considered valid if the reference CAS message is in an active state (either ANNUNCIATE, CAUTION or WARNING). |
| Label Valid | Considered valid if the tied parameter is in Normal Operation or Test condition. |
| Label Invalid | Considered valid if the tied parameter is in No Computed Data or Failure Warning condition. |
| Low Fuel Caution Inhibit | Considered valid if the Low Fuel Caution is not active (not CAUTION). |
| Low Fuel Caution Uninhibit | Considered valid if the Low Fuel Caution is in an active state (CAUTION). |
| Low Fuel Warning Inhibit | Considered valid if the Low Fuel Warning is not active (not WARNING). |
| Low Fuel Warning Uninhibit | Considered valid if the Low Fuel Warning is in an active state (WARNING). |
| OASIS Miscompare Inhibit | Considered valid if there are no BNR label-driven OASIS symbology elements in a miscompare state. |
| OASIS Miscompare Uninhibit | Considered valid if any BNR label-driven OASIS symbology element is in a miscompare state. |
| Exceedance Caution Inhibit | Considered valid if an Exceedance Caution condition is not active (not CAUTION). |
| Exceedance Caution Uninhibit | Considered valid if an Exceedance Caution condition is in an active state (CAUTION). |
| Exceedance Warning Inhibit | Considered valid if an Exceedance Warning condition is not active (not WARNING). |
| Exceedance Warning Uninhibit | Considered valid if an Exceedance Warning condition is in an active state (WARNING). |
| NVG Inhibit | Considered valid if the NVG discrete input is not asserted. |
| NVG Uninhibit | Considered valid if the NVG discrete input is asserted. |

TABLE 13-continued

| Validity | Notes |
|---|---|
| Starter Engaged Inhibit | Considered valid if the Starter Engaged discrete input is not asserted. |
| Starter Engaged Uninhibit | Considered valid if the Starter Engaged discrete input is asserted. |
| WOG Inhibit | Considered valid if the EFIS system is in AIR mode. |
| WOG Uninhibit | Considered valid if the EFIS system is in GROUND mode. |
| 1 Hz Flash | Considered valid or invalid in such a way that the element flashes at 1 Hz with a 60% On/40% Off duty cycle |
| 2 Hz Flash | Considered valid or invalid in such a way that the element flashes at 2 Hz with a 60% On/40% Off duty cycle |

Using the above validity types, it is possible to setup 15 validities for each custom CAS message 127 or symbology element as follows:

TABLE 14

| Validity Parameter | Choices | Notes |
|---|---|---|
| Logic Type | Logical AND, OR, or XOR | Up to 8 validities can be setup for each custom CAS message or symbology element. These validities can be analyzed using a Logical AND, OR, or XOR. |
| | | For each validity (up to 8): |
| Validity Type | | See validity type table in Table 13. |
| Label Number | Octal 0 to Octal 377 | If the validity type requires a tied parameter, this is the label to acquire the tied parameter data. |
| LSB | Valid bit number within ARINC429 word | If the validity type requires a tied parameter, and the tied parameter data is not BNR data (i.e., either a DDW label or a bitfield within a BNR label), then this is the Least Significant Bit. |
| MSB | Valid bit number within ARINC429 word. | If the validity type requires a tied parameter, and the tied parameter data is not BNR data (i.e., either a DDW label or a bitfield within a BNR label), then this is the Most Significant Bit. It must be equal to or greater than the LSB. |
| Primary Port | 1 through 42 | If the validity type requires a tied parameter, this is the primary port to acquire the tied parameter data. |
| Secondary Port | 1 through 42 | If the validity type requires a tied parameter, this is the secondary port to acquire the tied parameter data. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence |
| Reference Value | See notes | If the validity type requires a reference value, this is that reference value. |
| CAS Index | See notes | For validity types CAS Inhibit and CAS Uninhibit, a CAS index must be provided. Provide a positive number (base 1) to reference a custom CAS message. The custom CAS messages are numbered in the order in which they are defined in the configuration file. Provide a negative number (base 1) to reference an EFIS-defined CAS message. |

Custom CAS Message and Symbology Element Limit Types

In some embodiments, limit types determine the color and behavior of custom CAS messages 127 and certain symbology elements. Limit types may be defined as parameters in the configuration file 122. Examples of possible limit types are set forth in Table 15 below:

TABLE 15

| Limit Type | Notes |
| --- | --- |
| Blue Above | For Custom CAS Message:<br>Treated as an ANNUNCIATE<br>CAS message inhibited until Debounce period expires<br>For Symbology Element:<br>Pointer-type elements draw a blue arc at or above this limit<br>Tape, fuel level and pointer is BLUE at or above the limit value<br>Debounce and Exceedance time periods ignored |
| Cyan Above | For Custom CAS Message:<br>Treated as an ANNUNCIATE<br>CAS message inhibited until Debounce period expires<br>For Symbology Element:<br>Pointer-type elements draw a cyan arc at or above this limit<br>Tape, fuel level and pointer is CYAN at or above the limit value<br>Debounce and Exceedance time periods ignored |
| Gray Above | For Custom CAS Message:<br>Treated as an ANNUNCIATE<br>CAS message inhibited until Debounce period expires<br>For Symbology Element:<br>Pointer-type elements draw a light gray arc at or above this limit<br>Tape, fuel level and pointer is Gray at or above the limit value<br>Debounce and Exceedance time periods ignored |
| Green Above | For Custom CAS Message:<br>Treated as an ANNUNCIATE<br>CAS message inhibited until Debounce period expires<br>For Symbology Element:<br>Pointer-type elements draw a green arc at or above this limit<br>Tape, fuel level and pointer is Green at or above the limit value<br>Debounce and Exceedance time periods ignored |
| Magenta Above | For Custom CAS Message:<br>Treated as an ANNUNCIATE<br>CAS message inhibited until Debounce period expires<br>For Symbology Element:<br>Pointer-type elements draw a magenta arc at or above this limit<br>Tape, fuel level and pointer is Magenta at or above the limit value<br>Debounce and Exceedance time periods ignored |
| Yellow Above | For Custom CAS Message:<br>Treated as a CAUTION<br>CAS message inhibited until Debounce period expires<br>For Symbology Element:<br>Pointer-type elements draw a yellow arc at or above this limit<br>Tape-type elements draw a yellow line at this limit<br>Tape, fuel level and pointer is Yellow at or above the limit value<br>Prior to expiration of Debounce time period, digital readout does not flash<br>After expiration of Debounce time period, digital readout flashes at 1 Hz until Warning/Caution Acknowledge discrete input is asserted<br>Exceedance time period ignored |
| Yellow Above with Exceedance Message | For Custom CAS Message:<br>Treated as a CAUTION<br>CAS message inhibited until Debounce period expires<br>Exceedance characterization ignored<br>For Symbology Element:<br>Pointer-type elements draw a yellow arc at or above this limit<br>Tape-type elements draw a yellow line at this limit<br>Tape, fuel level and pointer is Yellow at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted<br>Limit Type Notes |

TABLE 15-continued

| Limit Type | Notes |
| --- | --- |
| Yellow Above with Exceedance Message and Exceedance Logging | For Custom CAS Message:<br>Treated as a CAUTION<br>CAS message inhibited until Debounce period expires<br>Exceedance characterization ignored<br>For Symbology Element:<br>Pointer-type elements draw a yellow arc at or above this limit<br>Tape-type elements draw a yellow line at this limit<br>Tape, fuel level and pointer is Yellow at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Yellow Above with Exceedance Logging | For Custom CAS Message:<br>Treated as a CAUTION<br>CAS message inhibited until Debounce period expires<br>Exceedance characterization ignored<br>For Symbology Element:<br>Pointer-type elements draw a yellow arc at or above this limit<br>Tape-type elements draw a yellow line at this limit<br>Tape, fuel level and pointer is Yellow at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Yellow Above with Red Exceedance | For Custom CAS Message:<br>Prior to expiration of Exceedance time period, treated as a CAUTION<br>After expiration of Exceedance time period, treated as a WARNING<br>CAS message inhibited until Debounce period expires<br>For Symbology Element:<br>Pointer-type elements draw a yellow arc at or above this limit<br>Tape-type elements draw a yellow line at this limit<br>Prior to expiration of Exceedance time period, tape, fuel level and pointer is Yellow at or above the limit value<br>After expiration of Exceedance time period, tape, fuel level and pointer is RED at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Yellow Above with Red Exceedance Message | For Custom CAS Message:<br>Prior to expiration of Exceedance time period, treated as a CAUTION<br>After expiration of Exceedance time period, treated as a WARNING<br>CAS message inhibited until Debounce period expires<br>For Symbology Element:<br>Pointer-type elements draw a yellow arc at or above this limit<br>Tape-type elements draw a yellow line at this limit<br>Prior to expiration of Exceedance time period, tape, fuel level and pointer is Yellow at or above the limit value<br>After expiration of Exceedance time period, tape, fuel level and pointer is RED at or above the limit value<br>Prior to expiration of Debounce time period, digital readout does not flash |

TABLE 15-continued

| Limit Type | Notes |
|---|---|
| | After expiration of Debounce time period and prior to expiration of Exceedance time period, digital readout flashes at 1 Hz until Warning/Caution Acknowledge discrete input is asserted
After expiration of Exceedance time period, digital readout flashes at 2 Hz until Warning/Caution Acknowledge discrete input is asserted |
| Yellow Above with Red Exceedance Message and Exceedance Logging | For Custom CAS Message:
Prior to expiration of Exceedance time period, treated as a CAUTION
After expiration of Exceedance time period, treated as a WARNING
CAS message inhibited until Debounce period expires
For Symbology Element:
Pointer-type elements draw a yellow arc at or above this limit
Tape-type elements draw a yellow line at this limit
Prior to expiration of Exceedance time period, tape, fuel level and pointer is Yellow at or above the limit value
After expiration of Exceedance time period, tape, fuel level and pointer is RED at or above the limit value
Prior to expiration of Debounce time period, digital readout does not flash
After expiration of Debounce time period and prior to expiration of Exceedance time period, digital readout flashes at 1 Hz until Warning/Caution Acknowledge discrete input is asserted
After expiration of Exceedance time period, digital readout flashes at 2 Hz until Warning/Caution Acknowledge discrete input is asserted |
| Yellow Above with Red Exceedance Logging | For Custom CAS Message:
Prior to expiration of Exceedance time period, treated as a CAUTION
After expiration of Exceedance time period, treated as a WARNING
CAS message inhibited until Debounce period expires
For Symbology Element:
Pointer-type elements draw a yellow arc at or above this limit
Tape-type elements draw a yellow line at this limit
Prior to expiration of Exceedance time period, tape, fuel level and pointer is Yellow at or above the limit value
After expiration of Exceedance time period, tape, fuel level and pointer is RED at or above the limit value
Prior to expiration of Debounce time period, digital readout does not flash
After expiration of Debounce time period and prior to expiration of Exceedance time period, digital readout flashes at 1 Hz until Warning/Caution Acknowledge discrete input is asserted
After expiration of Exceedance time period, digital readout flashes at 2 Hz until Warning/Caution Acknowledge discrete input is asserted |
| Red Above (Draw Arc) | For Custom CAS Message:
Treated as a WARNING
CAS message inhibited until Debounce period expires
For Symbology Element:
Pointer-type elements draw a red arc at or above this limit
Tape-type elements draw a red line at this limit
Tape, fuel level and pointer is Red at or above the limit value
Prior to expiration of Debounce time period, digital readout does not flash
After expiration of Debounce time period and prior to expiration of Exceedance time period, digital readout flashes at 1 Hz until Warning/Caution Acknowledge discrete input is asserted
After expiration of Exceedance time period, digital readout flashes at 2 Hz until Warning/Caution Acknowledge discrete input is asserted |
| Red Above with Exceedance Message (Draw Arc) | For Custom CAS Message:
Treated as a WARNING
CAS message inhibited until Debounce period expires
Exceedance characterization ignored |

TABLE 15-continued

| Limit Type | Notes |
| --- | --- |
| | For Symbology Element:<br>Pointer-type elements draw a red arc at or above this limit<br>Tape-type elements draw a red line at this limit<br>Tape, fuel level and pointer is Red at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Red Above with Exceedance Message and Exceedance Logging (Draw Arc) | For Custom CAS Message:<br>Treated as a WARNING<br>CAS message inhibited until Debounce period expires<br>Exceedance characterization ignored<br>For Symbology Element:<br>Pointer-type elements draw a red arc at or above this limit<br>Tape-type elements draw a red line at this limit<br>Tape, fuel level and pointer is Red at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Red Above with Exceedance Logging (Draw Arc) | For Custom CAS Message:<br>Treated as a WARNING<br>CAS message inhibited until Debounce period expires<br>Exceedance characterization ignored<br>For Symbology Element:<br>Pointer-type elements draw a red arc at or above this limit<br>Tape-type elements draw a red line at this limit<br>Tape, fuel level and pointer is Red at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Red Above (Draw Radial Line) | For Custom CAS Message:<br>Treated as a WARNING<br>CAS message inhibited until Debounce period expires<br>For Symbology Element:<br>Pointer-type elements draw a gray arc at or above this limit and a red radial line at this limit<br>Tape-type elements draw a red line at this limit<br>Tape, fuel level and pointer is Red at or above the limit value<br>Prior to expiration of Debounce time period, digital readout does not flash<br>After expiration of Debounce time period and prior to expiration of Exceedance time period, digital readout flashes at 1 Hz until Warning/Caution Acknowledge discrete input is asserted<br>After expiration of Exceedance time period, digital readout flashes at 2 Hz until Warning/Caution Acknowledge discrete input is asserted |
| Red Above with Exceedance Message (Draw Radial Line) | For Custom CAS Message:<br>Treated as a WARNING<br>CAS message inhibited until Debounce period expires<br>Exceedance characterization ignored<br>For Symbology Element:<br>Pointer-type elements draw a gray arc at or above this limit and a red radial line at this limit<br>Tape-type elements draw a red line at this limit<br>Tape, fuel level and pointer is Red at or above the limit value |

TABLE 15-continued

| Limit Type | Notes |
|---|---|
| | Prior to expiration of Debounce time period, digital readout does not flash |
| | After expiration of Debounce time period and prior to expiration of Exceedance time period, digital readout flashes at 1 Hz until Warning/Caution Acknowledge discrete input is asserted |
| | After expiration of Exceedance time period, digital readout flashes at 2 Hz until Warning/Caution Acknowledge discrete input is asserted |
| Red Above with Exceedance Message and Exceedance Logging (Draw Radial Line) | For Custom CAS Message: Treated as a WARNING CAS message inhibited until Debounce period expires Exceedance characterization ignored For Symbology Element: Pointer-type elements draw a gray arc at or above this limit and a red radial line at this limit Tape-type elements draw a red line at this limit Tape, fuel level and pointer is Red at or above the limit value Prior to expiration of Debounce time period, digital readout does not flash After expiration of Debounce time period and prior to expiration of Exceedance time period, digital readout flashes at 1 Hz until Warning/Caution Acknowledge discrete input is asserted After expiration of Exceedance time period, digital readout flashes at 2 Hz until Warning/Caution Acknowledge discrete input is asserted |
| Red Above with Exceedance Logging (Draw Radial Line) | For Custom CAS Message: Treated as a WARNING CAS message inhibited until Debounce period expires Exceedance characterization ignored For Symbology Element: Pointer-type elements draw a gray arc at or above this limit and a red radial line at this limit Tape-type elements draw a red line at this limit Tape, fuel level and pointer is Red at or above the limit value Prior to expiration of Debounce time period, digital readout does not flash After expiration of Debounce time period and prior to expiration of Exceedance time period, digital readout flashes at 1 Hz until Warning/Caution Acknowledge discrete input is asserted After expiration of Exceedance time period, digital readout flashes at 2 Hz until Warning/Caution Acknowledge discrete input is asserted |

Custom CAS Messages

Still referring to FIG. 6, in some embodiments, the configuration file 122 defines CAS messages 127(1)-(n). For example, the IDU 100 defines up to 1024 custom CAS messages 127. Custom CAS messages 127 may appear together with normal EFIS warnings, in a CAS Display Box element on an IDU 100 display page or both. Custom CAS messages may be setup as set forth below in Table 16:

TABLE 16

| Parameter | Choices | Notes |
|---|---|---|
| Location | OASIS Only EFIS Only Both | Determines where this custom CAS message appears. |
| Validity | | See validity setup table in Table 13. |
| CAS Message Text* | Character String | If EFIS Only or Both, ensure that the string has 12 characters or less. Otherwise, size to fit the CAS Display Box element. Maximum characters is 31. Note that if the string has no characters, then no CAS message tile is created. This property is useful for creating discrete inputs and discrete outputs without also generating a viewable CAS message. |
| CAS Log File Text | Character String | Used to name a column in the log file. Maximum characters is 31. |
| IDU1 Aural* | See Notes | If no associated aural is desired for the custom CAS message, set this value to 99. Not otherwise used on the IDU-3, IDU-450 or IDU-680. |

TABLE 16-continued

| Parameter | Choices | Notes |
| --- | --- | --- |
| Aural Index | See Notes | (i.e., msg00 = 0, etc.). If IDU1 Aural is set to 99, then this value is ignored. Note that in addition to the predefined system aurals in voices.txt, custom OASIS aurals can be recorded. These are referenced starting from index 1000. |
| Limit Type | | See limit type description in Table 15. |
| Limit Debounce Period | See Notes | Affects behavior in accordance with limit type description in Table 15. |
| Limit Exceedance Period | See Notes | Affects behavior in accordance with limit type description in Table 15. |
| Discrete Output Tie | See Notes | It is theoretically possible to drive up to sixteen separate discrete outputs (4 screens per system side × 4 discrete outputs per screen on IDU-450/IDU-680) from the OASIS - therefore 16 discrete output ties are made available. Which OASIS-tied discrete output is triggered by this CAS message is set here. Possible values are OASIS_DO01 through OASIS_DO16. Note that the discrete output function and polarity must also be set in the aircraft limits. |
| Discrete Input Tie | See Notes | Index number for the discrete input to trigger from this CAS message. |

Referring now to FIG. 7, a flow diagram illustrating data flow within an IDU 100 according to one or more embodiments of the disclosure is shown. In some embodiments, the configuration file 122 may be used to arrange drawing primitives for the display 112. The display 112 can include a standalone image or can include image that is overlayed onto an existing page created by underlying software on the instrumentation system 10. The configuration file 122 can accommodate two PFD overlay pages (one for the Normal PFD and one for the Basic PFD) and up to ten display pages (numbered 1 through 10) for each IDU 100 (e.g, one or more IDU 100s for a Pilot and a Co-Pilot). Defining Co-Pilot side display pages is optional. If Co-Pilot side display pages are not defined, then both sides use the display pages defined for the Pilot side.

On an IDU 100 having a 640×960 resolution, two page sizes are available, either a 640×480 pixel size or a 640×960 pixel size. Other IDU 100 types only support the 640×480 pixel size. Upon initialization of the instrumentation system 10, display page number 1 (if type EICAS) is active by default. Display page number 1 (if type EICAS) is also the Essential Mode EICAS page unless it is size 640×960, in which case, display page number 2 is the Essential Mode EICAS page and must be defined as a 640×480 pixel size and type EICAS.

In some embodiments, the IDU 100 generates outputs to the display 112 based upon information stored in data 126(1)-(n) and/or custom CAS messages 127(1)-(n). For example, the configuration file 122 may contain parameters that define a new output based upon data stored in the addressable memory 124. A new output such as data 126(3) may be calculated based upon data 126(1) and data 126(2). Data 126(3) is generated by the functions 120 as instructed by the configuration file 122 and stored in the addressable memory 124. After data 126(3) has been written to addressable memory 124, a drawing that provides information relating to data 126(3) can be output to the display 112. The output to display 112 is parameterized by the configuration file 122. Depending on the type of information and a user's preferences, the configuration file 122 can specify a drawing in various ways, some of which are discussed below in more detail. For example, a drawing describing data 126(3) can be output to the display 112 via various graphical and/or textual ways.

In some embodiments, display elements may be dynamically output to the display 112 in order to highlight points of interest. In a typical embodiment, data for dynamically positioning a symbology element is received from a data source, such as, for example, a sensor 104 or the addressable memory 124. The sensor 104 or the addressable memory 124 may provide the following types of information: 1) Direct X and Y pixel positions that identify a specified location on screen); 2) Radial and distance from ownship (this could be 2D transformed into a position on a God's-eye view such as a moving map; 3) latitude and longitude or map Grid positions (this could be 2D transformed into a position on a God's-eye view such as a moving map); and 4) either 2 or 3 above in conjunction with altitude information (either relative altitude or absolute altitude such as altitude above MSL). In addition to a 2D transformation, a 3D transformation can be performed to render a symbol in perspective on a pilot's-eye display such as a Synthetic Vision Primary Flight Display.

Overlay display page configuration may be configured as set forth in Table 17 below:

TABLE 17

| Parameter | Choices | Notes |
| --- | --- | --- |
| Page Side | | Not Used |
| Page Number | | Not Used |
| Page Name | | Not Used set by tool to "BASIC PFD OVRL" or "NORMAL PFD OVRL" |
| Page Size | | Set by tool to 640x480 |
| Backup | | Not Used |
| Type | PFD BASIC or PFD NORMAL | Tells system that this is a Basic or Normal PFD overlay page. |

IDU 100 display page configuration is set forth below in Table 18:

TABLE 18

| Parameter | Choices | Notes |
|---|---|---|
| Page Side | Pilot or Co-Pilot | |
| Page Number | 1 through 10 | |
| Page Name | Character String | This string is shown in menu system tiles for page selection. For IDU-3 and IDU-450, the maximum displayable string length is 10 characters. For IDU-680, the menu label can be split into two lines by including a space. The maximum displayable length of each line is 6 characters. These limitations should be kept in mind when setting up a configuration file. |
| Page Size | 640x480 or 640x960 | |
| Backup | 1 through 10 | If a 640x960 page is defined, then this parameter specifies the index of a related 640x480 page that is used whenever 640x960 operation is no longer possible (i.e., due to menu action, use of the flight planner or TAWS popup operation). |
| Type | EICAS or GENERIC | Specify OASIS to tell the system that this page is an engine or systems display. Used by the system to identify default initialization page, Essential EICAS page and to enable the Exceedance menu. |

Display/PFD Overlay Page Symbology Elements

In some embodiments, each IDU 100 display/PFD overlay page accommodates up to 512 standardized symbology elements. This allows virtually any type of display page to be constructed with the configuration file 122. Standardized symbology elements are rendered in the order in which they are defined in the configuration file (i.e., the last element defined overwrites all others). Table 19 below lists standardized symbology elements:

TABLE 19

| Element | Notes |
|---|---|
| Graphical Elements: | |
| Line | Draws a line between defined screen locations |
| Arc | Draws a circular arc based upon a center point, radius and start and end radials |
| Box | Draws a four-sided polygon with square corners based upon upper-left and lower-right points. When filled, can be shaded. |
| Circle | Draws a circle based upon a center point and a radius. When filled, can be shaded. |
| Polygon | Draws a closed polygon with up to 10 vertices |
| Text | Draws text at a defined screen location |
| Group Box | Draws a box to graphically group indicators |
| CAS Display Box | Draws a box to display custom CAS messages |
| Indication Elements: | |
| Tape with Top Readout | Draws a tape indicator with a digital readout on top of the tape |
| Tape with Bottom Readout | Draws a tape indicator with a digital readout below the tape |
| Single Pointer | Draws a circular gauge with a single pointer and digital readout |
| Left Opposing Dual Pointer | Draws the left parameter pointer of a gauge containing opposing pointers |
| Right Opposing Dual Pointer | Draws the right parameter pointer of a gauge containing opposing pointers |
| Left Twin-Engine Dual Pointer | Draws the left engine parameter of a gauge containing opposing pointers |
| Right Twin-Engine Dual Pointer | Draws the right engine parameter of a gauge containing opposing pointers |
| Inner Concentric Twin-Engine Pointer | Draws the inner pointer (#1 engine) of a gauge containing concentric pointers |
| Outer Concentric Twin-Engine Pointer | Draws the outer pointer (#2 engine) of a gauge containing concentric pointers |
| Fuel Tank | Draws a fuel tank indication |
| Aircraft Total Fuel | Draws a total fuel indication (from totalizer quantity or sum of all tanks) |
| Digital Parameter Indication | Draws a digital parameter indication |
| Generic Pointer with Arc Movement (Inward Pointer) | Draws a generic pointer that moves in an arc with the pointer pointing to the arc center |
| Generic Pointer with Arc Movement (Outward Pointer) | Draws a generic pointer that moves in an arc with the pointer pointing away from the arc center |
| Generic Pointer with Linear Movement (Downward Pointer) | Draws a generic pointer that moves laterally with the pointer pointing downward |
| Generic Pointer with Linear Movement (Upward Pointer) | Draws a generic pointer that moves laterally with the pointer pointing upward |
| Generic Pointer with Linear Movement (Leftward Pointer) | Draws a generic pointer that moves vertically with the pointer pointing leftward |
| Generic Pointer with Linear Movement (Rightward Pointer) | Draws a generic pointer that moves vertically with the pointer pointing rightward |

TABLE 19-continued

| Element | Notes |
|---|---|
| Triple Tach Nf1 Pointer | Draws the NF1 pointer of a circular triple tach |
| Triple Tach Nf2 Pointer | Draws the NF2 pointer of a circular triple tach |
| Triple Tach Nr Pointer | Draws the Nr pointer of a circular triple tach |
| Horizontal Limit Indicator Bar | Draws a horizontal bar with limits indications for use with an Downward or Upward Pointer |
| Vertical Limit Indicator Bar | Draws a vertical bar with limits indications for use with a Leftward or Rightward Pointer |
| Timer | Draws either a Count Up or Count Down Timer |
| Clock | Draws a digital clock |

Analog Indicator Element Normalization

All analog indication elements are capable of normalization. Normalization refers to associating certain locations on the analog scale with specific readout values such that an analog indication's behavior can be altered from strictly linear. This can be used to highlight and add resolution to certain areas of interest for the indicator. It can also be used to bring normal positions into alignment for quick scanning.

Linear indicators (tapes and fuel tanks) can be linearized, for example, with linear with 8 equal spaces (9 points) along their length from bottom to top. FIG. 8(a) illustrates a linear indicator. Dual pointer indicators can be linearized, for example, with 8 equal spaces (9 points) along their respective arcs. FIG. 8(b) illustrates an example of a dual pointer indicator. Other pointer indicators, such as round indicators can be linearized with 6 equal spaces (7 points) from the 6 O'Clock to 12 O'Clock positions and 2 equal spaces (3 points) from the 12 O'Clock to 3 O'Clock positions. FIG. 8(c) illustrates an example of a round indicator.

Digital Parameter Readout Used by Elements

In Normal Operation condition, digital parameter readouts can appear as set forth in Table 20 below:

TABLE 20

| Limits Type Region | Normal Appearance | Reverse Appearance (for Flashing) |
|---|---|---|
| Blue Above<br>Cyan Above<br>Gray Above<br>Green Above<br>Magenta Above | "Green Above" depicted. Color usage as follows:<br>"Blue Above" → Blue<br>"Cyan Above" → Cyan<br>"Gray Above" → White<br>"Green Above" → Green<br>"Magenta Above" → Magenta<br>Above is modified for Fuel Tank and Aircraft Total Fuel elements as follows:<br>All → White | Not Applicable |
| Yellow Above<br>Yellow Above with Exceedance Message<br>Yellow Above with Exceedance Message and Exceedance Logging<br>Yellow Above with Exceedance Logging<br>Yellow Above with Red Exceedance<br>Yellow Above with Red Exceedance Message<br>Yellow Above with Red Exceedance Message and Exceedance Logging<br>Yellow Above with Red Exceedance Logging | For types "Yellow Above with Red. . .," this is appearance prior to exceedance timeout. | For types "Yellow Above with Red. . .," this is appearance prior to exceedance timeout. |
| Yellow Above with Red Exceedance<br>Yellow Above with Red Exceedance Message<br>Yellow Above with Red Exceedance Message and Exceedance Logging<br>Yellow Above with Red Exceedance Logging<br>Red Above (Draw Arc)<br>Red Above with Exceedance Message (Draw Arc)<br>Red Above with Exceedance Message and Exceedance Logging (Draw Arc)<br>Red Above with Exceedance Logging (Draw Arc) | For types "Yellow Above with Red. . .," this is appearance after exceedance timeout. | For types "Yellow Above with Red. . .," this is appearance after exceedance timeout. |

TABLE 20-continued

| Limits Type Region | Normal Appearance | Reverse Appearance (for Flashing) |
|---|---|---|
| Red Above (Draw Radial Line) | | |
| Red Above with Exceedance Message (Draw Radial Line) | | |
| Red Above with Exceedance Message and Exceedance Logging (Draw Radial Line) | | |
| Red Above with Exceedance Logging (Draw Radial Line) | | |

Under special conditions, digital parameter readouts can appear as set forth in Table 21 below:

TABLE 21

| Special Condition | Appearance |
|---|---|
| Miscompare Condition, defined as: Dual sources setup; Both sources in Normal Operation Condition; AND Miscompare threshold exceeded for longer than miscompare time period. | Note: Asterisk added to readout. Example shows "Green Above" Limits Type Region. |
| Test Condition | Note: "T" added to readout. Example shows "Green Above" |
| No Computed Data Condition Failure Warning Condition | Limits Type Region. |

Line Element

"Line" elements appear when valid (see Table 13). FIG. 8(d) illustrates an exemplary "line" element. "Line" elements draw customizable lines that can be drawn over existing pages or onto new pages. "Line" elements can be defined as set forth in Table 22 below:

TABLE 22

| Parameter | Choices | Notes |
|---|---|---|
| Validity | | See validity setup table in Table 13. |
| Starting X-Position Value | | X-pixel position, allowed to be off-screen |
| Starting Y-Position Value | | Y-pixel position, allowed to be off-screen |
| Ending X-Position Value | | X-pixel position, allowed to be off-screen |
| Ending Y-Position Value | | Y-pixel position, allowed to be off-screen |
| Line Color | Numeric Value Index | Index value from colors.h. |
| Dash Flag | ON or OFF | If ON, line is dashed. If OFF, line is solid |
| Halo Flag | ON or OFF | If ON, line is haloed with black pixels. If OFF, line is not haloed. |
| Line Thickness | Integer Thickness | Line thickness in pixels. |

Arc Element

"Arc" elements appear when valid (e.g., see Table 13). FIG. 8(e) illustrates an exemplary "arc" element. "Arc" elements draw customizable circular arcs. "Arc" elements can be drawn over existing display pages or can be drawn on new pages. "Arc elements can be defined as set forth in Table 23 below:

TABLE 23

| Parameter | Choices | Notes |
|---|---|---|
| Validity | | See validity setup table in Table 13. |
| Center X-Position Value | | X-pixel position, allowed to be off-screen |
| Center Y-Position Value | | Y-pixel position, allowed to be off-screen |
| Starting Angle | Numeric Value | Starting angle in degrees from directly right. Note that arcs are always drawn clockwise. |
| Ending Angle | Numeric Value | Ending angle in degrees from directly right. Note that arcs are always drawn clockwise. |
| Arc Color | Numeric Value Index | Index value from colors.h. |
| Dash Flag | ON or OFF | If ON, arc is dashed. If OFF, arc is solid |
| Halo Flag | ON or OFF | If ON, arc is haloed with black pixels. If OFF, arc is not haloed. |

TABLE 23-continued

| Parameter | Choices | Notes |
| --- | --- | --- |
| Arc Radius | Numeric Value | Arc radius in pixels. |
| Arc Thickness | Integer Thickness | Arc thickness in pixels. |

Box Element

"Box" elements appear when valid (see Table 13). "Box" elements draw customizable boxes (four-sided polygons with square corners) and can be defined as set forth below in Table 24:

TABLE 24

| Parameter | Choices | Notes |
| --- | --- | --- |
| Validity | | See validity setup table in Table 13. |
| Upper Left X-Position Value | | X-pixel position, allowed to be off-screen. This is the X-pixel position for the upper left corner of the group box. |
| Upper Left Y-Position Value | | Y-pixel position, allowed to be off-screen. This is the Y-pixel position for the upper left corner of the group box. |
| Lower Right X-Position Value | | X-pixel position, allowed to be off-screen. This is the X-pixel position for the lower right corner of the group box. |
| Lower Right Y-Position Value | | Y-pixel position, allowed to be off-screen. This is the Y-pixel position for the lower right corner of the group box. |
| Box Color | Numeric Value Index | Index value from colors.h. Note that in the case of a filled box, color 128 causes a shaded box rather than a color-filled box. |
| Dash Flag | ON or OFF | If ON, box outline is dashed. If OFF, box outline is solid. Not applicable if Fill Flag is ON. |
| Fill Flag | ON or OFF | If ON, box is filled. If OFF, box is hollow. |
| Halo Flag | ON or OFF | If ON, box is haloed with black pixels. If OFF, box is not haloed. Not applicable if Fill Flag is ON and Box Color is 128. |
| Box Thickness | Integer Thickness | Box outline thickness in pixels. Not applicable if Fill Flag is ON. |

Circle Element

"Circle" elements appear when valid (see Table 13). FIG. 8(f) illustrates an exemplary "circle" element. "Circle" elements draw customizable circles that can be drawn over existing pages or onto new pages. "Circle" elements can be defined as set forth in Table 25 below:

TABLE 25

| Parameter | Choices | Notes |
| --- | --- | --- |
| Validity | | See validity setup table in Table 13. |
| Center X-Position Value | | X-pixel position, allowed to be off-screen |
| Center Y-Position Value | | Y-pixel position, allowed to be off-screen |
| Circle Color | Numeric Value Index | Index value from colors.h. Note that in the case of a filled circle, color 128 causes a shaded circle rather than a color-filled circle. |
| Dash Flag | ON or OFF | If ON, circle outline is dashed. If OFF, circle outline is solid. Not applicable if Fill Flag is ON. |
| Fill Flag | ON or OFF | If ON, circle is filled. If OFF, circle is hollow. |
| Halo Flag | ON or OFF | If ON, circle is haloed with black pixels. If OFF, circle is not haloed. Not applicable if Fill Flag is ON and Box Color is 128. |
| Circle Radius | Numeric Value | Circle radius in pixels. |
| Circle Thickness | Integer Thickness | Circle outline thickness in pixels. Not applicable if Fill Flag is ON. |

Polygon Element

"Polygon" elements appear when valid (see Table 13). FIG. 8(g) illustrates an exemplary "polygon" element. "Polygon" elements draw customizable polygons that can be drawn over existing pages or onto new pages. "Polygon" elements can be defined as set forth in Table 26 below:

TABLE 26

| Parameter | Choices | Notes |
| --- | --- | --- |
| Validity | | See validity setup table in Table 13. |
| Vertex X-Position Values | | X-pixel positions, allowed to be off-screen. Up to 10 can be defined. |
| Vertex Y-Position Values | | Y-pixel positions, allowed to be off-screen. Up to 10 can be defined. |
| Polygon Color | Numeric Value Index | Index value from colors.h |
| Dash Flag | ON or OFF | If ON, polygon outline is dashed. If OFF, polygon outline is solid. Not applicable if Fill Flag is ON. |
| Fill Flag | ON or OFF | If ON, polygon is filled. If OFF, polygon is hollow. |
| Halo Flag | ON or OFF | If ON, polygon is haloed with black pixels. If OFF, polygon is not haloed. |
| Vertex Count | 3 to 10 | Number of vertices in polygon. |
| Polygon Thickness | Integer Thickness | Polygon outline thickness in pixels. Not applicable if Fill Flag is ON. |

Text Element

"Text" elements appear when valid (see Table 13). FIG. 8(h) illustrates an exemplary "text" element. "Text" elements draw customizable text that can be drawn over existing pages or onto new pages. "Text" elements can be defined as set forth in Table 27 below:

TABLE 27

| Parameter | Choices | Notes |
| --- | --- | --- |
| Validity | | See validity setup table in Table 13. |
| Text X-Position Value | | X-pixel position, allowed to be off-screen. This is the X-pixel position for the center of the text. |
| Text Y-Position Value | | Y-pixel position, allowed to be off-screen. This is the Y-pixel position for the center of the text. |
| Text | Character String | All capital string of up to 31 characters. |
| Text Color | Numeric Value Index | Index value from colors.h. |
| Halo Flag | ON or OFF | If ON, text is haloed with black pixels. If OFF, text is not haloed. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |
| Vertical Orientation Flag | ON or OFF | |

Group Box Element

"Group Box" elements appear when valid (see Table 13). FIG. 8(i) illustrates an exemplary "Group Box" element. "Group Box" elements provide logical cues for grouping other symbology elements to aid understanding and reduce clutter by segmenting the display area. "Group Box" elements can be defined as set forth in Table 28 below:

TABLE 28

| Parameter | Choices | Notes |
| --- | --- | --- |
| Validity | | See validity setup table in Table 13. |
| Upper Left X-Position Value | | X-pixel position, allowed to be off-screen. This is the X-pixel position for the upper left corner of the group box. |
| Upper Left Y-Position Value | | Y-pixel position, allowed to be off-screen. This is the Y-pixel position for the upper left corner of the group box. |
| Lower Right X-Position Value | | X-pixel position, allowed to be off-screen. This is the X-pixel position for the lower right corner of the group box. |

TABLE 28-continued

| Parameter | Choices | Notes |
|---|---|---|
| Lower Right Y-Position Value | | Y-pixel position, allowed to be off-screen. This is the Y-pixel position for the lower right corner of the group box. |
| Text | Character String | All capital string of up to 31 characters to label the group box |
| Text Color | Numeric Value Index | Index value from colors.h |
| Text Halo Flag | ON or OFF | If ON, text is haloed with black pixels. If OFF, text is not haloed. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |
| Box Color | Numeric Value Index | Index value from colors.h. |
| Box Halo Flag | ON or OFF | If ON, group box outline is haloed with black pixels. If OFF, group box outline is not haloed. |
| Corner Radius | Numeric Value | Group box corner radius in pixels. Set to 0 if no radius is desired (i.e., square corners). |
| Box Thickness | Integer Thickness | Group box outline thickness in pixels. |

CAS Display Box Element

"CAS Display Box" elements can show custom CAS messages 127 defined with a "Location" parameter that specifies to display the CAS message 127 in a standard location or as a CAS box element or both. FIG. 8(j) illustrates an exemplary "CAS Display Box" element. Custom CAS messages 127 can be visually prioritized so that active WARNING-level messages (red) are displayed above active CAUTION-level messages (yellow), which are displayed above active ADVISORY-level messages (blue). Within levels, active custom CAS messages 127 are stacked in chronological order so that the most recent message appears on top. If more custom CAS messages 127 appear than can be accommodated by the number of "CAS Display Box" lines, then a knob is mechanized to provide scrolling. Only CAUTION-level and ADVISORY-level messages are scrollable. When scrolling is active, out-of-view counters appear in a reserved area at the bottom of the "CAS Display Box" to designate messages out of view as follows: Number of WARNING-level out of view below messages designated by red numeral with red down arrow; Number of CAUTION-level out of view above messages designated by yellow numeral with yellow up arrow; Number of CAUTION-level out of view below messages designated by yellow numeral with yellow down arrow; Number of ADVISORY-level out of view above messages designated by blue numeral with blue up arrow; and Number of ADVISORY-level out of view below messages designated by blue numeral with blue down arrow.

A blue "-END LIST-" ADVISORY-level message can be automatically added to the message stack to help the pilot recognize the end of scrolling. Whenever a new CAUTION-level message becomes active, scrolling is reset.

"CAS Display Box" elements can be defined as set forth in Table 29 below:

TABLE 29

| Parameter | Choices | Notes |
|---|---|---|
| Upper Left X-Position | | X-pixel position, allowed to be off-screen. This is the X-pixel position for the upper left corner |

TABLE 29-continued

| Parameter | Choices | Notes |
|---|---|---|
| Value | | of the CAS Display Box. |
| Upper Left Y-Position | | Y-pixel position, allowed to be off-screen. This is the Y-pixel position for the upper left corner |
| Value | | of the CAS Display Box. |
| Maximum Characters | | Maximum character length for a custom CAS message. Custom CAS messages are drawn left-justified using size 2, thickness 2 characters. The total width of a CAS Display Box (in pixels) is 12 times this value plus 9. |
| Number of Lines | | Maximum number of lines within the CAS Display Box. Lines are spaced 18 pixels apart. The out-of-view message counter line is considered part of the line count. The total height of a CAS Display Box (in pixels) is 18 times this value plus 6. |

Tape with Top Readout Element

A "Tape with Top Readout" element appears when valid (see Table 13) and may include a tape background, a color-coded tape, integrated limits markings, a digital parameter readout, and an integrated text label. FIG. 8(k) illustrates an exemplary "Tape with Top Readout" element. The color-coded tape may have a height corresponding to the parameter value taking into account normalization. The color-coding of the tape is controlled by the associated limits. The tape may include a flare at the top to aid comparison against integrated limit markings and other symbology elements. When the parameter value is off-scale above, the flare may disappear (leaving only the color-coded tape completely filling the tape background). When the parameter value is off-scale below, the flare may remain visible at the bottom of the tape background. The position and appearance of integrated limit markings may] be controlled by the associated limits. The digital parameter readout appears above the tape background and the integrated text label can appear above the digital parameter readout.

The "Tape with Top Readout" element may be defined as set forth in Table 30 below:

TABLE 30

| Parameter | Choices | Notes |
| --- | --- | --- |
| Validity | | See validity setup table in Table 13. |
| Upper Left X-Position Value | | X-pixel position, allowed to be off-screen. This is the X-pixel position for the upper left corner of the tape. |
| Upper Left Y-Position Value | | Y-pixel position, allowed to be off-screen. This is the Y-pixel position for the upper left corner of the tape. |
| Lower Right X-Position Value | | X-pixel position, allowed to be off-screen. This is the X-pixel position for the lower right corner of the tape. |
| Lower Right Y-Position Value | | Y-pixel position, allowed to be off-screen. This is the Y-pixel position for the lower right corner of the tape. |
| Flare Size | | Flare size in pixels. |
| Integrated Limit Markings Size | | Number of pixels that the integrated limit marking extend from the sides of the tape. |
| Text | Character String | All capital string of up to 31 characters to label the element |
| Log File Text | Character String | Used to name a column in the log file. Maximum characters is 31. |
| Text Color | Numeric Value Index | Index value from colors.h. |
| Text Halo Flag | ON or OFF | If ON, text is haloed with black pixels. If OFF, text is not haloed. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |
| Parameter Readout Decimal | Integer between −2 and Places | Adjust rounding and decimal places for +2 parameter readout as follows: −2 106.55555 becomes 110 (nearest 10) −1 106.55555 becomes 105 (nearest 5) 0 106.55555 becomes 107 (nearest integer) +1 106.55555 becomes 106.6 (nearest $10^{th}$) +2 106.55555 becomes 106.56 (nearest $100^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide x 9 pixels tall. Other parameter sizes are (6 * Text Size) wide x (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | 9 normalization values. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description Table 15. |
| Limit Value | Numeric Value | Parameter value associated with this limit. For proper element behavior, the first limit must be defined off-scale below the first normalization |

TABLE 30-continued

| Parameter | Choices | Notes |
|---|---|---|
| | | point and subsequent limits must be defined in ascending value order. |
| Limit Debounce Period | See Notes | Affects behavior in accordance with limit type description in Table 13. |
| Limit Exceedance Period | See Notes | Affects behavior in accordance with limit type description table in Table 13. |
| Variable Limit Label Variable Limit Primary Port Variable Limit Secondary Port Variable Limit Use Latched Value Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Tape with Bottom Readout Element

A "Tape with Bottom Readout" element appears when valid (see Table 13) and may comprise a tape background, a color-coded tape, integrated limits markings, digital parameter readout, and integrated text label. FIG. 8(1) illustrates an exemplary "Tape with Bottom Readout" element. The color-coded tape may have a height corresponding to the parameter value taking into account normalization. The color-coding of the tape is controlled by the associated limits. The tape may include a flare at the top to aid comparison against integrated limit markings and other symbology elements. When the parameter value is off-scale above, the flare disappears (leaving only the color-coded tape completely filling the tape background). When the parameter value is off-scale below, the flare remains visible at the bottom of the tape background. The position and appearance of integrated limit markings are controlled by the associated limits. The digital parameter readout appears below the tape background and the integrated text label appears above the tape background.

The "Tape with Bottom Readout" element may be defined as set forth in Table 31 below:

TABLE 31

| Parameter | Choices | Notes |
|---|---|---|
| Validity | | See validity setup table in Table 13. |
| Upper Left X-Position Value | | X-pixel position, allowed to be off-screen. This is the X-pixel position for the upper left corner of the tape. |
| Upper Left Y-Position Value | | Y-pixel position, allowed to be off-screen. This is the Y-pixel position for the upper left corner of the tape. |
| Lower Right X-Position Value | | X-pixel position, allowed to be off-screen. This is the X-pixel position for the lower right corner of the tape. |
| Lower Right Y-Position Value | | Y-pixel position, allowed to be off-screen. This is the Y-pixel position for the lower right corner of the tape. |
| Flare Size | | Flare size in pixels. |
| Integrated Limit Markings Size | | Number of pixels that the integrated limit marking extend from the sides of the tape. |
| Text | Character String | All capital string of up to 31 characters to label the element |
| Log File Text | Character String | Used to name a column in the log file. Maximum characters is 31. |
| Text Color | Numeric Value Index | Index value from colors.h. |
| Text Halo Flag | ON or OFF | If ON, text is haloed with black pixels. If OFF, text is not haloed. |
| Text Size | Integer $>= 0$ | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |
| Parameter Readout Decimal Places | Integer between −2 and +2 | Adjust rounding and decimal places for parameter readout as follows:<br>−2 106.55555 becomes 110 (nearest 10)<br>−1 106.55555 becomes 105 (nearest 5)<br>0 106.55555 becomes 107 (nearest integer)<br>+1 106.55555 becomes 106.6 (nearest $10^{th}$)<br>+2 106.55555 becomes 106.56 (nearest $100^{th}$) |
| Parameter Show "+" Flag | ON or OFF | Normally, the "+" for a positive value is suppressed. If this flag is ON, the "+" is shown. |

TABLE 31-continued

| Parameter | Choices | Notes |
| --- | --- | --- |
| Parameter Size | Integer >= 0 | Parameter size 0 is a 8 pixels wide x 9 pixels tall. Other parameter sizes are (6 * Text Size) wide x (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | 9 normalization values. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label Variable Limit Primary Port Variable Limit Secondary Port Variable Limit Use Latched Value Variable Limit Use Rate | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Tape with No Readout Element

A "Tape with No Readout" element appears when valid and. In a typical embodiment, includes a tape background, a color-coded tape, integrated limits markings, and integrated text label. FIG. 8(m) illustrates an exemplary "Tape with No Readout" element In a typical embodiment, the color-coded tape includes a height corresponding to the parameter value taking into account normalization. In a typical embodiment, color-coding of the tape is controlled by the associated limits and the tape includes a flare at the top to aid comparison against integrated limit markings and other symbology elements. When the parameter value is off-scale above, the flare disappears (leaving only the color-coded tape completely filling the tape background). When the parameter value is off-scale below, the flare remains visible at the bottom of the tape background. The position and appearance of integrated limit markings are controlled by the associated limits. The integrated text label appears above the tape background.

The "Tape with No Readout" element may be defined as set forth in Table 32 below:

TABLE 32

| Parameter | Choices | Notes |
| --- | --- | --- |
| Validity | | See validity setup table in Table 13. |
| Upper Left X-Position | | X-pixel position, allowed to be off-screen. This |

TABLE 32-continued

| Parameter | Choices | Notes |
| --- | --- | --- |
| Value | | is the X-pixel position for the upper left corner of the tape. |
| Upper Left Y-Position Value | | Y-pixel position, allowed to be off-screen. This is the Y-pixel position for the upper left corner of the tape. |
| Lower Right X-Position Value | | X-pixel position, allowed to be off-screen. This is the X-pixel position for the lower right corner of the tape. |
| Lower Right Y-Position Value | | Y-pixel position, allowed to be off-screen. This is the Y-pixel position for the lower right corner of the tape. |
| Flare Size | | Flare size in pixels. |
| Integrated Limit Markings Size | | Number of pixels that the integrated limit marking extend from the sides of the tape. |
| Text | Character String | All capital string of up to 31 characters to label the element |
| Log File Text | Character String | Used to name a column in the log file. Maximum characters is 31. |
| Text Color | Numeric Value Index | Index value from colors.h. |
| Text Halo Flag | ON or OFF | If ON, text is haloed with black pixels. If OFF, text is not haloed. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |
| Normalization | | 9 normalization values |
| Parameter Label | Octal 0 to 377 | This is the AR1NC429 label that contains the parameter data |
| Primary Port | 1 to 42 | This is the primary OASIS COM Port for data acquisition. |
| Secondary Port | 1 to 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description table. |
| Limit Exceedance Period | See Notes | Affects behavior in accordance with limit type description table. |
| Variable Limit Label Variable Limit Primary Port Variable Limit Secondary Port Variable Limit Use Latched Value Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Single Pointer Element

A "Single Pointer" element appears when valid (see Table 13) and may include a color-coded arc background, a color-coded pointer, red-radial limit lines (if applicable), a digital parameter readout; and an integrated text label. FIG. 8(n) illustrates an exemplary "Single Pointer" element.

The color-coded arc background may span from the 6 O'Clock position (lowest normalization value) to the 3 O'Clock position (highest normalization value). Color-coding of the arc and associated red-radial limit lines are controlled by the associated limits. A color-coded pointer may have an angular position corresponding to the parameter value taking into account normalization. The color-coding of the pointer is controlled by the associated limits. When the parameter value is off-scale, the pointer will "peg" in the off-scale direction.

In a typical embodiment, the digital parameter readout appears in the lower-right part of the symbol so that it does not interfere with the analog indication. The integrated text label appears above the digital parameter readout.

The "Single Pointer" element may be defined as set forth in Table 33 below:

TABLE 33

| Parameter | Choices | Notes |
| --- | --- | --- |
| Validity | | See validity setup table in Table 13. |
| Center X-Position Value | | X-pixel position, allowed to be off-screen. This is the X-pixel position for the center of the gauge arc. |
| Center Y-Position Value | | Y-pixel position, allowed to be off-screen. This is the Y-pixel position for the center of the gauge arc. |
| Radius/Pointer Length | | Arc radius/pointer length in pixels. |
| Pointer Base Half-Width | | Half the width of the pointer at its base in pixels. |
| Pointer blackout circle radius | | Radius of a black circle to blackout the center portion of the pointer in pixels. |
| Text | Character String | All capital string of up to 31 characters to label the element |
| Log File Text | Character String | Used to name a column in the log file. Maximum characters is 31. |
| Text Color | Numeric Value Index | Index value from colors.h. |
| Text Halo Flag | ON or OFF | If ON, text is haloed with black pixels. If OFF, text is not haloed. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |
| Parameter Readout Decimal Places | Integer between −2 and +2 | Adjust rounding and decimal places for parameter readout as follows:<br>−2 106.55555 becomes 110 (nearest 10)<br>−1 106.55555 becomes 105 (nearest 5)<br>0 106.55555 becomes 107 (nearest integer)<br>+1 106.55555 becomes 106.6 (nearest $10^{th}$)<br>+2 106.55555 becomes 106.56 (nearest $100^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide x 9 pixels tall. Other parameter sizes are (6 * Text Size) wide x (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | 9 normalization values. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |

TABLE 33-continued

| Parameter | Choices | Notes |
| --- | --- | --- |
| Miscompare Debounce | Numeric Value | Time (in seconds) that the difference between the primary and secondary port parameter values must exceed the Miscompare Threshold prior to the appearance of miscompare symbology. |
| | This Element can Contain up to 8 Limits: | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label Variable Limit Primary Port Variable Limit Secondary Port Variable Limit Use Latched Value Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Left and Right Opposing Dual Pointer Elements

"Left Opposing Dual Pointer" and "Right Opposing Dual Pointer" elements appear when valid (see Table 13) and may include a color-coded arc background, a color-coded pointer, red-radial limit lines (if applicable), a digital parameter readout, and an integrated text label. FIG. 8(o) illustrates an exemplary "Left Opposing Dual Pointer" and "Right Opposing Dual Pointer" element.

The color-coded arc background may span: from the 9 O'Clock position (lowest normalization value) to the 11 O'Clock position (highest normalization value) for the "Left Opposing Dual Pointer" element; and from the 3 O'Clock position (lowest normalization value) to the 1 O'Clock position (highest normalization value) for the "Right Opposing Dual Pointer" element.

Color-coding of the arc and associated red-radial limit lines are controlled by the associated limits.

A color-coded pointer may have an angular position corresponding to the parameter value taking into account normalization. The color-coding of the pointer is controlled by the associated limits. When the parameter value is off-scale, the pointer will "peg" in the off-scale direction.

The digital parameter readout appears below the respective arc and pointer so that it does not interfere with the analog indication. The integrated text label appears above the digital parameter readout.

The "Left Opposing Dual Pointer" and "Right Opposing Dual Pointer" elements may be defined as set forth in Table 34 below:

TABLE 34

| Parameter | Choices | Notes |
| --- | --- | --- |
| Validity | | See validity setup table in Table 13. |
| Center X-Position Value | | X-pixel position, allowed to be off-screen. This is the X-pixel position for the center of the gauge arc. |
| Center Y-Position Value | | Y-pixel position, allowed to be off-screen. This is the Y-pixel position for the center of the gauge arc. |
| Radius/Pointer Length | | Arc radius/pointer length in pixels. |
| Pointer Base Half-Width | | Half the width of the pointer at its base in pixels. |
| Pointer blackout circle radius | | Radius of a black circle to blackout the center portion of the pointer in pixels. |
| Text | Character String | All capital string of up to 31 characters to label the element |
| Log File Text | Character String | Used to name a column in the log file. Maximum characters is 31. |
| Text Color | Numeric Value Index | Index value from colors.h. |
| Text Halo Flag | ON or OFF | If ON, text is haloed with black pixels. If OFF, text is not haloed. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. |
| Text Thickness | Integer Thickness | Text thickness in pixels. Setting this value to 0 inhibits the text display. |

TABLE 34-continued

| Parameter | Choices | Notes |
| --- | --- | --- |
| Parameter Readout Decimal Places | Integer between −2 and +2 | Adjust rounding and decimal places for parameter readout as follows:<br>−2 106.55555 becomes 110 (nearest 10)<br>−1 106.55555 becomes 105 (nearest 5)<br>0 106.55555 becomes 107 (nearest integer)<br>+1 106.55555 becomes 106.6 (nearest $10^{th}$)<br>+2 106.55555 becomes 106.56 (nearest $100^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide x 9 pixels tall. Other parameter sizes are (6 * Text Size) wide x (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | 9 normalization values. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label Variable Limit Primary Port Variable Limit Secondary Port Variable Limit Use Latched Value Variable Limit Use Rate | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Left and Right Twin-Engine Dual Pointer Element

"Left Twin-Engine Dual Pointer" and "Right Twin-Engine Dual Pointer" elements appear when valid (see Table 13) and may include, color-coded arc background, a color-coded pointer, a red-radial limit lines (if applicable), a digital parameter readout, and a common integrated text label. FIG. 8(p) illustrates an exemplary "Left Twin-Engine Dual Pointer" and "Right Twin-Engine Dual Pointer" element.

The color-coded arc background may span: from the 9 O'Clock position (lowest normalization value) to the 11 O'Clock position (highest normalization value) for the "Left Twin-Engine Dual Pointer" element; and from the 3 O'Clock position (lowest normalization value) to the 1 O'Clock position (highest normalization value) for the "Right Twin-Engine Dual Pointer" element.

Color-coding of the arc and associated red-radial limit lines are controlled by the associated limits.

A color-coded pointer may have an angular position corresponding to the parameter value taking into account normalization. The color-coding of the pointer is controlled by the associated limits. The "Left Twin-Engine Dual Pointer" element is meant to be associated with an engine #1 value, while the "Right Twin-Engine Dual Pointer" element is meant to be associated with an engine #2 value. Because of this, the "Right Twin-Engine Dual Pointer" element pointer may have a hollow appearance to differentiate it from the engine #1 pointer. When the parameter value is off-scale, the pointer will "peg" in the off-scale direction.

The digital parameter readout appears below the respective arc and pointer so that it does not interfere with the analog indication. A common integrated text label appears above and centered between the digital parameter readouts and is rendered only as part of rendering the "Left Twin-Engine Dual Pointer" element. Note that the "Left Twin-Engine Dual Pointer" element must be defined after the associated "Right Twin-Engine Dual Pointer" element in the configuration file to avoid occlusion by the pointer blackout circle drawn as part of the "Right Twin-Engine Dual Pointer" element.

The "Left Twin-Engine Dual Pointer" and "Right Twin-Engine Dual Pointer" elements may be defined as set forth in Table 35 below:

TABLE 35

| Parameter | Choices | Notes |
|---|---|---|
| Validity | | See validity setup table in Table 13. |
| Center X-Position Value | | X-pixel position, allowed to be off-screen. This is the X-pixel position for the center of the gauge arc. |
| Center Y-Position Value | | Y-pixel position, allowed to be off-screen. This is the Y-pixel position for the center of the gauge arc. |
| Radius/Pointer Length | | Arc radius/pointer length in pixels. |
| Pointer Base Half-Width | | Half the width of the pointer at its base in pixels. |
| Pointer blackout circle radius | | Radius of a black circle to blackout the center portion of the pointer in pixels. |
| Text | Character String | All capital string of up to 31 characters to label the element. Not applicable to "Right Twin-Engine Dual Pointer" element. |
| Log File Text | Character String | Used to name a column in the log file. Maximum characters is 31. |
| Text Color | Numeric Value Index | Index value from colors.h. Not applicable to "Right Twin-Engine Dual Pointer" element. |
| Text Halo Flag | ON or OFF | If ON, text is haloed with black pixels. If OFF, text is not haloed. Not applicable to "Right Twin-Engine Dual Pointer" element. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. Not applicable to "Right Twin-Engine Dual Pointer" element. |
| Text Thickness | Integer Thickness | Text thickness in pixels. Not applicable to "Right Twin-Engine Dual Pointer" element. Setting this value to 0 inhibits the text display. |
| Parameter Readout Decimal Places | Integer between −2 and +2 | Adjust rounding and decimal places for parameter readout as follows: −2 106.55555 becomes 110 (nearest 10) −1 106.55555 becomes 105 (nearest 5) 0 106.55555 becomes 107 (nearest integer) +1 106.55555 becomes 106.6 (nearest $10^{th}$) +2 106.55555 becomes 106.56 (nearest $100^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide x 9 pixels tall. Other parameter sizes are (6 * Text Size) wide x (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | 9 normalization values. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |

TABLE 35-continued

| Parameter | Choices | Notes |
| --- | --- | --- |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label Variable Limit Primary Port Variable Limit Secondary Port Variable Limit Use Latched Value Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Inner and Outer Concentric Twin-Engine Pointer Element

"Inner Concentric Twin-Engine Pointer" and "Outer Concentric Twin-Engine Pointer" elements are exemplary concentric pointer elements and appear when valid (see Table 13) and may include a color-coded arc background, a color-coded pointer, red-radial limit lines (if applicable), a digital parameter readout, and a common integrated text label.

The color-coded arc background may span from the 6 O'Clock position (lowest normalization value) to the 3 O'Clock position (highest normalization value). Color-coding of the arc and associated red-radial limit lines are controlled by the associated limits.

A color-coded pointer may have an angular position corresponding to the parameter value taking into account normalization. The color-coding of the pointer is controlled by the associated limits. The "Inner Concentric Twin-Engine Pointer" element is meant to be associated with an engine #1 value, while the "Outer Concentric Twin-Engine Pointer" element is meant to be associated with an engine #2 value. Because of this, the "Outer Concentric Twin-Engine Pointer" element pointer may have a hollow appearance to differentiate it from the engine #1 pointer. When the parameter value is off-scale, the pointer will "peg" in the off-scale direction.

The digital parameter readouts appear in the lower-right part of the symbol adjacent to their respective arcs so that they do not interfere with the analog indications. A common integrated text label appears above the "Inner Concentric Twin-Engine Pointer" digital parameter readout and can be rendered only as part of rendering the "Inner Concentric Twin-Engine Pointer" element. Note that the "Inner Concentric Twin-Engine Pointer" element must be defined after the associated "Outer Concentric Twin-Engine Pointer" element in the configuration file to avoid occlusion by the pointer blackout circle drawn as part of the "Outer Concentric Twin-Engine Pointer" element.

The "Inner Concentric Twin-Engine Pointer" and "Outer Concentric Twin-Engine Pointer" elements may be defined as set forth below in Table 36:

TABLE 36

| Parameter | Choices | Notes |
| --- | --- | --- |
| Validity | | See validity setup table in Table 13. |
| Center X-Position Value | | X-pixel position, allowed to be off-screen. This is the X-pixel position for the center of the gauge arc. |
| Center Y-Position Value | | Y-pixel position, allowed to be off-screen. This is the Y-pixel position for the center of the gauge arc. |

TABLE 36-continued

| Parameter | Choices | Notes |
|---|---|---|
| Radius/Pointer Length | | Arc radius/pointer length in pixels. |
| Pointer Base Half-Width | | Half the width of the pointer at its base in pixels. |
| Pointer blackout circle radius | | Radius of a black circle to blackout the center portion of the pointer in pixels. |
| Outer Radius/Pointer Length | | Only applicable to "Inner Concentric Twin-Engine Pointer." Defines the Radius/Pointer Length for the associated "Outer Concentric Twin-Engine Pointer" element so that digital parameter readouts and integrated text labels can be accurately placed. |
| Text | Character String | All capital string of up to 31 characters to label the element. Not applicable to "Outer Concentric Twin-Engine Pointer" element. |
| Log File Text | Character String | Used to name a column in the log file. Maximum characters is 31. |
| Text Color | Numeric Value Index | Index value from colors.h. Not applicable to "Outer Concentric Twin-Engine Pointer" element. |
| Text Halo Flag | ON or OFF | If ON, text is haloed with black pixels. If OFF, text is not haloed. Not applicable to "Outer Concentric Twin-Engine Pointer" element. |
| Text Size | Integer >= 0 | Text size 0 is a 8 pixels wide x 9 pixels tall. Other text sizes are (6 * Text Size) wide x (6 * Text Size + 1) tall. These pixels sizes are for integer thickness 1. Not applicable to "Outer Concentric Twin-Engine Pointer" element. |
| Text Thickness | Integer Thickness | Text thickness in pixels. Not applicable to "Outer Concentric Twin-Engine Pointer" element. Setting this value to 0 inhibits the text display. |
| Parameter Readout Decimal Places | Integer between −2 and +2 | Adjust rounding and decimal places for parameter readout as follows:<br>−2 106.55555 becomes 110 (nearest 10)<br>−1 106.55555 becomes 105 (nearest 5)<br>0 106.55555 becomes 107 (nearest integer)<br>+1 106.55555 becomes 106.6 (nearest $10^{th}$)<br>+2 106.55555 becomes 106.56 (nearest $100^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide x 9 pixels tall. Other parameter sizes are (6 * Text Size) wide x (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | 9 normalization values. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |

TABLE 36-continued

| Parameter | Choices | Notes |
|---|---|---|
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label Variable Limit Primary Port Variable Limit Secondary Port Variable Limit Use Latched Value Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

Fuel Tank Element

A "Fuel Tank" element appears when valid (see Table 13) and may include a tape background, a color-coded tape, and a digital parameter readout. FIG. 8(r) illustrates an exemplary "Fuel Tank" element.

The color-coded tape may have a height corresponding to the parameter value taking into account normalization. The color-coding of the tape is be controlled by the associated limits. The digital parameter readout appears within the color-coded tape and tape background.

The "Fuel Tank" element may be defined as set forth in Table 37 below:

TABLE 37

| Parameter | Choices | Notes |
|---|---|---|
| Validity | | See validity setup table in Table 13. |
| Upper Left X-Position Value | | X-pixel position, allowed to be off-screen. This is the X-pixel position for the upper left corner of the tape. |
| Upper Left Y-Position Value | | Y-pixel position, allowed to be off-screen. This is the Y-pixel position for the upper left corner of the tape. |
| Lower Right X-Position Value | | X-pixel position, allowed to be off-screen. This is the X-pixel position for the lower right corner of the tape. |
| Lower Right Y-Position Value | | Y-pixel position, allowed to be off-screen. This is the Y-pixel position for the lower right corner of the tape. |
| Log File Text | Character String | Used to name a column in the log file. Maximum characters is 31. |
| Parameter Readout Decimal Places | Integer between −2 and +2 | Adjust rounding and decimal places for parameter readout as follows: −2 106.55555 becomes 110 (nearest 10) −1 106.55555 becomes 105 (nearest 5) 0 106.55555 becomes 107 (nearest integer) +1 106.55555 becomes 106.6 (nearest $10^{th}$) +2 106.55555 becomes 106.56 (nearest $100^{th}$) |

TABLE 37-continued

| Parameter | Choices | Notes |
|---|---|---|
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide × 9 pixels tall. Other parameter sizes are (6 * Text Size) wide × (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization Parameter Label | Octal 0 to 377 | 9 normalization values. This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |

TABLE 37-continued

| Parameter | Choices | Notes |
|---|---|---|
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label | See Notes | The "Limit Value" can be made a variable of a second value. The second value is acquired from "Variable Limit Label" on "Variable Limit Primary Port" (required) and "Variable Limit Secondary Port" (optional). The latched value can be used if desired (optional). If a second value is not acquired, then the fixed "Limit Value" is used as a backup. |
| Variable Limit Primary Port | | |
| Variable Limit Secondary Port | | |
| Variable Limit Use Latched Value | | |
| Variable Limit Use Rate Value | | |

Aircraft Total Fuel Element

An "Aircraft Total Fuel" element appears when valid (see Table 13) and may include a tape background, a color-coded tape, and digital parameter readout. The "Aircraft Total Fuel" element is visually similar to the "Fuel Tank" element of FIG. 8(r).

The color-coded tape may have a height corresponding to the parameter value.

The parameter value is driven by "Total Fuel Quantity" (e.g., COM37 Label 0247). The "Aircraft Total Fuel" element may be normalized so that it is directly linear. The color-coding of the tape is controlled by the aircraft's minimum and emergency fuel limits. The region below the emergency fuel limit (if any) may be treated as "Red Above (Draw Arc)," the region below the minimum fuel limit (if any) may be treated as "Yellow Above," and other regions may be treated as "Cyan Above." The digital parameter readout may appear within the color-coded tape and tape background.

The "Aircraft Total Fuel" element may be defined as set forth in Table 38 below:

TABLE 38

| Parameter | Choices | Notes |
|---|---|---|
| Validity | | See validity setup table in Table 13. |
| Upper Left X-Position Value | | X-pixel position, allowed to be off-screen. This is the X-pixel position for the upper left corner of the tape. |
| Upper Left Y-Position Value | | Y-pixel position, allowed to be off-screen. This is the Y-pixel position for the upper left corner of the tape. |
| Lower Right X-Position Value | | X-pixel position, allowed to be off-screen. This is the X-pixel position for the lower right corner of the tape. |
| Lower Right Y-Position Value | | Y-pixel position, allowed to be off-screen. This is the Y-pixel position for the lower right corner of the tape. |
| Log File Text | Character String | Used to name a column in the log file. Maximum characters is 31. |
| Parameter Readout Decimal Places | Integer between −2 and +2 | Adjust rounding and decimal places for parameter readout as follows:<br>−2 106.55555 becomes 110 (nearest 10)<br>−1 106.55555 becomes 105 (nearest 5)<br>0 106.55555 becomes 107 (nearest integer)<br>+1 106.55555 becomes 106.6 (nearest $10^{th}$)<br>+2 106.55555 becomes 106.56 (nearest $100^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide × 9 pixels tall. Other parameter sizes are (6 * Text Size) wide × (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Normalization | | Element automatically sets up linear normalization. |
| Parameter Label | 0247 | Element automatically looks at COM37 Label 0247. No secondary port is used. Live (not latched) value is used. |
| Primary Port | 37 | |
| Secondary Port | NA | |
| Use Latched Value | NA | |
| Use Rate Value | NA | |
| Miscompare Threshold | NA | |
| Miscompare Debounce | NA | |
| Limits Automatically Setup as Follows: | | |
| Limit Type | Cyan Above, Yellow Above or Red Above (Draw Arc). | Emergency Fuel region automatically setup as "Red Above (DrawArc)."<br>Minimum Fuel region automatically setup as "Yellow Above."<br>Other regions automatically setup as "Cyan Above." |
| Limit Value | Numeric Value | Automatically acquired from EFIS system limits and pilot-set parameters. |
| Limit Debounce Period | 60 seconds | Automatically setup as 60 seconds. |
| Limit Exceedance Period | NA | Not used. |
| Variable Limit Label | NA | Not used. |
| Variable Limit Primary Port | | |
| Variable Limit Secondary Port | | |
| Variable Limit Use Latched Value | | |
| Variable Limit Use Rate Value | | |

Digital Parameter Indication Element

A "Digital Parameter Indication" element appears when valid (see Table 13) and may include a digital parameter readout. The "Digital Parameter Indication" element may be defined as set forth in Table 39 below:

TABLE 39

| Parameter | Choices | Notes |
|---|---|---|
| Validity | | See validity setup table in Table 13. |
| X-Position Value | | X-pixel position for center or right-justified location of parameter readout. |
| Y-Position Value | | Y-pixel position for center of parameter readout. |
| Log File Text | Character String | Used to name a column in the log file. Maximum characters is 31. |
| Parameter Readout Decimal Places | Integer between −2 and +2 | Adjust rounding and decimal places for parameter readout as follows:<br>−2 106.55555 becomes 110 (nearest 10)<br>−1 106.55555 becomes 105 (nearest 5)<br>0 106.55555 becomes 107 (nearest integer)<br>+1 106.55555 becomes 106.6 (nearest $10^{th}$)<br>+2 106.55555 becomes 106.56 (nearest $100^{th}$) |
| Parameter Right Justify | ON or OFF | Normally, the parameter readout is centered on the X-position value. If this flag is ON, it will be right-justified on the X-position value. |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide × 9 pixels tall. Other parameter sizes are (6 * Text Size) wide × (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |

TABLE 39-continued

| Parameter | Choices | Notes |
|---|---|---|
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label<br>Variable Limit Primary Port<br>Variable Limit Secondary Port<br>Variable Limit Use Latched Value<br>Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence).<br>If a second value is not acquired, then the fixed "Limit Value" is used as a backup. |

Generic Pointer with Arc Movement

Two types of "Generic Pointer with Arc Movement" elements may be included. An "Inward Pointer" is a generic pointer that moves in an arc with the pointer pointing towards the center of the arc; and an "Outward Pointer" is a generic pointer that moves in an arc with the pointer pointing away from the center of the arc.

The "Generic Pointer with Arc Movement" element appears when valid (see Table 13) and may comprise a triangular pointer. The triangular pointer may have an angular position corresponding to the parameter value taking into account normalization. When the parameter value is off-scale, the pointer will "peg" in the off-scale direction.

The "Generic Pointer with Arc Movement" element may be defined as set forth in Table 40 below:

TABLE 40

| Parameter | Choices | Notes |
|---|---|---|
| Validity | | See validity setup table in Table 13. |
| Center X-Position Value | | X-pixel position, allowed to be off-screen |
| Center Y-Position Value | | Y-pixel position, allowed to be off-screen |
| Pointer Length | | Pointer length in pixels. |
| Pointer Base Half-Width | | Half the width of the pointer at its base in pixels. |
| Starting Angle | Numeric Value | Starting angle in degrees from directly right. Note that arcs are always drawn clockwise. This angle is associated with the first normalization value. |
| Ending Angle | Numeric Value | Ending angle in degrees from directly right. Note that arcs are always drawn clockwise. This angle is associated with the last normalization value. |
| Pointer Color | Numeric Value Index | Index value from colors.h. Note that if limits are defined, the limits control the pointer color. |

TABLE 40-continued

| Parameter | Choices | Notes |
|---|---|---|
| Arc Radius | Numeric Value | Arc radius in pixels. Note that this value can be different than the pointer length. |
| Add Rounded Base Flag | ON or OFF | If ON, a filled circle with radius "Pointer Base Half-Width" is drawn at the triangle base to add a rounded base. If OFF, no circle is drawn. |
| Halo Flag | ON or OFF | If ON, pointer is haloed with black pixels. If OFF, pointer is not haloed. |
| Log File Text | Character String | Used to name a column in the log file. Maximum characters is 31. |
| Normalization Parameter Label | Octal 0 to 377 | 9 normalization values. This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label Variable Limit Primary Port Variable Limit Secondary Port Variable Limit Use Latched Value Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |

There may be two types of "Generic Pointer with Arc Movement" elements: "Inward Pointer"—Generic Pointer that moves in an arc with the pointer pointing towards the center of the arc; and "Outward Pointer"—Generic Pointer that moves in an arc with the pointer pointing away from the center of the arc. The "Generic Pointer with Arc Movement" element may appear when valid (see Table 13) and may comprise a triangular pointer. The triangular pointer may have an angular position corresponding to the parameter value taking into account normalization. When the parameter value is off-scale, the pointer will "peg" in the off-scale direction.

The "Generic Pointer with Arc Movement" element may be defined as set forth in Table 41 below:

TABLE 41

| Parameter | Choices | Notes |
|---|---|---|
| Validity | | See validity setup table in Table 13. |
| Center X-Position Value | | X-pixel position, allowed to be off-screen |
| Center Y-Position Value | | Y-pixel position, allowed to be off-screen |
| Pointer Length | | Pointer length in pixels. |
| Pointer Base Half-Width | | Half the width of the pointer at its base in pixels. |
| Starting Angle | Numeric Value | Starting angle in degrees from directly right. Note that arcs are always drawn clockwise. This angle is associated with the first normalization value. |
| Ending Angle | Numeric Value | Ending angle in degrees from directly right. Note that arcs are always drawn clockwise. This angle is associated with the last normalization value. |
| Pointer Color | Numeric Value Index | Index value from colors.h. |
| Arc Radius | Numeric Value | Arc radius in pixels. Note that this value can be different than the pointer length. |
| Add Rounded Base Flag | ON or OFF | If ON, a filled circle with radius "Pointer Base Half-Width" is drawn at the triangle base to add a rounded base. If OFF, no circle is drawn. |
| Halo Flag | ON or OFF | If ON, pointer is haloed with black pixels. If OFF, pointer is not haloed. |
| Log File Text | Character String | Used to name a column in the log file. Maximum characters is 31. |
| Normalization Parameter Label | Octal 0 to 377 | 9 normalization values. This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Miscompare Threshold | Numeric Value | If both a primary and secondary port are setup, this value is the miscompare threshold between the parameter values acquired from the different ports. Leave this value at 0 to inhibit a miscompare analysis. |

TABLE 41-continued

| Parameter | Choices | Notes |
|---|---|---|
| Miscompare Debounce | Numeric Value | Time (in seconds) that the difference between the primary and secondary port parameter values must exceed the Miscompare Threshold prior to the appearance of miscompare symbology. |

Generic Pointer with Linear Movement Elements

There may be four types of "Generic Pointer with Linear Movement" elements. FIG. 8(t) illustrates an example of the "Generic Pointer with Linear Movement" elements. For example: a "Downward Pointer" is a generic pointer that moves laterally with the pointer pointing downward; an "Upward Pointer" is a generic pointer that moves laterally with the pointer pointing upward; a "Leftward Pointer" is a generic pointer that moves vertically with the pointer pointing leftward; and a "Rightward Pointer" is a Generic Pointer that moves vertically with the pointer pointing rightward.

The "Generic Pointer with Linear Movement" element appears when valid (see Table 13) and may comprise a triangular pointer. The triangular pointer may have a linear position corresponding to the parameter value taking into account normalization. When the parameter value is off-scale, the pointer will "peg" in the off-scale direction.

The "Generic Pointer with Linear Movement" element may be defined as set forth in Table 42 below:

TABLE 42

| Parameter | Choices | Notes |
|---|---|---|
| Validity | | See validity setup table in Table 13. |
| First X-Position Value | | X-pixel position, allowed to be off-screen. For types "Downward Pointer" and "Upward Pointer," this is the position of the first normalization value. For types "Leftward Pointer" and "Rightward Pointer," this is the position of the pointer tip. |
| First Y-Position Value | | Y-pixel position, allowed to be off-screen. For types "Downward Pointer" and "Upward Pointer," this is the position of the pointer tip. For types "Leftward Pointer" and "Rightward Pointer," this is the position of the first normalization value. |
| Second X-Position Value | | X-pixel position, allowed to be off-screen. For types "Downward Pointer" and "Upward Pointer," this is the position of the last normalization value. Not used for types "Leftward Pointer" and "Rightward Pointer." |
| Second Y-PositionValue | | Y-pixel position, allowed to be off-screen. For types "Leftward Pointer" and "Rightward Pointer," this is the position of the last normalization value. Not used for types "Downward Pointer" and "Upward Pointer." |
| Vertex Count | 3 to 9 | Optional—For a user-defined polygon pointer, this in the number of vertices in polygon. If this value is not defined, then a triangular pointer is used defined by "Pointer Length" and "Pointer Base Half-Width." |
| Vertex | | For optional user-defined polygon |

TABLE 42-continued

| Parameter | Choices | Notes |
|---|---|---|
| X-Position Values | | pointer, X-pixel positions relative to the pointer tip. Up to 8 can be defined yielding a maximum point count of 9 with tip. |
| Vertex Y-Position Values | | For optional user-defined polygon pointer, Y-pixel positions relative to the pointer tip. Up to 8 can be defined yielding a maximum point count of 9 with tip. |
| Pointer Length | | For standard triangular pointer, pointer length in pixels. |
| Pointer Base Half-Width | | For standard triangular pointer, pointer half the width of the pointer at its base in pixels. |
| Pointer Color | Numeric Value Index | Index value from colors.h. Note that if limits are defined, the limits control the pointer color. |
| Add Rounded Base Flag | ON or OFF | If ON, a filled circle with radius "Pointer Base Half-Width" is drawn at the triangle base to add a rounded base. If OFF, no circle is drawn. |
| Halo Flag | ON or OFF | If ON, pointer is haloed with black pixels. If OFF, pointer is not haloed. |
| "Tail" Flag | ON or OFF | If ON, adds a "tail" to the pointer (see SAE ARP4102-7 App. C symbol 3 Option 2). |
| Log File Text | Character String | Used to name a column in the log file. Maximum characters is 31. 9 normalization values. |
| Normalization Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |

This Element can Contain up to 8 Limits:

| Limit Type | | See limit type description in Table 15. |
|---|---|---|
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |

TABLE 42-continued

| Parameter | Choices | Notes |
|---|---|---|
| Limit Exceedance Period | See Notes | Affects behavior in accordance with limit type description in Table 15. |
| Variable Limit Label<br>Variable Limit Primary Port<br>Variable Limit Secondary Port<br>Variable Limit Use Latched Value<br>Variable Limit Use Rate Value | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). |

Triple Tachometer Pointer Elements

Figure 8U:
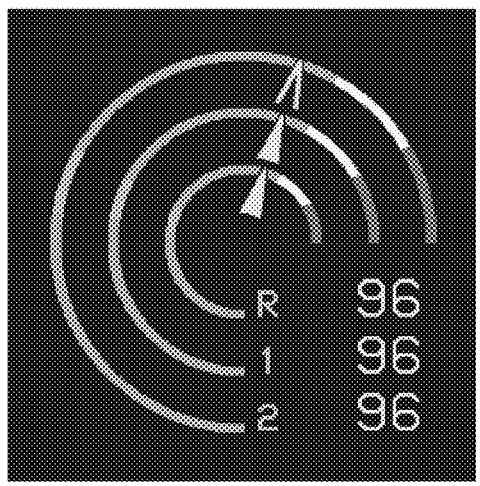

The "Triple Tach Nf1 Pointer," "Triple Tach Nf2 Pointer" and "Triple Tach Nr Pointer" elements appear when valid (see Table 13) and may include a color-coded arc background, a color-coded pointer, a red-radial limit lines (if applicable), a digital parameter readout, and integrated text labels. FIG. 8(u) illustrates exemplary "Triple Tach Nf1 Pointer," "Triple Tach Nf2 Pointer" and "Triple Tach Nr Pointer" elements.

The color-coded arc background may span from the 6 O'Clock position (lowest normalization value) to the 3 O'Clock position (highest normalization value). Color-coding of the arc and associated red-radial limit lines are be controlled by the associated limits.

A color-coded pointer may have an angular position corresponding to the parameter value taking into account normalization. The color-coding of the pointer is controlled by the associated limits. The "Triple Tach Nf1 Pointer" and "Triple Tach Nr Pointer" may have a normal appearance while the "Triple Tach Nf2 Pointer" may have a hollow appearance for differentiation. When the parameter value is off-scale, the pointer will "peg" in the off-scale direction.

The digital parameter readouts appear in the lower-right part of the symbol adjacent to their respective arcs so that they do not interfere with the analog indications. Integrated text labels appear to the left of the digital parameter readouts. For spacing purposes, the text length of the integrated text labels must be identical for each element. In addition, element must be defined in the following order in the configuration file to avoid occlusion by pointer blackout circles: Triple Tach Nf2 Pointer; Triple Tach Nf1 Pointer; Triple Tach Nr Pointer.

The "Triple Tach Nf1 Pointer," "Triple Tach Nf2 Pointer" and "Triple Tach Nr Pointer" elements may be defined as set forth in Table 43 below:

TABLE 43

| Parameter | Choices | Notes |
|---|---|---|
| Validity | | See validity setup table in Table 13. |
| Center X-Position Value | | X-pixel position, allowed to be off-screen. This is the X-pixel position for the center of the gauge arc. |
| Center Y-Position Value | | Y-pixel position, allowed to be off-screen. This is the Y-pixel position for the center of the gauge arc. |
| Radius/Pointer Length | | Arc radius/pointer length in pixels. |
| Pointer Base Half-Width | | Half the width of the pointer at its base in pixels. |
| Pointer blackout circle radius | | Radius of a black circle to blackout the center portion of the pointer in pixels. |
| Outer Radius/Pointer Length | | Defines the Radius/Pointer Length for the associated "Triple Tach Nf2 Pointer" element so that digital parameter readouts and integrated text labels can be accurately placed. |
| Text | Character String | All capital string of up to 31 characters to label the element. |
| Log File Text | Character String | Used to name a column in the log file. Maximum characters is 31. |
| Text Color | Numeric Value Index | Index value from colors.h. |
| Text Halo Flag | ON or OFF | If ON, text is haloed with black pixels. If OFF, text is not haloed. |
| Text Size | Integer >= 0 | Text size 0 is a 8 pixels wide × 9 pixels tall. Other text sizes are (6 * Text Size) wide × (6 * Text Size + 1) tall. These pixels sizes are for integer thickness 1. |
| Text Thickness | Integer Thickness | Text thickness in pixels. Setting this value to 0 inhibits the text display. |
| Parameter Readout Decimal Places | Integer between −2 and +2 | Adjust rounding and decimal places for parameter readout as follows:<br>−2  106.55555 becomes 110 (nearest 10)<br>−1  106.55555 becomes 105 (nearest 5)<br> 0  106.55555 becomes 107 (nearest integer)<br>+1  106.55555 becomes 106.6 (nearest 10$^{th}$)<br>+2  106.55555 becomes 106.56 (nearest 100$^{th}$) |
| Parameter Show "+" Flag | ON or OFF | Normally, the "+" for a positive value is suppressed. If this flag is ON, the "+" is shown. |
| Parameter Size | Integer >= 0 | Parameter size 0 is a 8 pixels wide × 9 pixels tall. Other parameter sizes are (6 * Text Size) wide × (6 * Text Size + 1) tall. These pixels sizes are for integer thickness 1. |
| Parameter Thickness | Integer Thickness | Parameter thickness in pixels. Setting this value to 0 inhibits the parameter readout with the exception of failure warning Red-X. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different than the primary port. Setting up a secondary port is not required. |
| Use Latched Value | ON or OFF | If ON, then the latched value (last value that indicated SSM of NO) is used. Otherwise, normal SSM and word timeout rules apply. |
| Use Rate Value | ON or OFF | If ON, then the rate of change of the label value is used. "Use Latched Value" takes precedence. |
| Miscompare Threshold | Numeric Value | If both a primary and secondary port are setup, this value is the miscompare threshold between the parameter values acquired |

TABLE 43-continued

| Parameter | Choices | Notes |
|---|---|---|
| | | from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |
| Variable Limit Primary Port | | |
| Variable Limit Secondary Port | | |
| Variable Limit Use Latched Value | | |
| Variable Limit Use Rate Value | | |
| Limit Type | | See limit type description in |

Limit Indicator Bars (Horizontal or Vertical)

In a typical embodiment, a "Limit Indicator Bar" element appears when valid and includes a multi-segment bar with colored regions. FIG. 8(v) illustrates exemplary "Limit Indicator Bar" elements. The colored regions of the bar are controlled by associated limits. The "Limit Indicator Bar" element is intended to be used in conjunction with "Generic Pointer with Linear Movement" elements.

In a typical embodiment, the "Limit Indicator Bar" element is defined as set forth in Table 44 below:

TABLE 44

| Parameter | Choices | Notes |
|---|---|---|
| Validity | | See validity setup table in Table 13 |
| First X-Position Value | | X-pixel position, allowed to be off-screen. For type "Horizontal," this is the position of the first normalization value. For type "Vertical," this is the position of a first vertical edge. |
| First Y-Position Value | | Y-pixel position, allowed to be off-screen. For type "Horizontal," this is the position of a first horizontal edge. For type "Vertical," this is the position of the first normalization value. |
| Second X-Position Value | | X-pixel position, allowed to be off-screen. For type "Horizontal," this is the position of the last normalization value. For type "Vertical," this is the position of a second vertical edge. |
| Second Y-Position Value | | Y-pixel position, allowed to be off-screen. For type "Horizontal," this is the position of a second horizontal edge. For type "Vertical," this is the position of the last normalization value. |
| Fill Flag | ON or OFF | If ON, red regions are filled. If OFF, red regions are hollow. |
| Normalization | | 9 normalization values. |
| This Element can Contain up to 8 Limits: | | |
| Limit Type | | See limit type description in Table 15. |
| Limit Value | Numeric Value | Parameter value associated with this limit. For proper element behavior, the first limit must be defined off-scale below the first normalization point and subsequent limits must be defined in ascending value order. |
| Limit Debounce Period | See Notes | Affects behavior in accordance with limit type description in Table 15. |
| Limit Exceedance Period | See Notes | Affects behavior in accordance with limit type description in Table 15. |
| Variable Limit Label | See Notes | The "Limit Value" can be made a variable of a second value. The second value is acquired from "Variable Limit Label" on "Variable Limit Primary Port" (required) and "Variable Limit Secondary Port" (optional). The latched value or rate value can be used if desired (optional with "latched value" taking precedence). If a second value is not acquired, then the fixed "Limit Value" is used as a backup. |
| Variable Limit Primary Port | | |
| Variable Limit Secondary Port | | |
| Variable Limit Use Latched Value | | |
| Variable Limit Use Rate Value | | |
| Limit Type | | See limit type description in |

Timer Element

In a typical embodiment, a "Timer" element appears when valid and includes a MM:SS digital readout. FIG. 8(w) illustrates an exemplary "Timer" element. In a typical embodiment, the "Timer" element is defined as set forth in Table 45 below

TABLE 45

| Parameter | Choices | Notes |
|---|---|---|
| Validity | | See validity setup table in Table 13 |
| X-Position Value | | X-pixel position for center or right-justified location of parameter readout. |
| Y-Position Value | | Y-pixel position for center of parameter readout. |
| Text Color | Numeric Value Index | Index value from colors.h. |
| Halo Flag | ON or OFF | If ON, text is haloed with black pixels. If OFF, text is not haloed. |
| Text Size | Integer >= 0 | Text size 0 is a 8 pixels wide × 9 pixels tall. Other text sizes are (6 * Text Size) wide × (6 * Text Size + 1) tall. These pixels sizes are for integer thickness 1. |
| Text Thickness | Integer Thickness | Text thickness in pixels. Setting this value to 0 inhibits the text display. |
| Vertical Orientation Flag | ON or OFF | If ON, text is rendered in a vertical orientation. If OFF, text is rendered in a horizontal orientation. |
| Parameter Label | Octal 0 to 377 | This is the ARINC429 label that contains the parameter data |
| Primary Port | 1 through 42 | This is the primary OASIS COM Port for data acquisition. |
| Secondary Port | 1 through 42 | This is the secondary OASIS COM Port for data acquisition. The secondary port must be different |

TABLE 45-continued

| Parameter | Choices | Notes |
|---|---|---|
| Use Latched Value | ON or OFF | than the primary port. Setting up a secondary port is not required. If ON, then the latched value (last value that indicated SSM of NO) is used. Otherwise, normal SSM and word timeout rules apply. |
| Miscompare Threshold | Numeric Value | If both a primary and secondary port are setup, this value is the miscompare threshold between the parameter values acquired from the different ports. Leave this value at 0 to inhibit a miscompare analysis. |
| Miscompare Debounce | Numeric Value | Time (in seconds) that the difference between the primary and secondary port parameter values must exceed the Miscompare Threshold prior to the appearance of miscompare symbology. |

Clock Element

In a typical embodiment, a "Clock" element appears when valid and includes a HH:MM:SSZ or HH:MM:SSL digital readout. FIG. 8(x) illustrates an exemplary "Clock" element. In a typical embodiment, the "Clock" element is defined as set forth in Table 46 below:

TABLE 46

| Parameter | Choices | Notes |
|---|---|---|
| Validity | | See validity setup table in Table 13 |
| X-Position Value | | X-pixel position for center or right-justified location of parameter readout. |
| Y-Position Value | | Y-pixel position for center of parameter readout. |
| Text Color | Numeric Value Index | Index value from colors.h. |
| Halo Flag | ON or OFF | If ON, text is haloed with black pixels. If OFF, text is not haloed. |
| Text Size | Integer >= 0 | Text size 0 is a 8 pixels wide × 9 pixels tall. Other text sizes are (6 * Text Size) wide × (6 * Text Size + 1) tall. These pixels sizes are for integer thickness 1. |
| Text Thickness | Integer Thickness | Text thickness in pixels. Setting this value to 0 inhibits the text display. |
| Vertical Orientation Flag | ON or OFF | If ON, text is rendered in a vertical orientation. If OFF, text is rendered in a horizontal orientation. |

Figure 9:
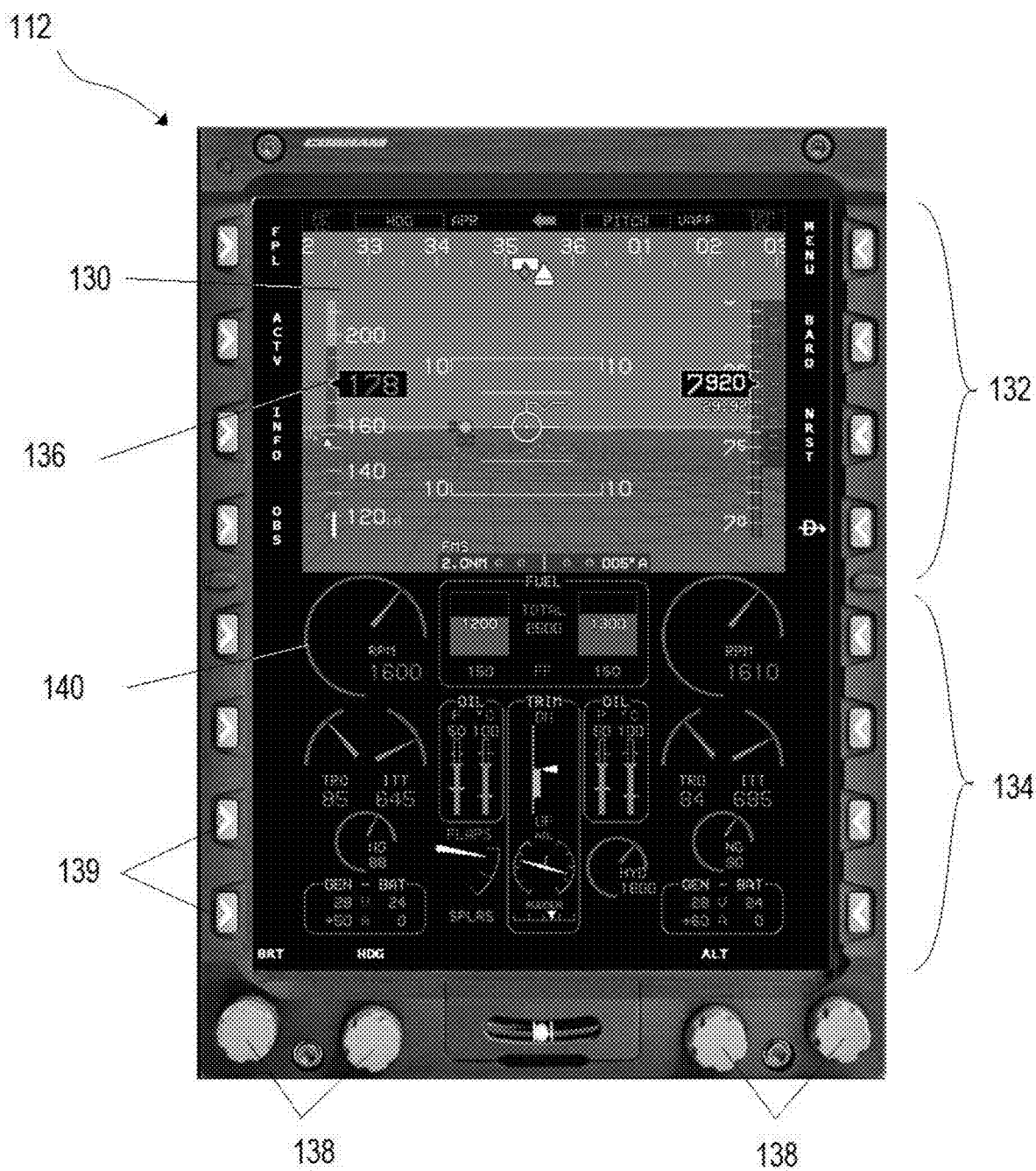
FIG. 9 illustrates an exemplary display for an instrumentation system according to one or more embodiments of the disclosure.

Referring now to FIG. 9, an example of the display 112 for use with an IDU 100 of the instrumentation system 10 is shown. In a typical embodiment, the display 112 includes a screen 130. In the embodiment shown, the screen element 130 is divided into an upper screen portion 132 and a lower screen portion 134. In other embodiment, the display 112 may be combined into one display page as desired. The screen portions 132 and 134 can be used by the instrumentation system 10 to display information to a pilot (e.g., navigation information, equipment information, and the like). In various embodiment, the upper and lower portions 132 and 134 can be used to display one or more symbology elements (e.g., see FIGS. 8(a)-8(x)). For example, the upper screen portion 132 includes an element 136 that is similar to the linear indicator of FIG. 8(a). The element 136 is an example of overlaying a symbology element onto a pre-existing PFD page. The lower screen portion 134 includes multiple symbology elements. For example, the lower screen portion includes a symbology element 140 that is similar to the single pointer element of FIG. 8(n). The lower portion 134 illustrates using a collection of standard symbology elements (e.g., symbology elements of FIGS. 8(a)-8(x)) that can be combined to create standalone display.

In a typical embodiment, the display 112 includes one or more knobs 138 that can be used by a user to manipulate the instrumentation system 10. For example, the knobs 138 may be used to select different pages or symbology elements for display. The display 112 may also include one or more buttons 139 that also allow a user to manipulate the instrumentation system 10.

The foregoing outlines features of several embodiments so that those skilled in the art may better understand the embodiments of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A computer-program product comprising a non-transitory computer-usable medium having computer-readable program code embodied therein, the computer-readable program code adapted to be executed to implement a method for generating data outputs as instructed by a configuration file on a computer system for an aircraft, the method comprising:
   processing, as instructed by a parameter of the configuration file, data from a first data source, wherein the first data source comprises either a sensor associated with the aircraft or an addressable memory, and wherein the parameter comprises an instruction to manipulate the data via a certified function to create a new parameter based, at least in part, on the data from the first data source;
   performing, as instructed by one or more of the parameter or the new parameter, a validity analysis to create validity data;
   formatting, as instructed by the one or more of the parameter or the new parameter, the validity data; and
   displaying, responsive to a determination of a valid condition of the validity data, information on a display.

2. The method of claim 1, wherein the parameter comprises instructions for interpreting ARINC and NMEA formatted messages from the first data source.

3. The method of claim 1, wherein the parameter comprises instructions for generating custom CAS messages.

4. The method of claim 1, wherein the parameter identifies a location within the addressable memory of the data for the processing.

5. The method of claim 2, wherein the parameter identifies a location within the addressable memory to store the processed data.

6. The method of claim 2, wherein, as a part of the processing, the messages from the first data source are formatted as one of a binary coded decimal, a binary numeric representation, and a discrete data word.

7. The method of claim 1, further comprising passing parameters from the configuration file to the functions during an initialization process at a startup of a system operable to carry out the method.

8. The method of claim 1, further comprising adding new parameters in the configuration file that define new data outputs, wherein the adding occurs after the one or more certified functions have been certified.

9. The method of claim 1, wherein the certified function comprises one or more of the following functions: addition, define a constant, difference, division, multiplication, subtraction, arccosine, arc sine, arc tangent, arc tangent 2, ceiling, cosine, sine, exponent, absolute value, floor, fmod, log, log 10, log 2, maximum, minimum, power, square root, normalize, switch, timer count down, time count up, equal, average, data acquisition, and drawing.

10. The method of claim 1, wherein the parameter comprises instructions for generating symbology elements.

11. The method of claim 10, wherein the symbology elements include one or more of the following: a dual pointer indicator, a round indicator, an arc indicator, a line element, an arc element, a circle element, a polygon element, a text element, a group box, a CAS display box element, a tape with top readout element, a tape with bottom readout element, a tape with no readout element, a single pointer element, a dual pointer element, a concentric pointer element, a fuel tank element, a digital parameter indication element, a generic pointer with arc element, a generic pointer with linear movement element, a triple tachometer pointer element, a limit indicator bars, a timer element, and a clock element.

12. The method of claim 1, wherein a second data source comprises a sandbox adapted to permit processing of data from a second sensor associated with the aircraft.

13. The method of claim 1, wherein the sensor associated with the aircraft comprises one or more of the following sensor types: global positioning sensor (GPS), Air Data Computer (ADC), Attitude Heading Reference System (AHRS), Datalink/Automatic Dependent Surveillance-Broadcast (ADS-B), weather mapping sensor, analog interface, traffic sensor, remote tune radios, video, remote bugs panel, digital autopilot, airframe/engine data, weather radar, mode S transponder, and fuel flow/quantity.

14. An instrumentation system for an aircraft, the instrumentation system comprising:
an information display unit (IDU) comprising:
a central processing unit (CPU) adapted to carry out instructions for the instrumentation system;
an addressable memory, in communication with the CPU, adapted to store data from at least one sensor associated with the aircraft and data generated by the instrumentation system; and
at least one communication port in communication with the at least one sensor associated with the aircraft and the CPU via a communications link;
wherein the instructions comprise computer-readable program code operable to implement a method comprising:
processing, as instructed by a parameter of a configuration file, data from a first data source, wherein the first data source comprises either a sensor associated with the aircraft or an addressable memory, and wherein the parameter comprises an instruction to manipulate the data via a certified function to create a new parameter based, at least in part, on the data from the first data source; and
performing, as instructed by one or more of the parameter or the new parameter, a validity analysis to create validity data;
formatting, as instructed by the one or more of the parameter or the new parameter, the validity data; and
displaying, responsive to a determination of a valid condition of the validity data, information on a display.

15. The instrumentation system of claim 14, including a second IDU.

16. The instrumentation system of claim 14, wherein the memory comprises both non-volatile and volatile memory types.

17. The instrumentation system of claim 16, further comprising:
wherein the non-volatile memory comprises storage for a data log; and
wherein the method further comprises outputting the processed data output to the data log.

18. The instrumentation system of claim 14, further comprising a sandbox adapted to permit communication between the IDU and at least a second sensor.

\* \* \* \* \*